(12) United States Patent
Breitenbach et al.

(10) Patent No.: US 7,236,976 B2
(45) Date of Patent: Jun. 26, 2007

(54) SYSTEM AND METHOD FOR SCHEDULING EVENTS AND ASSOCIATED PRODUCTS AND SERVICES

(75) Inventors: Matthew Breitenbach, Philadelphia, PA (US); Marty Low, Collegeville, PA (US); John J. Matranga, Berwyn, PA (US)

(73) Assignee: Aramark Corporation, Philadelphia, PA (US)

( * ) Notice: Subject to any disclaimer, the term of this patent is extended or adjusted under 35 U.S.C. 154(b) by 1298 days.

(21) Appl. No.: 09/883,540

(22) Filed: Jun. 18, 2001

(65) Prior Publication Data

US 2002/0016729 A1 Feb. 7, 2002

Related U.S. Application Data

(60) Provisional application No. 60/212,704, filed on Jun. 19, 2000.

(51) Int. Cl.
*G07F 17/00* (2006.01)

(52) U.S. Cl. .................. 707/100; 707/10; 707/102

(58) Field of Classification Search ........... 705/8, 705/9; 707/100, 10, 102
See application file for complete search history.

(56) References Cited

U.S. PATENT DOCUMENTS

| | | | | |
|---|---|---|---|---|
| 4,797,818 | A | 1/1989 | Cotter | 364/401 |
| 4,937,743 | A | 6/1990 | Rassman et al. | 364/401 |
| 5,093,794 | A | 3/1992 | Howie et al. | 364/468 |
| 5,247,671 | A | 9/1993 | Adkins et al. | 395/650 |
| 5,325,525 | A | 6/1994 | Shan et al. | 395/650 |
| 5,615,121 | A | 3/1997 | Babayev et al. | 395/209 |
| 5,960,406 | A | 9/1999 | Rasansky et al. | 705/9 |
| 5,991,739 | A | 11/1999 | Cupps et al. | 705/26 |

OTHER PUBLICATIONS http://www.cio.com/archive/101599/intro.html.*
http://www.computerworld.com/news/2002/story/0,11280,74620,00.html.*
Development of a collaborative and event-driven supply chain information system using mobile object technologyHuang, E.; Fan-Tien Cheng; Haw-Ching Yang;Robotics and Automation, 1999. Proceedings. 1999 IEEE International Conference on vol. 3, May 10-15, 1999 pp. 1776-1781 vol. 3.*
Semantic Web services: reflections on Web service mediation and compositionBussler, C.;Web Information Systems Engineering, 2003. WISE 2003. Proceedings of the Fourth International Conference on Dec. 10-12, 2003 pp. 253-260.*

(Continued)

*Primary Examiner*—David Jung
(74) *Attorney, Agent, or Firm*—Woodcock Washburn LLP

(57) ABSTRACT

A system and method that allows an individual event participant to schedule and/or status an event and the provisions of one or more ancillary tasks associated with the event. The scheduling of the provisions of the event and ancillary tasks and sub-tasks associated with the event are performed by the event participant without the intervention of a centralized event planner using a system that provides for integrated scheduling of resources and calendaring of people within a common event-based scheduling system. The event-based scheduling system provides vertical integration of multiple sub-tasks within an individual task and horizontal integration of each sub-tasks across multiple tasks. The event-based scheduling system and method include an event-based scheduling application which automates and integrates all the task and sub-tasks required to plan, conduct, status, and report a complex event or process. The system and method allow real time scheduling and status monitoring of the event and the products and services associated with the event. The system componentsand subsystems are interconnected via a network and may be accessible via, for example, the Internet.

60 Claims, 41 Drawing Sheets

System Architecture
Centralized processing

OTHER PUBLICATIONS

Integrating Heterogeneous Distributed COTS Discrete-Event Simulation Packages: An Emerging Standards-Based ApproachTaylor, S.J.E.; Wang, X.; Turner, S.J.; Low, M.Y.H.;Systems, Man and Cybernetics, Part A, IEEE Transactions on vol. 36, Issue 1, Jan. 2006 pp. 109-122.*

Amplitude, *"Leverage the Power of your Internet"*, pp. 1-34.

MS® Market Technical Deployment Guide, *"Digital Nervous System"*,pp. 1-32.

CaterMate™ Software:New Vision in Systems & Services, *"Eventmaster™ Evaluation Installation"*(Manuel)Sec 1-5.

StarCite™, *"Welcome to StarCite"* www.starcite.com/public/anonymous.asp, (1 page) May 30, 2001.

StarCite™, "Resources/Planning Tools", www.starcite.com/resources/resources.asp, (2 pages) May 30, 2001.

StarCite™, "Planning Checklist", www.starcite.com./mtgplanning/checklistdetails.asp, (3 pages) May 30, 2001.

StarCite™, "Services", www.Starcite.com/resources/services.asp?menuitem=43,(1 page) May 30, 2001.

StarCite™, "About US", www.starcite.com/aboutus/7.o-aboutus.asp, (2 pages) May 30, 2001.

Critical Path™, "Critical Path™ Home Page", www.cp.net/(1 page) Jan. 17, 2000.

Critical Path™, "Critical Path™ has Solutions", www.cp.net/solutions/index.html,(1 page) Jan. 17, 2000.

Critical Path™, "Resource Management", www.cp.net/solutions/rm-index.html, (1 page) Jan. 17, 2000.

Critical Path™, *"Service Request Automation"*, *"Increased Efficiency, Immediate Savings"*, www.cp.net/solutions/rm-services.html, (1 page) Jan. 17, 2000.

Critical Path™, *"Service Request Automation"*, *"Reserve Services Features"*, www.cp.net/solutions/rm_services_features.html, (2 pages) Jan. 17, 2000.

Critical Path™, *"Service Request Automation"*, *"Benefits of Reserve Services"*, www.cp.net/solutions/rm_services_benefits.html, (1 page) Jan. 17, 2000.

Critical Path™, *"Service Request Automation"*, *"Calculate your ROI"*, www.cp.net/solutions/rm_services_roi.html, (1 page) Jan. 17, 2000.

Critical Path™, *"Service Request Automation"*., *"Reserve Service System Requirements"*, ww.cp.net/solutions/rm_services_sysreg.html, (1 page) Jan. 17, 2000.

Critical Path™, *"Shared Resource Scheduling"*, *"Optimized Resource Utilization, Immediate Savings"*, www.cp.net/solutions/rm_resource.html, (1 page) Jan. 17, 2000.

Critical Path™, *"Shared Resource Scheduling"*, *"Comprehensive Scheduling Functionality"*, www.cp.net/solutions.rm_resource_features.html,(2 pages) Jan. 17, 2000.

Critical Path™, *"Shared Resource Scheduling"*, *"Benefits of Reserve"*, www.cp.net/solutions/rm_resource_benefits.html, (1 page) Jan. 17, 2000.

Critical Path™,*"Shared Resource Scheduling"*, *"Calculate your ROI"*, www.cp.net/solutions/rm_resource_roi.html, (2 pages) Jan. 17, 2000.

Critical Path™, *"Shared Resource Scheduling"*, *"Reserve System Requirements"*, www.cp.net/solutions/rm_resource_sysreq.html, (1 page) Jan. 17, 2000.

Event411.com, Home Page (1 page).

Event411.com, "Discover Our Online event-Planning Tools for Individuals and Organizations", www.event411.com/corporate/corpmain.cfm?passcode=13zj518ha8&group_id=0,(1 page) Jan. 12, 2000.

Event411.com, *"Corporate Profile"*, Letter from our CEO, Steven R. Koltai, www.event411.com/corporate/letter.cfm?passcode=13zj518ha8&group_id=0, (1page) Jan. 12, 2000.

Event411.com, *"Who We Are"*, www.event411.com/corporate/who_we_are.cfm?passcode=13zj518ha8&group_id=0, (1 page) Jan. 12, 2000.

Event411.com, *"What We Do"*, www.event411.com/corporate/what_we_do.cfm?passcode=13zj518ha8&group_id=0 (2 pages) Jan. 12, 2000.

Event411.com, *"Our Newsroom"*, www.event411.com/corporate/news.cfm?passcode=13zj518ha8group_id=0 (4pages) Jan. 12, 2000.

Event411.com, *"Information for Business"*, www.event411.com/infoforbus/ (2 pages) Jan. 12, 2000.

Event411.com, *"Local services"*, www.event441.com/localservices/ ,(1 page) Jan. 12, 2000.

Event411.com, *"Caterers"*, www.event411.com/caterers, (2 pages) Jan. 12, 2000.

Event411.com, *"Personalized Event Planning"*, www.evet411.com/enroll/corpinfosplash.cfm?passcode, (4 pages) Jan. 12, 2000.

Cbord.com, Home Page, www.cbord.com, (1 page) Dec. 30, 1999.

Cbord.com, *"Products by Name"*, www.cbord.com/prodserv, (6 pages) Dec. 30, 1999.

Cbord.com, *"The Catermate Suite and EventMaster PLUS!"*, www.cbord.com/prodserv/fms/catermatesuite.htm, (1 page) Dec. 30, 1999.

* cited by examiner

Data Aggregation

System Architecture
Centralized processing

System Architecture
Decentralized Processing

System Architecture
Detailed Design

Audiovisual Module Work Flow

Conference Room Report

660

| Requestor | Room | Event Name | Guests No. | Start D/T | End D/T |
|---|---|---|---|---|---|
| DemoUser1 | 1012 South | Sales Meeting | 6 | 4/17/2001 8:30:00 AM | 4/17/2001 5:00:00 PM |
| mbwest | 1012 South | Buyer1 | 25 | 4/20/2001 8:30:00 AM | 4/20/2001 5:00:00 PM |
| DemoUser2 | 1012 South | Test | 10 | 4/27/2001 8:30:00 AM | 4/27/2001 5:00:00 PM |
| ediscnillo | 1015 North | test | 10 | 4/17/2001 8:30:00 AM | 4/17/2001 5:00:00 PM |
| tfancy | 1016 B | monthly meeting | 10 | 4/29/2001 8:30:00 AM | 4/29/2001 5:00:00 PM |
| DemoUser2 | 1018 South East | Test Meeting | 10 | 4/24/2001 8:30:00 AM | 4/24/2001 5:00:00 PM |
| DemoUser1 | 1019 East | Marketing Meeting | 8 | 4/18/2001 8:30:00 AM | 4/18/2001 5:00:00 PM |
| DemoUser1 | 1019 West | Legal Meeting | 5 | 4/19/2001 8:30:00 AM | 4/19/2001 5:00:00 PM |
| sdenny | 1020 East | Staff Meeting | 14 | 4/16/2001 7:30:00 AM | 4/16/2001 10:30:00 AM |
| dstasio1 | 1020 East | Friday Mtg | 10 | 4/20/2001 10:00:00 AM | 4/20/2001 11:15:00 AM |
| sdenny | 1020 East | Staff Meeting | 14 | 4/23/2001 7:30:00 AM | 4/23/2001 10:30:00 AM |
| dstasio1 | 1020 East | Friday Mtg | 10 | 4/27/2001 10:00:00 AM | 4/27/2001 11:15:00 AM |
| DemoUser2 | ZD Germany Raum 1 | test | 10 | 4/24/2001 8:30:00 AM | 4/24/2001 5:00:00 PM |

FIGURE 28C

SYSTEM AND METHOD FOR SCHEDULING EVENTS AND ASSOCIATED PRODUCTS AND SERVICES

This Application claims benefit of U.S. provisional Application Ser. No. 60/212,074 filed Jun. 19, 2000.

FIELD OF THE INVENTION

The present invention relates to a computer-based system and method for scheduling events, and more particularly, to an event-based system and method for allowing an individual event participant to schedule an event and the provisions of one or more ancillary products and/or services associated with that event.

BACKGROUND OF THE INVENTION

Individual event participants (e.g., end users) and companies are continually faced with trying to accurately schedule events, as well as the provisions of ancillary products and services associated with an event, in a time and cost efficient manner. An event can include, for example, a meeting or other gathering of one or more person for a particular purpose. Ancillary products and services can include, for example, catering, maintenance and repair, security, audio/visual equipment, reprographics, mail room services, concierge, temporary labor, office equipment and supplies, and the like. A substantial business and operating advantage can be gained by a company that can allow end-users to accurately schedule and determine the status of events, and the provisions of ancillary products and/or services associated with the particular event. This can help a company reduce cost and minimize the number of personnel required to schedule and to determine the status of these types of events. For example, such improved scheduling may result in a company having an improved operating position, an improved customer response time, better allocation of resources, and a better economic analysis for staffing and event planning.

In conventional scheduling programs, a centralized event scheduler is typically used to interact with a plurality of end-users and a plurality of product and service providers on an individual basis. Typically, each individual end-user or event participant will provide inputs to the centralized event planner and the event planner performs the actual scheduling of the event. Also, products or services for a particular event are typically scheduled separately from the event and also require that the event participants provide input to the central event planner for actual scheduling. This process is very time labor intensive, time consuming, inefficient, and often inaccurate because the central event planner may err in inputting the data from the event participant.

Another business problem typically experienced by existing event scheduling systems is that if an end-user wants to change a provision of a scheduled event, such as the location, date, time, etc., then that person has to contact the centralized event scheduler, who must then contact all the products and services providers associated with that event and reschedule those products and services based on the change to the event, if possible. In addition, if changes are required either by the event participant or by the event planner due to, for example, meeting room or resource conflicts, each individual event participant must be contacted individually and notified of the change. Changes are typically made by the centralized event planner. Again, this process is very labor intensive, time consuming, inefficient, expensive, and often inaccurate because the central event planner may err in inputting changes. Also, conventional systems typically do not have any link or tie-in between resource scheduling and people calendaring functions.

Accordingly, the number of personnel and resources necessary to accurately and reliably schedule and status events has created a burden on companies to develop business strategies for more efficiently scheduling events, as well as the provision of products and/or services for those events.

Various technologies currently exist for centralized event planning, specialty event planning, and calendar scheduling. Some of these conventional technologies leverage the power and speed of a web-based suite of solutions for event planning (e.g., resource oriented) and calendar scheduling (e.g., people oriented). However, these conventional techniques typically include a central point of human input and control, which tend to make these systems inefficient and time consuming. These systems are inefficient in that inputs must be generated by an end-user of the system and these inputs must be provided to a central input point for actual input into the system. Typically, inputs for individual categories are received and inputted separately from one another which leads to further inefficiencies. These processes also require more time to gather and input the information into the system. Some companies use multiple independent systems (e.g., shared services) in order to plan or schedule items. However, these independent systems typically do not communicate or share information between the systems. Also, conflict resolution is not typically included with these systems.

For example, one traditional method of planning or scheduling events uses an electronic scheduling program called "EVENTMASTER™" and "EVENTMASTER PLUS!™" manufactured by CaterMate of Indianapolis, Ind. EVENTMASTER™ provides solutions for catering and event management and is designed to make a food service operation more profitable. Its features can be used on a standalone PC or by concurrent networked users.

EVENTMASTER™ and EVENTMASTER PLUS!™ are event management products typically used by the catering, food service, and hospitality industries. With EVENTMASTER™, an event planner can typically: generate events, proposals, contracts, and invoices; generate pre-cost and price events and menus; create and review staffing requirements for events and maintain a staff schedule; manage cash flow and event billing, and interface the system's ledger with third party accounting applications; and create a set of management reports that gives the user information on pre-costing, forecasted revenues, critical dates, booking problems, and customized client correspondence templates. EVENTMASTER™ also allows integrated food production, menu planning, purchasing, and inventory functions.

In addition, these systems can be fully integrated with the CaterMate Suite to provide a solution for the management of food production, menu planning, purchasing, inventory, and event planning. With the CaterMate Suite, an event planner can: generate event orders, proposals, contracts, and invoices; create custom menus; place food orders electronically; track inventories; print key reports; extend recipes; record service actuals; and improve service and reduce costs.

However, this method of scheduling has a relative narrow application in that it only covers the operations aspects of event planning. This system only performs one specific task (e.g., one vertical silo) and is therefore a single function solution. EVENTMASTER™ and EVENTMASTER PLUS!™ do not provide for front-end order entry and customer interfacing, nor do they provide an order management service delivery interface. As in the systems described above, this conventional scheduling system requires a centralized operator or event planner to input event data into the system and to make any changes to events already scheduled within the system. This conventional system also tracks the entry based on a customer identifier and not based on the event itself. Therefore, there is no integration or cross-connection between the event and the services for the event. Also, no commerce is actually transacted from the scheduler system. This scheduler system also does not track customer usage, preferences, buying habits, or patterns. EVENTMASTER™ and EVENTMASTER PLUS!™ do not schedule services, but rather only schedule fixed resources that are custom built into each version of the scheduler software. In addition, the scheduler system does not provide the user with alternatives, or outside resources, in the event that the fixed resources entered in the database of the scheduler are unavailable. Accordingly, the EVENTMASTER systems are not a commerce solving or commerce generating solution.

AMPLITUDE™ is another system that leverages the power of the Internet to provide a suite of solutions to automate everyday business processes, including the scheduling of resources. These solutions include web-based solutions for shared resource scheduling, service request automation, alternative workspace management, and event calendaring. This resource scheduling solution improves a user's ability to complete workplace-related tasks, such as scheduling and coordination. In addition, this resource scheduling suite can be incorporated into email outsourcing solutions, such as CRITICALPATH™.

The AMPLITUDE™ system only allows an operator to manage resources and does not provide for the scheduling of services associated with an event. As such this system has a room-based or resource-based functionality, and therefore is not event-based. In addition, the AMPLITUDE™ system does not allow the system to transact commerce outside of the AMPLITUDE™ system. The resources controlled by the AMPLITUDE™ scheduler system are fixed when the system is constructed and no outside service providers can access this conventional system if and when the fixed resources are unavailable. Although limited commerce may be transacted by the system in that, for example, the system allows the user to order catering and the order gets delivered, all orders originate within the system and are serviced and fulfilled from providers within the system database. This type of one-to-one commerce is inefficient and does not allow flexibility or scalability of the system (e.g., it does not allow one-to-many, or e-commerce, to occur).

The features or functionalities are grouped within the AMPLITUDE™ system into vertical "silos". A user can access each individual silo one at a time. No integration or cross-connection is provided between individual silos. Accordingly, when scheduling resources, the user must access each silo independently to schedule the specific resource contained therein, and then must exit that silo before entering the next desired silo to schedule another resource. This is also true for any changes that must be made to the calendaring and resources scheduling suite. This process is very labor intensive, time consuming, inefficient, expensive, and often inaccurate because the central event planner may err in inputting changes.

Therefore, a need exists for an event-based system and method for more accurately and efficiently scheduling an event and ancillary products/services associated with the event by allowing individual event participants (e.g., end users) to plan an event, as well as ancillary products and/or services associated with the event. The system and method need to be driven by the individual event participants to more efficiently and accurately schedule and to determine the status of an event, as well as products and services associated with a particular event in real time.

SUMMARY OF THE INVENTION

The present invention is directed to a computer-based system and method for allowing an event participant, as opposed to an event planner, to schedule and status one or more events at a remote computing platform and the provisions of products and/or services associated with those events in order to more efficiently and accurately schedule events and the provisions of products and/or services associated with the events. The system and method include an event-based scheduling software application which automates and combines/integrates all the tasks and sub-tasks required to plan, conduct, status, and report a complex event and the various ancillary products and services that may be associated with the event. The event-based scheduling system and method provide horizontal integration of each sub-task across each and every task and also provide vertical integration of all of the sub-tasks within each task.

The event-based scheduling application comprises a plurality of tasks, modules or business logic components, including tasks that are linked to the event and sub-tasks that are integrated across multiple tasks. The tasks include ancillary products and services that are typically associated with a particular event, such as conference room or meeting room location, room capacity, room availability, catering, audio/visual, copying (e.g., reprographics), maintenance and repair, janitorial, mail room and mail distribution, accounting, billing, hotel, temporary labor, temporary office space, concierge, personal assistant services, parking, office equipment and office supplies, etc. The sub-tasks include components of a task such as, for example, ordering, billing, transmitting the order, paying the bill, etc. Sub-tasks are steps that an event participant would need to go through in order to complete a task. The event-based scheduling system provides integration and cross-reference between the event and the ancillary tasks and sub-tasks typically associated with the event. This can be accomplished using conventional techniques, such as a pointer, tag, or link between the event and the associated tasks and sub-tasks.

The event-based system of the present invention is a connected system, preferably web-based, that allows an individual event participant (herein also referred to as end user, employee, client, customer) to schedule an event from a remote computing platform, such as, for example, his or her desktop, and to also schedule one or more ancillary products and/or services associated with the event during the same input transaction. The system and method provide for the scheduling of resources and the calendaring of personnel in support of an event. Preferably, the system and method provide cross-integration and synchronization across multiple companies/systems. The system and method preferably provides an easy to use process, similar in look and function to a consumer portal, such as AOL™, YAHOO™, or the like, for customers to access the complete portfolio of events and services anytime, anywhere.

Preferably, the system and method also provide for the real time status monitoring of previously planned and scheduled events, as well as the provisions of ancillary products and services associated with these events.

The system is preferably scalable in that additional service modules, such as, for example, personal scheduling (e.g., calendaring), office supply, mailroom, etc., can follow and be added to the event-based scheduling system. These service modules can easily be tailored, or new ones created, to meet the needs of each line of business or customer. In addition, the system is preferably flexible in that additional and/or new event participants and additional and/or new product and service providers can be added, and in that the event participant can access product and service providers outside the system, if needed. Also, the event-based scheduling system is preferably capable of integrating and using one or more existing resource scheduling and personnel calendaring systems as a task and/or sub-task.

The system provides an electronic work order management system that can be used by event participants to efficiently and effectively use and manage their time and support services. This system permits event participants and service providers to concentrate on the timely and accurate completion of the work order, rather than paperwork and associated administration.

The present invention is directed to an event-based system and method for enterprise resource planning (ERP) of shared and managed services (e.g., indirect services). The system and method of the present invention can be used by a company to drive the back-end functionality of the company.

The system also retains data associated with an event and, within an event, the associated products and services. Preferably, the data is collected and aggregated in a central database and is accessible to event participants, service providers, business partners, clients, and the like. The data collected enables the on-site service provider to deliver more personalized products and services, to the benefit of the customers. The data may be collectively rolled up by the system to provide operators the ability to assess and measure performance and preferences.

The system of the present invention also provides an interface to internal operational and financial systems, calendaring, and to the systems of clients and potential trading partners. For example, once a customer makes a request, the information can be transferred into an operations system for labor scheduling, a financial system for invoicing, the client's system for line item reporting of services rendered, and potential trading partner's systems for ordering materials or services.

The event-based scheduling system of the present invention also functions as a potential food and support services e-Commerce platform for all service providers. Preferably, the system enables the back-end integration to the service provider's systems, as is common among most e-Commerce initiatives, which can allow the present invention to become an effective "platform" upon which all service providers can drive their respective web scheduling initiatives (e.g., common structure for integrating vendor specific software).

The event-based scheduling system of the present invention includes a grouping of like and related components representing a presentation tier, a business logic tier and a data tier. The presentation tier includes a plurality of computing platforms for inputting, processing, and displaying data relating to an event and one or more products/services associated with the event.

An event participant can access the business logic tier and the data tier using a computing platform at the presentation tier to schedule an event and ancillary products and services associated with the event during a single electronic input transaction.

The business logic tier includes a grouping of like and related components connected to the presentation tier. The business logic tier includes one or more servers for authenticating event participants, maintaining access control and security, and administering event participant profile data and load balancing. The business logic tier also includes one or more network servers, each network server having an operating system that provides one or more of classes of application services, file and print services, communications services, and Web services. Network server software is included in the business logic tier and runs on the operating system to process requests received from event participants at the individual computing platforms. In addition, the business logic tier includes a plurality of modules constructed to perform predetermined actions on the data and the requests. A transactional processing system can be provided for developing, deploying, and managing distributed server applications.

The data tier includes a grouping of like and related components connected to the business logic tier. The data tier includes a server for maintaining one or more of a membership directory, membership analysis, and content deployment and a collaborative system that supports one or more of communication, information sharing, and workflow services for managing the scheduled events and the products/services associated with each of the events. A relational database can be provided for storage and retrieval of relational information for storing data relating to the ancillary products and services associated with the event.

A further embodiment in accordance with the present invention is directed to a method of scheduling an event and the provisions of one or more ancillary products/services associated with the event by an individual event participant. Preferably, the event and the ancillary products and services are scheduled during a single event participant session.

The method in accordance with the present invention includes an event participant inputting data relating to an event into a computing environment having a scheduling system for scheduling an event, scheduling the event based on a system response of available space compatible with inputted event data, inputting data relating to one or more ancillary products and services associated with the event into the computing environment based on a system response of available products and services associated with the event, and scheduling the associated products and services through a plurality of products/services modules interconnected with the event-based scheduling system.

Other features and advantages of the system and method of the invention will be apparent from the following description.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings exemplary embodiments that are presently preferred, it being understood, however, that the invention is not limited to the specific methods and instrumentalities disclosed. In the drawings:

Figure 24A:
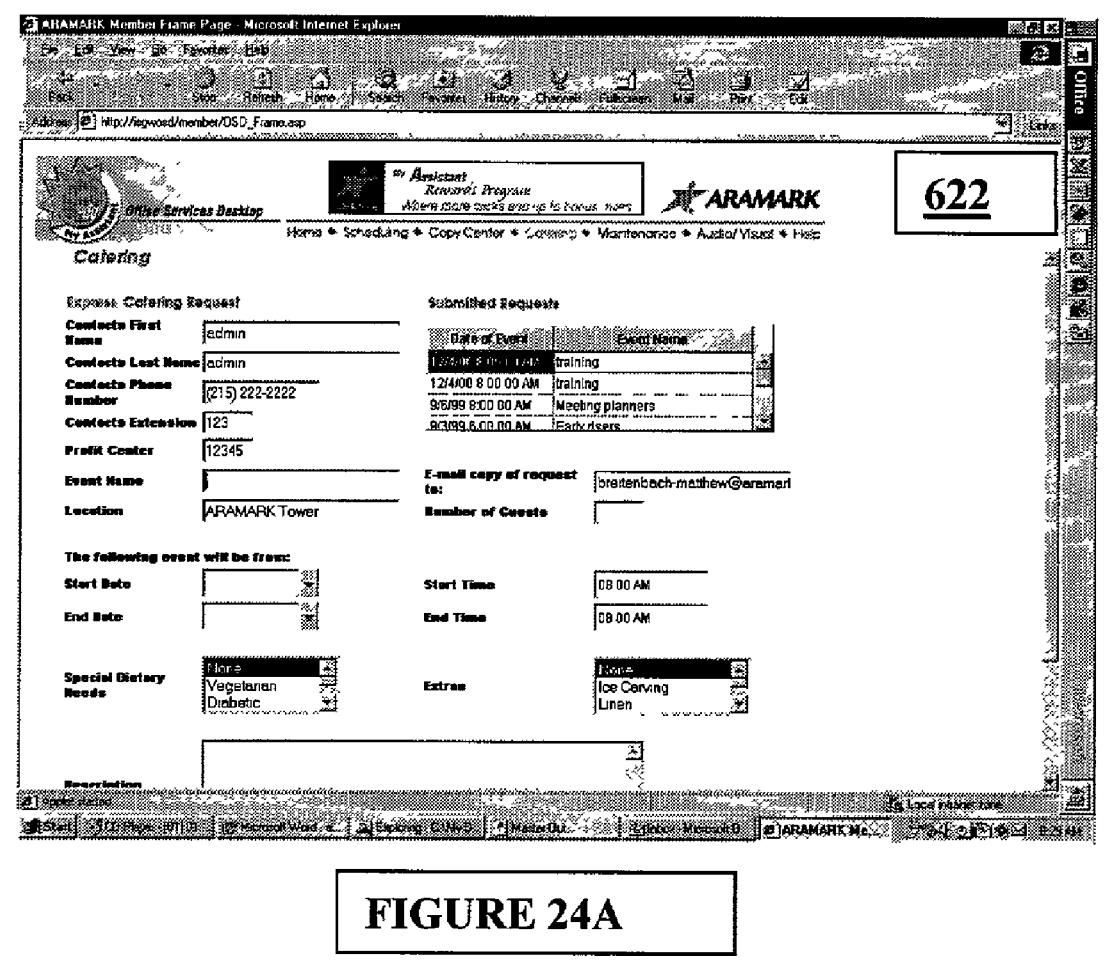

FIG. 24A illustrates an exemplary catering event request screen that may appear after the room has been scheduled;

Figure 27:
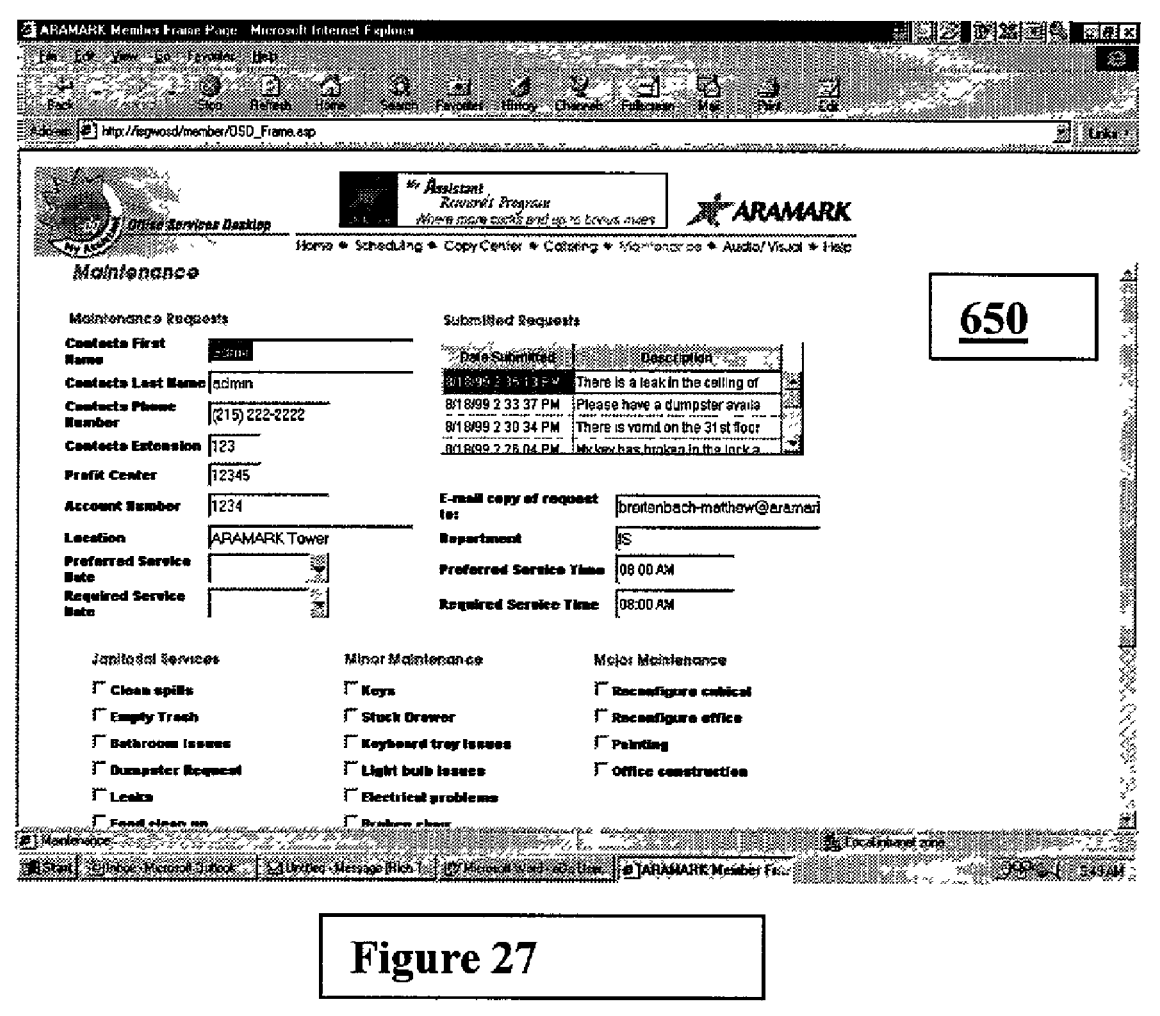

FIG. 27 illustrates an exemplary maintenance and repair request screen that may appear after the event has been scheduled;

FIGS. 28A-28C illustrate exemplary conference room booking report screens;

DETAILED DESCRIPTION OF THE PREFERRED EMBODIMENTS

Figure 1:
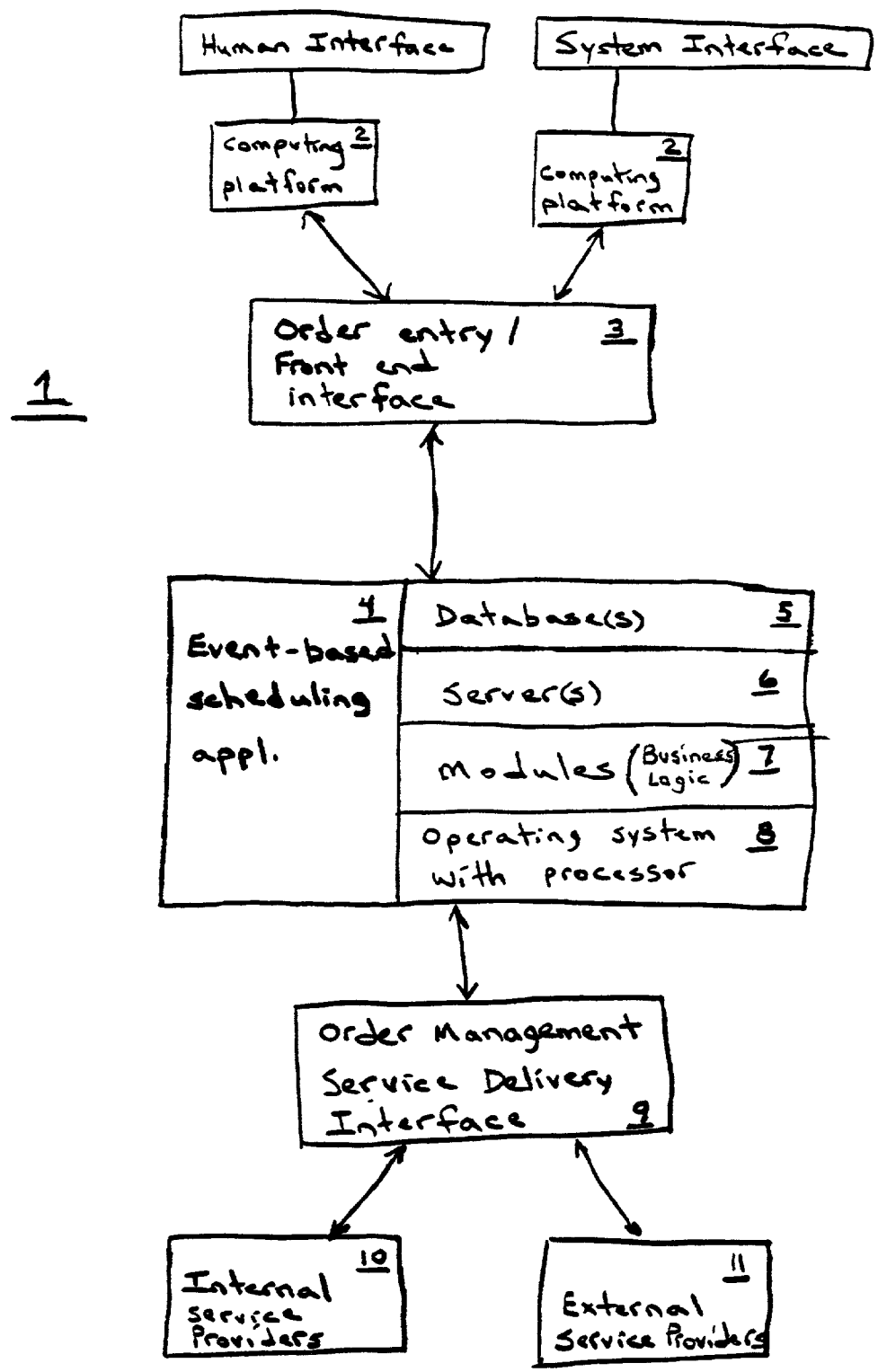
FIG. 1 shows an exemplary event-based scheduling system in accordance with the present invention.

The present invention is directed to an event-based system and method of scheduling an event and one or more ancillary products and/or services associated with that event by an event participant during an electronic transaction and that solves the above-mentioned problems in the prior art as well as providing other beneficial features that are described below with reference to the Figures. As described herein, the system and method include an event-based scheduling software application which automates and combines all the tasks and sub-tasks required to plan, conduct, check the status, and report a complex event or process, as well as, the various ancillary products and services that may be associated with the event or process. The event and the ancillary products and services associated with the event are integrated and cross-referenced within the event-based scheduling system. The event-based scheduling system and method also provide a common portal that allows an event participant to transact commerce, including e-commerce, with one or more business partners (e.g., product/service providers). Preferably, the system and method provide a best-fit or optimal scheduling solution that efficiently matches products, services, and people with a particular event or process. Preferably, the system and method also provide for the real-time verification and status monitoring of an event and any associated products and/or services associated with the event. Those skilled in the art will readily appreciate that the description given herein with respect to the figures is for explanatory purposes only and is not intended in any way to limit the scope of the invention.

I. Definitions:

Event: For purposes of clarity, "event", as used herein, is intended to encompass, but not limited to, any meeting or gathering of, or communication between, more than one person at a specific time, including but not limited to in-person, telephonically, electronically, digitally, audio, visual, or the like. An "event" can be held in more than one place or location, and the locations may be owned or operated by one or more event participants or organizations.

Event participant: For purposes of clarity, "event participant", as used herein, is intended to encompass, but not limited to, any person attending an event or a person or system providing input for or supporting an event, including but not limited to anyone attending an event, anyone participating in the event, or anyone not attending, but having access to or authority to provide information, schedule, or status an event, such as an attendee's representative. An "event participant" is also referred to herein as "end user", "client", "customer", "employee", or the like. "Event participant" may also include a service provider or outside vendor of services associated with the event.

Process: For purposes of clarity, "process", as used herein, is intended to encompass, but not limited to, a plurality of related events occurring over a period of time. For example, a process may include the integration of a sequence of related events occurring over a period of time that allows data collection and correlation based on the event(s). The aggregation of data relating to the process can be used for, for example, pattern recognition and thus business process improvement.

Service Provider: For purposes of clarity, "service provider", as used herein, is intended to encompass, but not limited to, anyone who has access/authorization to interact with the system and receive and fulfill order/requests from event participants, including but not limited to in-house service providers, registered service providers, third party service providers, and outside vendors. A service provider may be the provider of multiple products and services and there may be multiple providers of the same product or service.

System Administrator: For purposes of clarity, "system administrator", as used herein, is intended to encompass, but not limited to, a person or a sub-system that manages and controls the system of the invention or modules thereof. The system administrator can provide authorization for an event participant to access or interact with the system, can have the authority and capability to schedule events, can monitor scheduled event and/or services associated with the event, can modify an existing event or the services associated with the event, can override scheduled events or the associated services, can resolve conflicts within the system, and can establish a hierarchy of events.

Services: For purposes of clarity, "services", as used herein, are intended to encompass, but not limited to, any products and/or services that are provided at a specific time and at a specific place in support of an event. For example, catering services at a conference room at a certain time for a specific meeting.

Real-time: For purposes of clarity, "real-time", as used herein, is intended to mean, but is not limited to, that a status of an event that has been scheduled or an order for support services that has been requested or accepted will be available and accessible in the system at substantially the same time that it is entered into the event-based system of the present invention. The system of the present invention will show the status of an item immediately after it has been entered into the system by an event participant. In other words, there is no compiling or delay in the posting of a scheduled event or an ordered service.

Trade: For purposes of clarity, "trade", as used herein, includes, but is not limited to, a profession, an industry, governmental, quasi-governmental, medical and healthcare, charitable, religious, fraternal, community, political, social, professional or industrial organizations, or for an organization and its locations and can vary by individual based on role, title, rank and responsibility.

Front-end request: For purposes of clarity, "front-end request", as used herein, includes, but not limited to, a request or order by an event participant.

Back-end request: For purposes of clarity, "back-end request", as used herein, includes, but not limited to, a request, inquiry, or response from a service provider.

Task: For purposes of clarity, "task", as used herein, is intended to encompass any service or product, such as, for example, room scheduling, catering, audio/visual, calendaring, etc. Tasks are components to an event. For example, inviting a person to an event, order catering for an event, etc., are examples of tasks.

Sub-task: For purposes of clarity, "sub-task", as used herein, is intended to encompass an item that is a component of a task, such as, for example, ordering, transmitting the order, fulfillment of the order, billing, paying the bill, etc. Sub-tasks are steps that an event participant or service provider would need to go through in order to complete a task.

Business Partner: For purposes of clarity, "business partner", as used herein, is intended to encompass all parties that have a stake in the event(s) or processes that are or could be accessed/requested through the event-based scheduling system. For example, participants invited to the event (both employees and non-employees), service providers (internal or external) that supply products and/or services for an event (e.g., catering, reprographics, AV equipment), people that control the physical facilities associated with an event (e.g., a conference room), and the like.

Client: For purposes of clarity, "client", as used herein, is intended to encompass a person or system that initiates an order or report through the event-based scheduling system.

II. Overview

Employees involved with the scheduling of events, and products and services associated with an event, require systems and methods that enable them to efficiently and reliably schedule and to determine the status of events, and any ancillary products and services associated with the event, in order to increase employee productivity and reliability. In addition, companies involved with the support of events and the management of products and services associated with an event desire systems and methods for being able to efficiently and accurately acquire, fulfill, determine the status of, and report events and the provisions of ancillary products and services associated with a particular event in order to ensure customer satisfaction and to more effectively manage various related products and points of service. The present invention includes an event-based scheduling system and method that meets these needs and provides other beneficial features, as described more fully herein below.

FIG. 1 shows an exemplary event-based scheduling system 1 in accordance with the present invention. The event-based scheduling system 1 includes a connected system, such as a distributed network or web-based system, and is capable of providing integrated access through a common portal to a wide variety of events and ancillary products and services that may be associated with a particular event. As shown in FIG. 1, the event-based scheduling system 1 allows individual event participants to access the event-based scheduling system 1 from one or more computing platforms 2 through an order entry/customer interface 3 to digitally plan events at a facility, as well as ancillary products and/or services associated with the event during a single electronic transaction. Each computing platform 2 can include, for example, a desktop computer, a laptop computer, an electronic device, a personal digital assistant (PDA), a telephone, or the like. Each computing platform 2 can be coupled to the event-based scheduling system 1 by a hard-wired or wireless connection. The system preferably provides an easy to use process, similar in look and function to a consumer portal, such as AOL™, YAHOO™, or the like, for event participants to use to access the complete portfolio of events and services anytime, anywhere.

As shown, the event-based scheduling system 1 includes the appropriate event-based scheduling application 4, one or more databases 5, one or more servers 6, and a plurality of modules or business logic components 7. An operating system executing on a processor 8 is provided for processing the application software and for controlling and managing various applications, including service module coordination, data access and management, integration, communications, authentication, and the like. For example, the modules 7 can include individual tasks, such as meeting and conference room scheduling as well as ancillary services, such as catering, audio/visual and office equipment, reprographics, maintenance repair organization (MRO), etc. The present invention automates and combines all the tasks and sub-tasks required to efficiently and accurately plan, conduct, and report a complex event, and various products and services that may be associated with the event.

The event-based scheduling system 1 also includes an order management, service delivery interface 9 that can be used to access one or more back end service providers 10, 11 for hosting of the event and/or fulfillment of the ancillary services associated with the particular event. The service providers may include one or more service providers 10 internal to the system or organization and/or one or more service providers 11 external to the system or organization, such as outside vendors.

The event-based scheduling system 1 can include diverse client types, ranging from thin to rich clients. The event-based scheduling system 1 functions as an event-based electronic work order management system for the services it provides. Preferably, the event-based scheduling system 1 is capable of being integrated with existing client systems.

Figure 2:
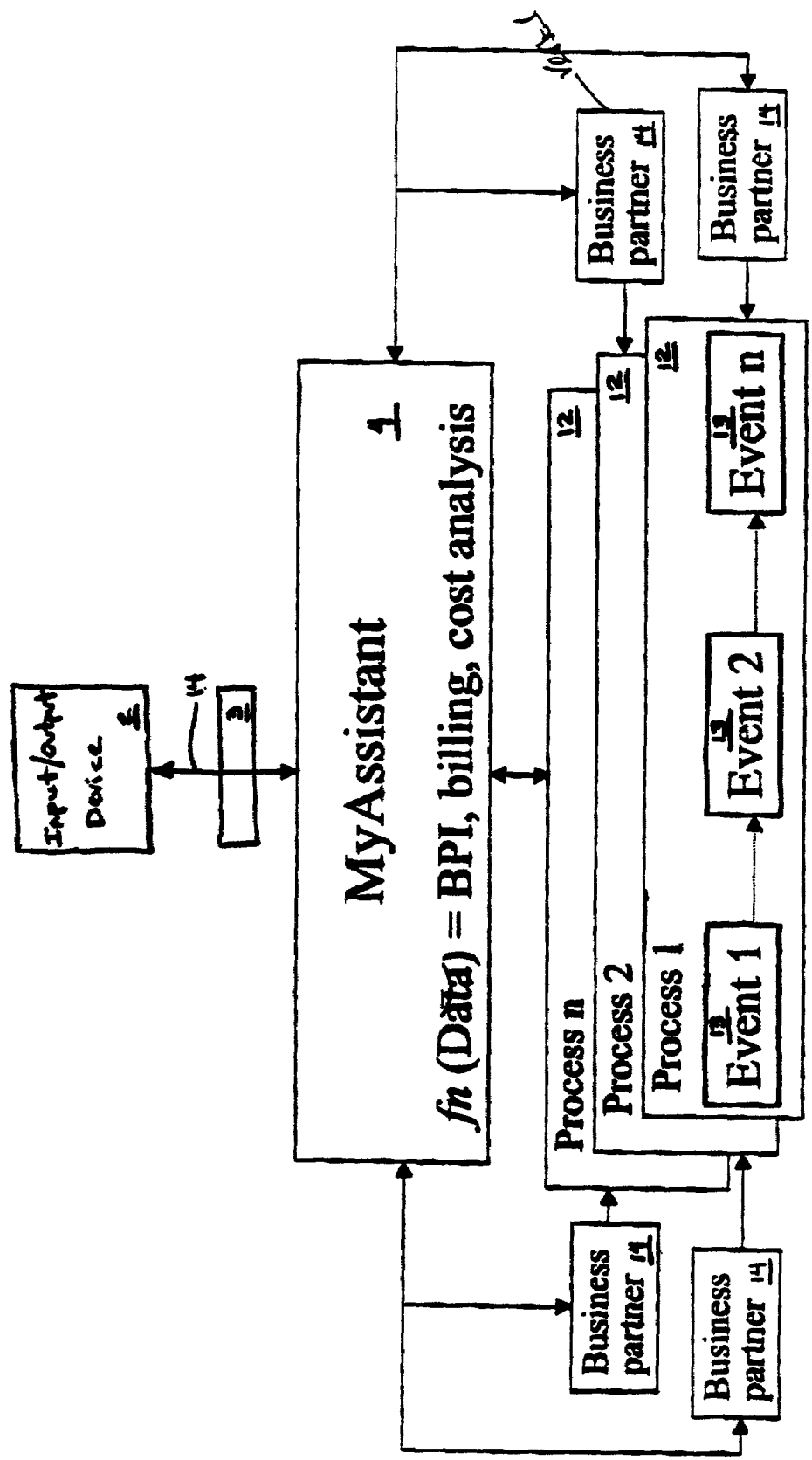
FIG. 2 illustrates another exemplary embodiment of the event-based scheduling system in accordance with the present invention illustrating how a plurality of events form a business process.

FIG. 2 illustrates another exemplary event-based scheduling system 1 including an input device 2, a front-end interface 3, an event-based scheduling system application 4, and one or more processes 12 that each include one or more events 13. One or more business partners 14 can receive data and/or access the event-based scheduling system 1 through one of the front-end or back-end interfaces. For example, an event participant can schedule an event or process by entering data through an input device 2 connected to the event-based scheduling system 1 through a front-end interface 3. Business partners can include other event participants, service providers (internal and/or external), clients, and the like.

As shown in FIG. 2, the event-based scheduling system 1 can be used to plan, conduct, status, and report a process 12 and/or event 13. A process 12 includes one or more related events 13 that occur over a period of time. A process 12 is a sequence of events 13 that are designed to deliver a certain outcome. Data relating to the events and processes can be collected and stored for pattern recognition and/or business process improvement (see FIG. 8). This aggregated data can also be used for benchmarking various service providers and the services that each provides in support of an event.

As shown, data can flow different ways via a communications link 14, including input data and reporting data. Data input can flow from the event initiator (e.g., an event participant) to the event-based scheduling system 1 to arrange or schedule the business partners 14 to enable these events and/or processes. Data and information reporting can flow from the event-based scheduling system 1 to the initiator, a business partner, and/or a client, including data and information across events and processes, so that they can improve their business processes. The reporting data and information includes the aggregation of data and information collected across services or tasks, not just for one individual service or task. This reporting data can also include the collection and aggregation of data across business partners and event participants to better understand the total event or process (see FIG. 8). The aggregation of data relating to the process can be used for, for example, pattern recognition and thus business process improvement.

Figure 3:
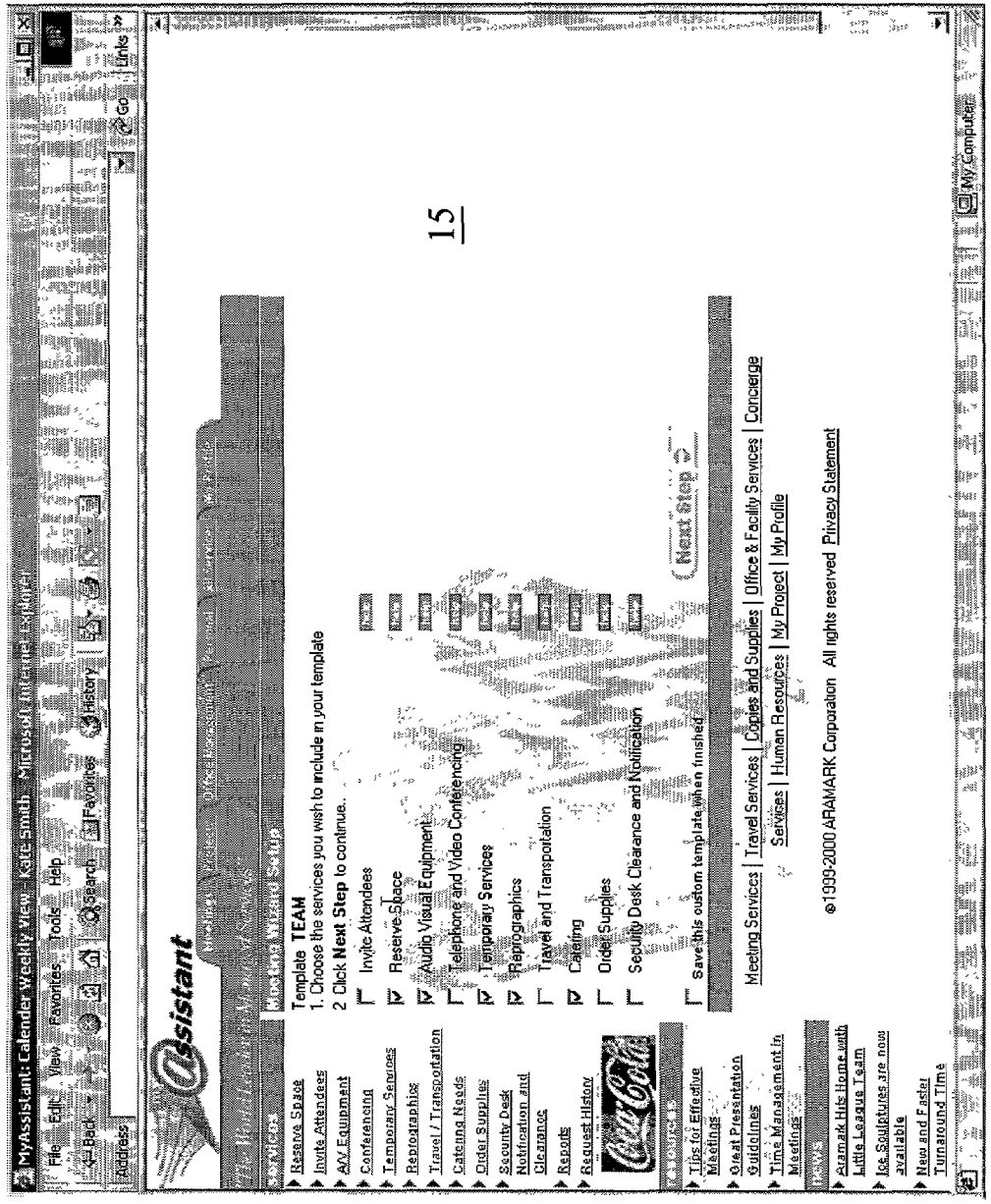
FIG. 3 shows an exemplary data input screen that may be displayed to an event participant.

FIG. 3 shows an exemplary input screen 15 that can be displayed to an event participant at a remote terminal, such as the computing platform 2 of FIG. 1, for inputting data relating to an event (and the products, services, and people associated with the event) into the event-based scheduling system 1. For example, the input screen 15 allows the event participant to arrange and schedule products, services, and people, and an output screen (not shown) allows clients to view and status data and information such as, for example, a report of the results associated with a particular event or process.

Figure 4:
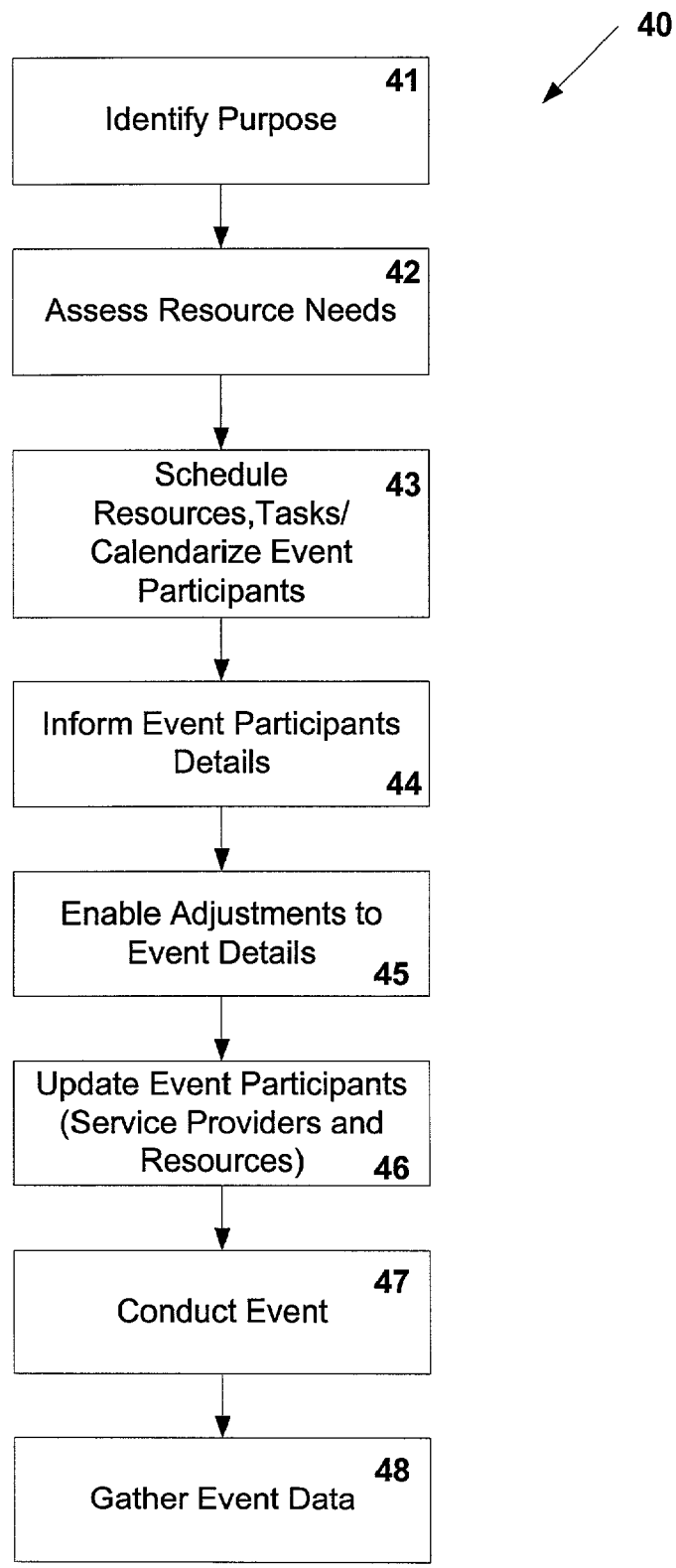
FIG. 4 is a flowchart showing an exemplary event scheduling process.

FIGS. 4, 5, 6, and 7 shows in more detail what comprises an event. FIG. 4 illustrates an exemplary event scheduling process 40 of an event 13 or the things that would otherwise comprise an event. An event participant identifies the purpose of the event, at step 41, and also accesses the resources that are needed for the identified purpose, at step 42. Next, the resources and tasks are scheduled and the other event participants are calendarized, at step 43. For example, this can be the event creator sitting down at his or her computer and scheduling things or resources and calendarizing people. The event participants are then informed, at step 44, of the details of the event. The event-based scheduling system enables adjustments to the event details, at step 45, if for example an event participant and/or a resource (e.g., product or service) is unavailable. After an adjustment has been made, the event participants are re-informed or updated, including any service providers and resource providers, at step 46. At step 47, the event is conducted. During the entire event scheduling process 40, the event participants and service providers can access the event-based scheduling system to status an event and/or the products and services associated with an event. Once the event is completed, data relating to the event may be collected centrally through the event-based scheduling system, at step 48. The invention enables an event participant, client, or business partner to gather event data and information for use in characterizing an event and improving the business process.

Figure 5:
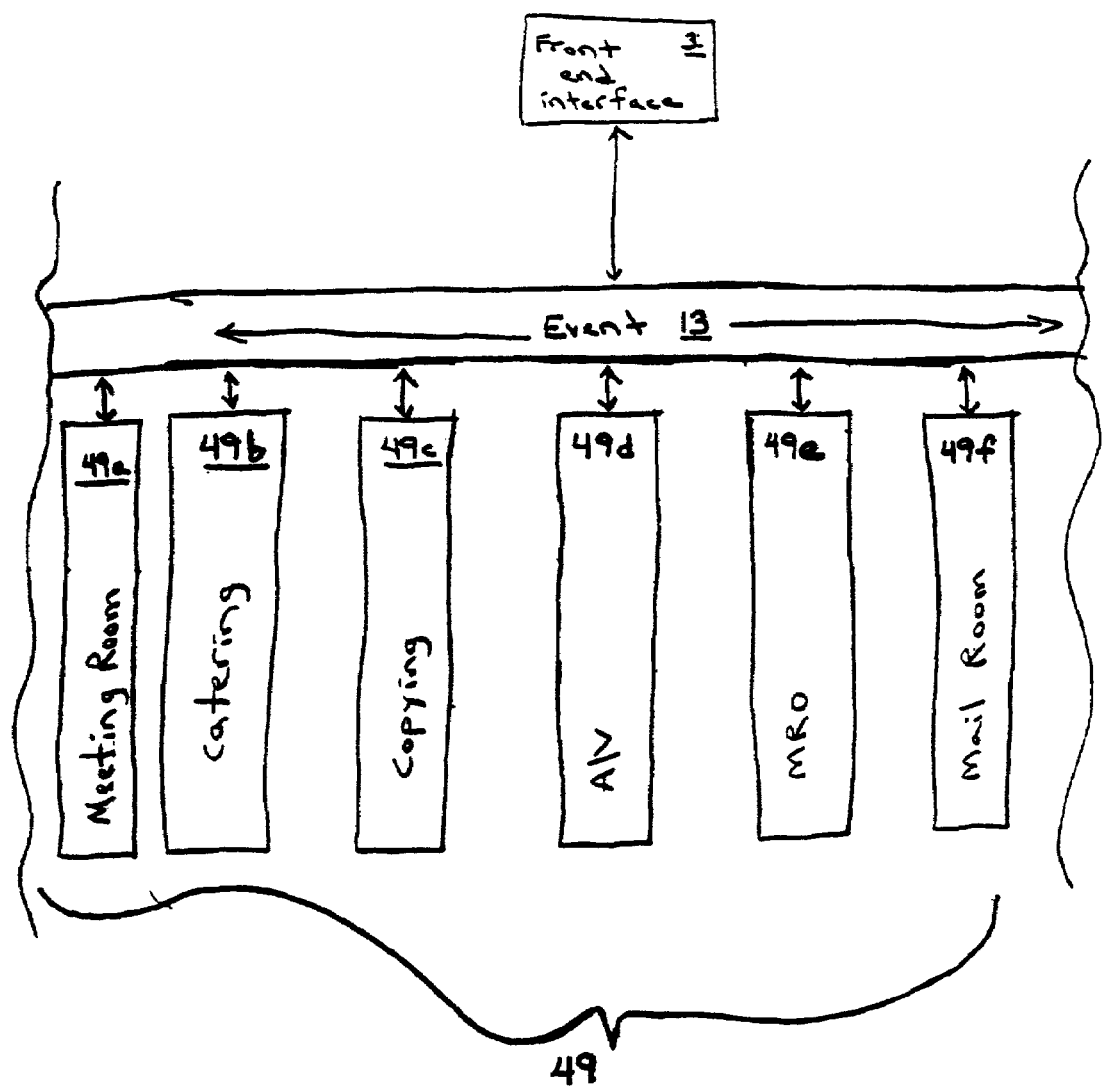
FIG. 5 shows a schematic of the ancillary products and services linked to the event to which they are associated within the system.

As shown in FIG. 5, the event-based scheduling system 1 provides an integrated solution or linking mechanism that links or associates one or more products and/or services with an event 13. For example, the products and services can be keyed to, or point to, an event in, for example, a relational or object oriented database. As shown in FIG. 5, the provisions and software for each ancillary service are preferably contained within a module 49 that represents individual tasks, such as meeting or conference room module 49a, catering module 49b, copying module 49c, audio/visual module 49d, MRO module 49e, mail room module 49f, up to module n. The modules/tasks are integrated with or cross-referenced to a particular event 13 in the event-based scheduling system 1. Preferably, the event-based scheduling system 1 automatically changes all product or service items associated with an event, based on a change to the event. Since each point of service 49 is linked to the event 13, the event-based scheduling system 1 allows an event participant to access multiple service modules 49 (e.g., tasks) within the integrated event-based scheduling system 1 during a single input transaction.

Figure 6:
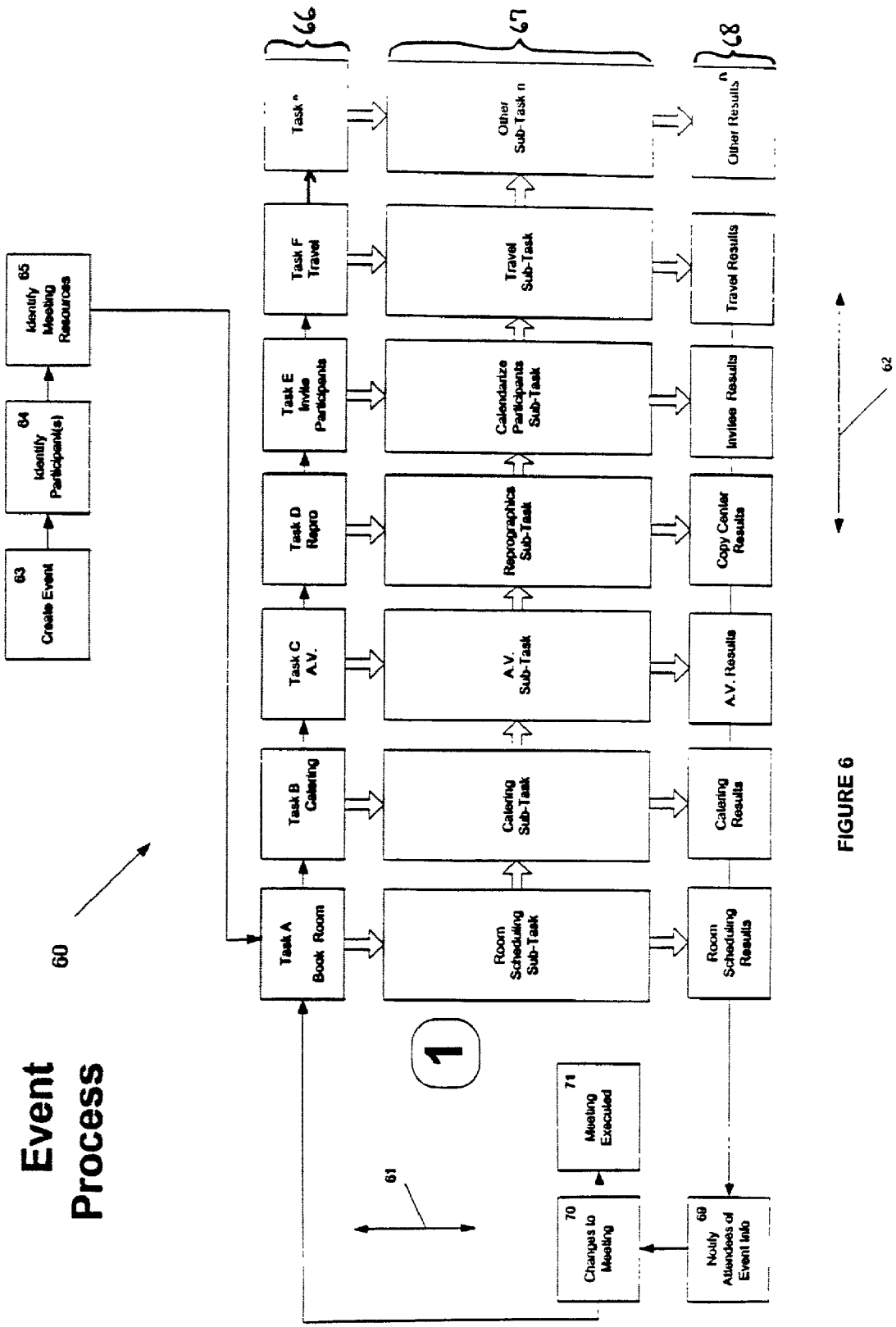
FIG. 6 shows in further detail the event scheduling process of FIG. 4.

FIG. 6 illustrates in more detail illustration of the process of scheduling an event, such as the event scheduling process of FIG. 4. FIG. 6 further illustrates both the vertical integration (represented by arrow 61) and horizontal integration (represented by arrow 62) of one or more tasks, sub-tasks, and results. FIG. 6 shows a further breakout of step 43 of FIG. 4, including the scheduling of one or more tasks (e.g., resources being scheduled and other event participants being calendarized). As shown in FIG. 6, an event participant can schedule the event at step 63, identify the event participants at step 64, identify the event purpose at step 65, and then schedule one or more tasks at step 66, sub-tasks at step 67, and obtain results at step 68.

As shown, the one or more tasks of step 66 can include, for example, service modules for booking a room (task A), ordering catering (task B), reserving audio/visual equipment (task C), ordering reproduction services (task D), inviting the event participants (task E), making travel reservations (task F), and the like, up to a task n. The sub-tasks of step 67 can include, for example, room scheduling (sub-task A), catering (sub-task B), A/V (sub-task C), reprographics (sub-task D), calendaring (sub-task E), travel (sub-task F), and the like, up to a sub-task n. Likewise, the results of step 68 can include, for example, room scheduling (results A), catering (results B), A/V (results C), reprographics or copy center (results D), invitee (results E), travel (results F), and the like, up to a result n. For example, an event participant requests a meeting for a specific purpose and designates the required attendees, room location, and catering to support the meeting. The results would be that each event participant would indicate whether or not they are available for the meeting; the results of the room scheduling sub-task would be whether the room is available on the day and time; and the result of the catering sub-task would be that the catering order has been received and whether the caterer accepts and can fulfill the order.

As shown in FIG. 6, the event-based scheduling system then notifies the designated attendees of the scheduled event information, at step 69. Again, the event-based scheduling system 1 allows for changes to be made, at step 70, to one or more components of the event and the products and services associated with the event. As shown, when a change is desired at step 70, the event-based scheduling system goes back through steps 66, 67, and 68, in order to actually make the changes. The system also notifies all event participants and service provides associated with the event of the changes that are made, at step 69. The event is then executed at step 71.

Figure 7:
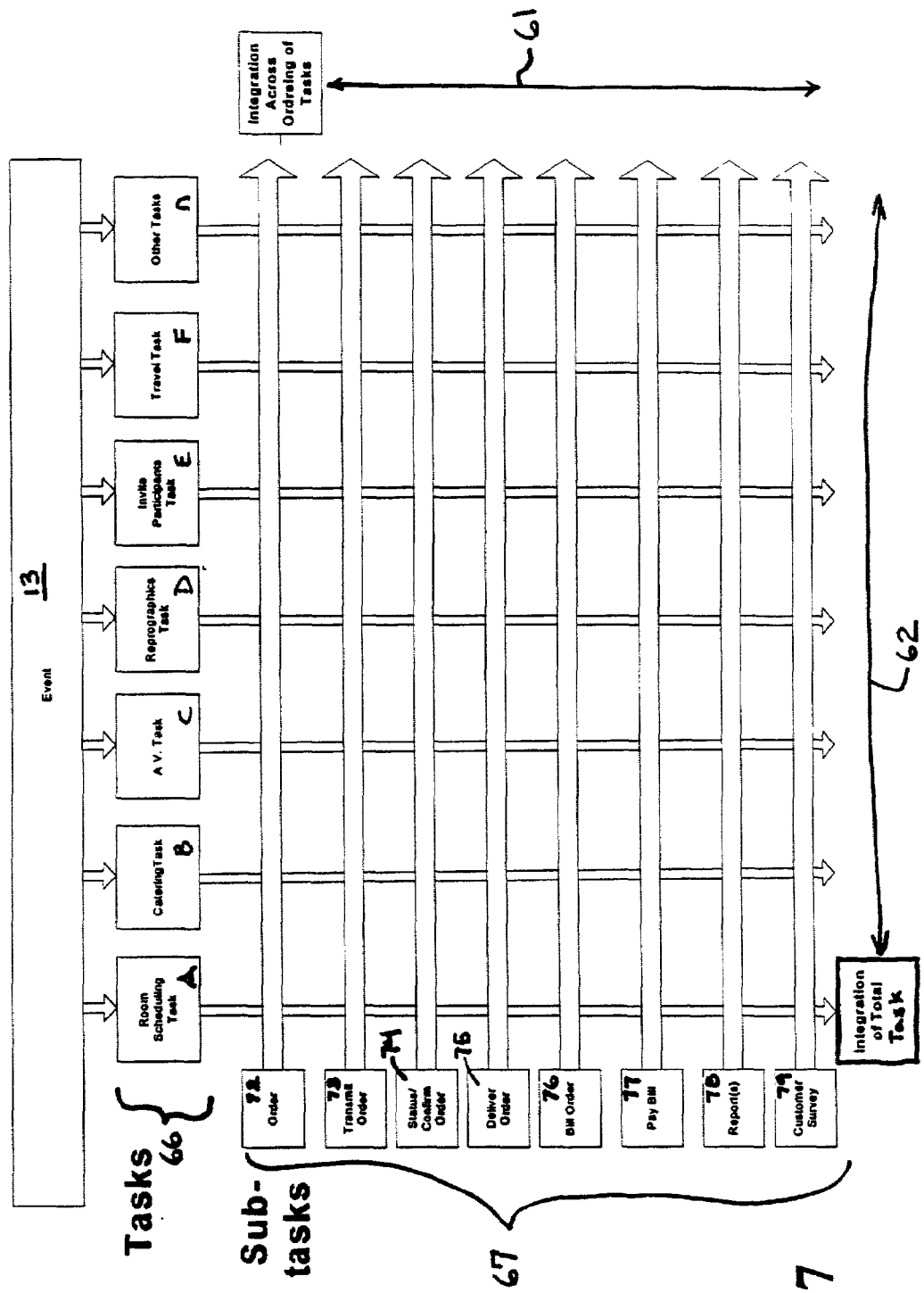
FIG. 7 shows a further detail the tasks and sub-tasks of FIG. 6.

FIG. 7 shows in further detail the sub-tasks 67 of FIG. 6 and also the integration and interoperability of the tasks and the sub-tasks. As shown in FIG. 7, an event includes one or more tasks 66, as described in detail above, and each task 66 includes one or more sub-tasks 67. There is vertical integration (arrow 61) of the sub-task(s) within each task or service module 67. This includes the integration of the total task. In addition, there is horizontal integration (arrow 62) of each sub-task 67 across each of the individual tasks or service modules 66. FIG. 7 shows the sub-task module as including one or more subtasks, such as for example, an order sub-task 72; a transmit order sub-task 73; a status/confirm order sub-task 74; a deliver order sub-task 75; a bill order sub-task 76; a pay order sub-task 77; a report(s) sub-task 78; a customer survey sub-task 79; status sub-task (not shown), up to a sub-task n. So, for example, the order interface has been consolidated so that one sub-task for ordering can control the ordering function across a plurality of tasks or service modules and therefore only one order interface is required instead of n ordering interfaces corresponding to the number of tasks associated with an event.

Also, for example, in the past, there might be n bills based again on the number of tasks involved, but now there would be one billing sub-task that functions across each of the n tasks. With the event-based scheduling system 1 of the present invention, everything can be done all in one place through a common interface of the event-based scheduling system 1. This provides an improvement over other prior art scheduling systems that require separate and independent systems for each of the sub-tasks (e.g., ordering, transmitting the order, statusing/confirming the order, billing and paying for the order, reporting the order, etc.). This also assists in the gather and correlation of data relating to each sub-task and provides data across multiple tasks associated with an event or process.

The event-based scheduling system can include a modularity function that includes one or more incumbent resource scheduling or personnel calendaring systems as one of the tasks or the sub-tasks. For example, an incumbent catering suite may be integrated into the event-based scheduling system 1 as a task 66 or an incumbent billing system may be integrated as one of the sub-tasks 67.

As shown in FIGS. 6 and 7, the event-based scheduling system 1 includes at least two tasks and at least two sub-tasks and provides for interoperability and inter-communication between multiple tasks and multiple sub-tasks. The event-based scheduling system 1 provides horizontal integration of each sub-task across each and every task and also provides vertical integration of all of the sub-tasks within each task. Conventional scheduling systems are typically one layer deep in either vertically or horizontally. For example, in conventional systems, an IT (e.g., software) company may typically provide one horizontal component, such as ordering, and a service provider may typically provide one vertical component, such as catering. There is no integration or interoperability of multiple tasks and multiple sub-tasks in these conventional systems.

Figure 8:
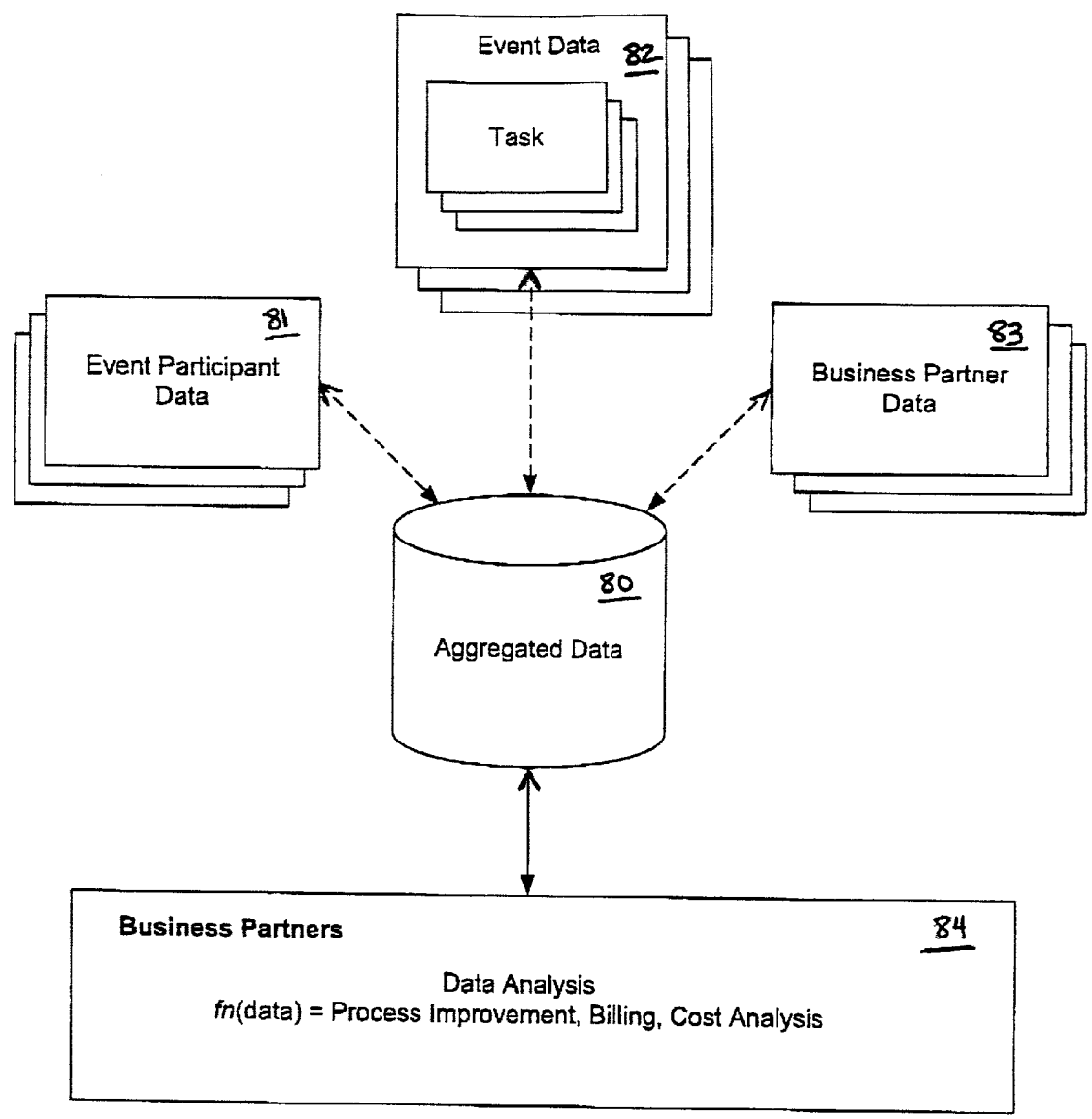
FIG. 8 is a block diagram showing an exemplary data aggregation scheme.

FIG. 8 shows how the data works or flows. As shown in FIG. 8, data is aggregated into a database 80 from various data input sources, including event participant data 81, event and task data 82, business partner data 83, and the like. The data from all the elements that are enabled (e.g., processes, events, tasks, sub-tasks, etc.) can be fed into a common database 80 or otherwise aggregated somewhere (such as an ASP application). The aggregated data may then be accessed and analyzed by business partners 84 (including event participants, service providers, clients, etc.) of the event-based scheduling system 1. This data and information may be analyzed centrally or provided to individual business partners for further data analysis. The results or output (e.g., the data and information stored in the aggregated database) can be used for process improvements, billing, cost analysis, staffing and manpower requirements, etc. The results can be provided to business partners 84 who might include, for example, clients, service providers, event participants, or other people that have access to the event-based scheduling system 1. The aggregated data can be used for pattern recognition and/or business process improvement, as well as, for benchmarking.

Figure 9:
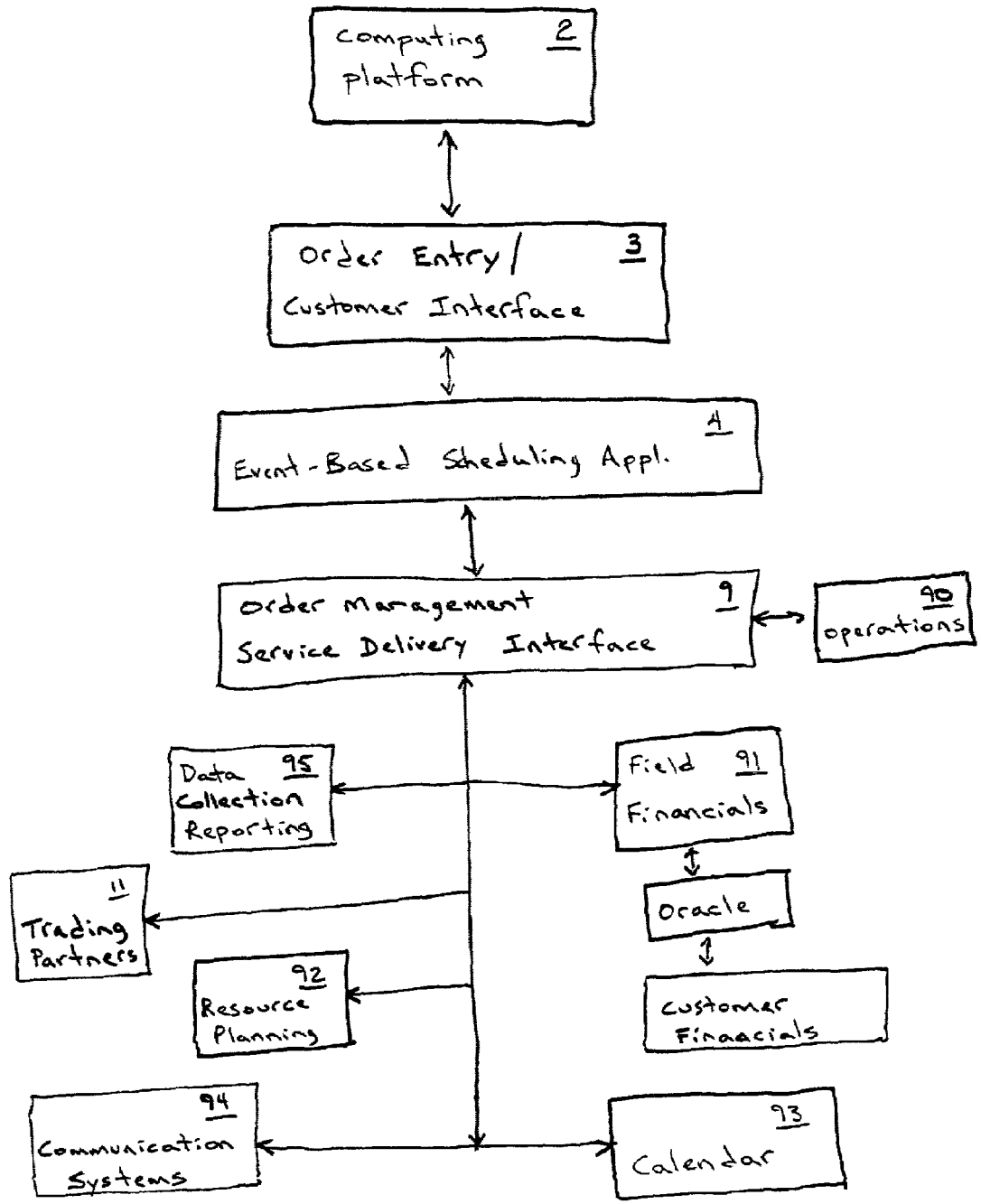
FIG. 9 shows an exemplary order entry/customer interface and order management/service delivery interface that can be used with the system of FIG. 1.

Referring back to FIG. 1, the event-based scheduling system 1 provides a front end user interface 3 to the event-based scheduling system 1 and also a back end service provider interface 9 which connects the event-based scheduling system 1 to various business partners, such as selected internal 10 or external service providers 11. Preferably, the event-based scheduling system 1 can also communicate between existing applications, such as shown in FIG. 9. As shown in FIG. 9, the event-based scheduling system 1 can preferably be linked to or integrated with other software application systems, including, for example, most conventional operations systems 90, financial systems 91, resource planning systems 92, calendaring systems 93, communications (e.g., email) systems 94, data collection and reporting systems 95, and the like.

Front-end integration 3 can be achieved through a process of shared office service modules connected via a web-based office management solution linked to an event that enables employees to manage shared office services more efficiently from their desktops. This helps reduce the amount of time employees spend on administrative tasks and improves communications for employees thereby increasing employee productivity.

Back-end integration 9 can be achieved through a process of using standards, appropriate performance measurements, data collection and reporting, and benchmarking to operate more efficiently. This allows service providers to actively develop relationships with front-end users, anticipate client needs, negotiate better deals with suppliers, expand into new markets and new service providers, and transact e-commerce with a wide array of front-end users. For example, the system modules preferably communicate and transfer data between conventional operations systems 90, financial systems 91, etc. in support of data collection and reporting by data collection and reporting system 95.

The system may collect and aggregate data relating to one or more events for the purpose of benchmarking an event and/or the tasks and sub-tasks associate with an event. This aggregated data can be used by an event participant or client for benchmarking, such as, for example, determining room utilization, determining the costs associated with a meeting, determining the costs for catering, determining travel expenses for an event, and the like.

The event-based scheduling system 1 allows a plurality of front-end users to be connected to or integrated with multiple service providers through a common portal. This allows clients and business partners to centralize all resources on one database. The system acts as a community portal capable of bringing together front-end user and back-end service providers or outside vendors. Preferably, the event-based scheduling system 1 includes business to business enabling technology having an open standards framework and provides gateways to various methods of inter-process communications. The event-based scheduling system 1 can be accessed and activated by a person, such as an event participant, a service provider, a business partner, a client, etc., or alternatively, by another system.

As shown in FIG. 9, the event-based scheduling system 1 can also provide an interface to internal operational, calendaring, and financial systems and to the systems of clients and potential trading partners. For example, once an event participant or business partner makes a request, the information can be transferred into operations systems 90 for labor scheduling, financial systems 91 for invoicing, client systems for line item reporting of services rendered 95, and potential trading partner's systems 11 for ordering materials. Event-based scheduling system 1 may also function as a potential food and support services e-commerce platform for all service providers. Preferably, the event-based scheduling system 1 enables the back-end integration to the service provider's systems, as is common among most e-commerce initiatives, thus allowing the present invention to become an effective "platform" upon which all service providers can drive their respective web event scheduling initiatives. The open system architecture of the event-based scheduling system allows multiple outside business partners to access and interact with the event-based scheduling system and enables both internal and external business partners for service procurement, fulfillment, and reporting.

Preferably, the event-based scheduling system 1 can facilitate, generate, and transact commerce, including e-commerce, by prompting end-users whether they wish to request/order products and services in response to the end-user inputting information relating to an event. The event-based scheduling system 1 also preferably allows service providers to transact commerce by responding and fulfilling these requests/orders for services associated with the event.

Preferably, the system of the present invention can transact commerce, including e-commerce, with outside service providers and trading partners. Accordingly, when a conference room or an associate service is unavailable or can not otherwise be fulfilled by an internal service provider, the event-based scheduling system 1 allows an event participant to go to an external service provider or outside vendor for hosting or fulfillment. In this manner, commerce may be transacted by the system both internally and externally in that, for example, the system allows the user to order catering from an internal catering provider, or alternatively, e-commerce may be transacted by the system wherein the end-user orders catering from an outside vendor and the order is delivered to the specified place at the specified time. This type of commerce is an improvement over traditional systems because it allows flexibility or scalability of the system (e.g., it allows one-to-many, or e-commerce, to occur).

In addition, the system preferably provides an optimal or best-fit feature that allows an event to be planned using the optimal or best-fit products, people, and services based on the particular event. This can be accomplished by noting typical event requirements and features and the provisions of ancillary products and services that are typically associated with the particular event. The data collection and reporting feature can also supplement this.

Figure 10:
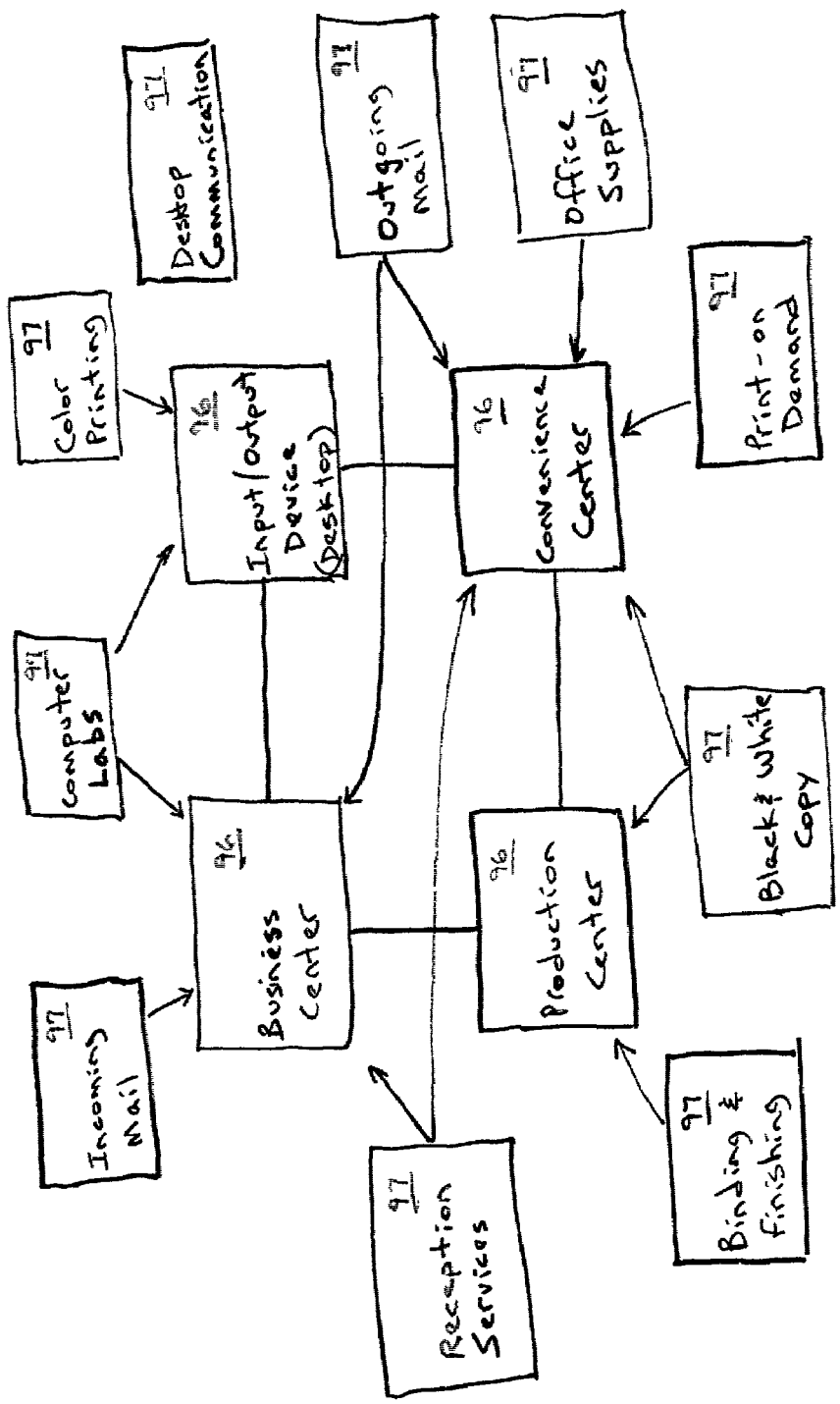
FIG. 10 shows an exemplary relationship between points of service and individual services.

As shown in FIG. 10, the system can also relate individual services with general points of service in order to more efficiently schedule and manage products and services. As shown, exemplary points of service 96 can include a business center, a desktop component, a production center, a convenience center, and the like. Individual services 97 can be grouped into one or more of the points of service thereby allowing the event-based scheduling system 1 to operate more efficiently.

The event-based scheduling system 1 provides an electronic work order management system that permits event participants and service providers to plan, conduct, and report all aspects of an event. This allows them to concentrate on the timely and accurate completion of the work order, rather than paperwork and associated administration. The event-based scheduling system 1 can retain data associated with each event and the associated products and services within an event. The data collected can enable a service provider to deliver more personalized products and services, to the benefit of the customers. The data may be collectively rolled up by the event-based scheduling system 1 to provide operators the ability to assess and measure performance.

The event-based scheduling system 1 provides a conflict resolution system that resolves conflicts among at least one event participant in scheduling the event and the services associated with the event based on a predefined system hierarchy. The predefined system hierarchy is preferably based on one of an event participant title, an event participant rank, an event participant seniority, an event priority, and the like.

The event-based scheduling system 1 can provide for real-time tracking and status monitoring of previously scheduled events and previously requested ancillary services associated with the event from the end-users' desktop. The present invention allows each individual event participant to check, in real-time, the status of any event or pending resource or service item, such as conference room or meeting room location, room capacity, room availability, catering, audio/visual, copying (e.g., reprographics), maintenance and repair, janitorial, mail room and mail distribution, accounting, billing, hotel, temporary labor, temporary office space, concierge, personal assistant services, parking, office equipment and office supplies, and the like.

The event-based scheduling system 1 is preferably scalable, in that additional service modules can follow and be added to the system 1. These service modules can easily be tailored, or new ones created, to meet the needs of each line of business or customer. In addition, the event-based scheduling system 1 is preferably flexible, in that additional event participants and additional products and services providers can be added, and also in that the event participant can access product and service providers outside the system, if needed. Also, the event-based scheduling system is preferably capable of integrating and using one or more existing resource scheduling and personnel calendaring systems as a task and/or sub-task.

The present invention is described below with respect to several exemplary embodiments. The system architecture and system requirements specify exemplary hardware and software tools that can be used with the present invention. These specific tools are for exemplary purposes only and it is contemplated that equivalent tools are also within the scope of the invention.

Preferably, the hardware and software tools are chosen to be standardized and to be compatible with existing hardware and software to the maximum extent possible. The exemplary embodiments are described below to correspond to an exemplary system standardized on a MICROSOFT EXCHANGE™ software platform. This allows the event scheduling package to be tied into, for example, the Calendaring/Email functions of MICROSOFT EXCHANGE™ and this integration provides a significant increase in, for example, employee productivity. In addition, making the system compatible with existing equipment and hardware and building the present invention on top of existing software also allows the system to be implemented more quickly, completely, and at less cost, while at the same time reducing the overall development and implementation time. The present invention also contemplates that other software products can be used to build and implement the system and method of the present invention.

Figure 11:
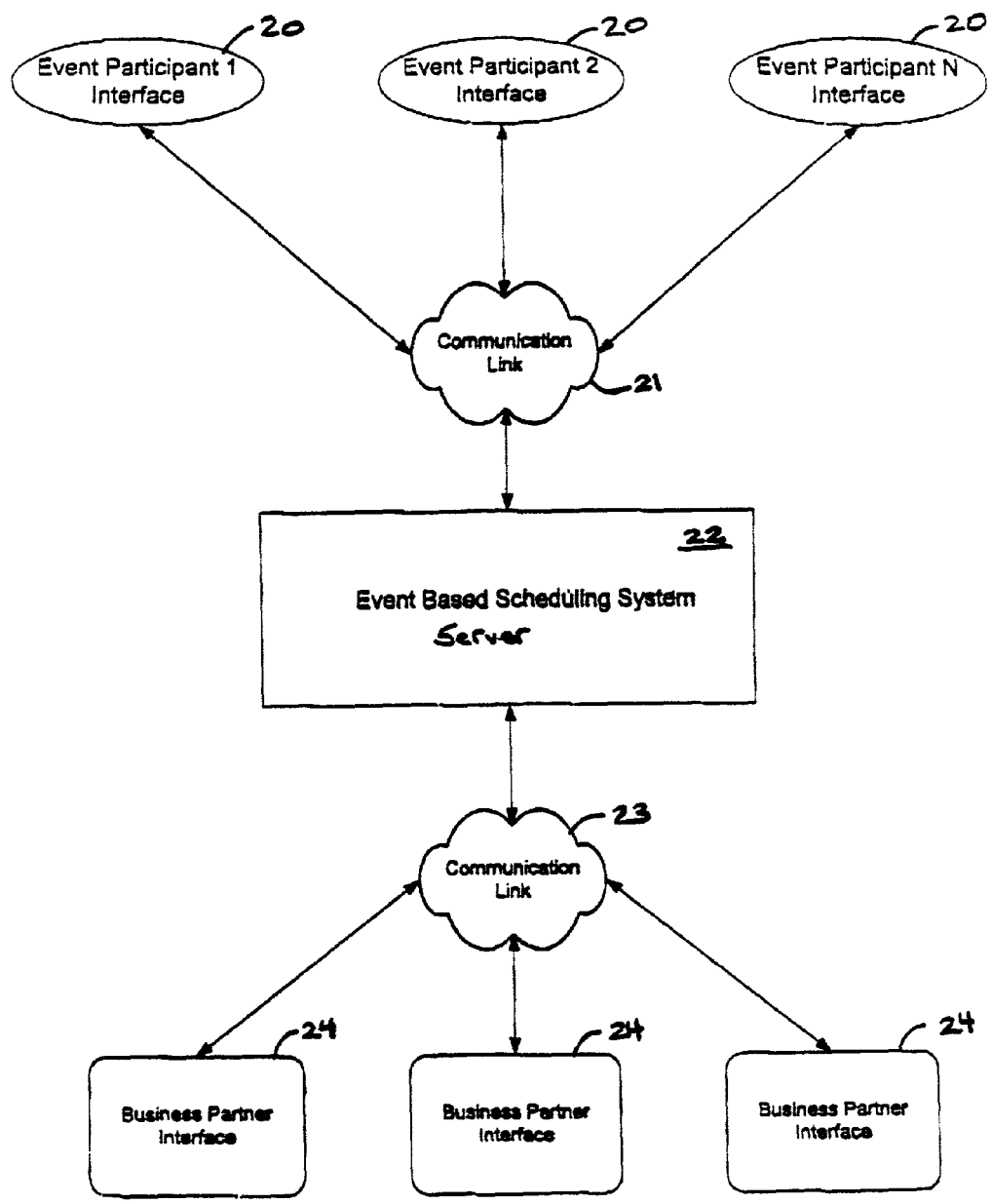
FIG. 11 is a block diagram showing an exemplary system architecture having centralized processing.
Figure 12:
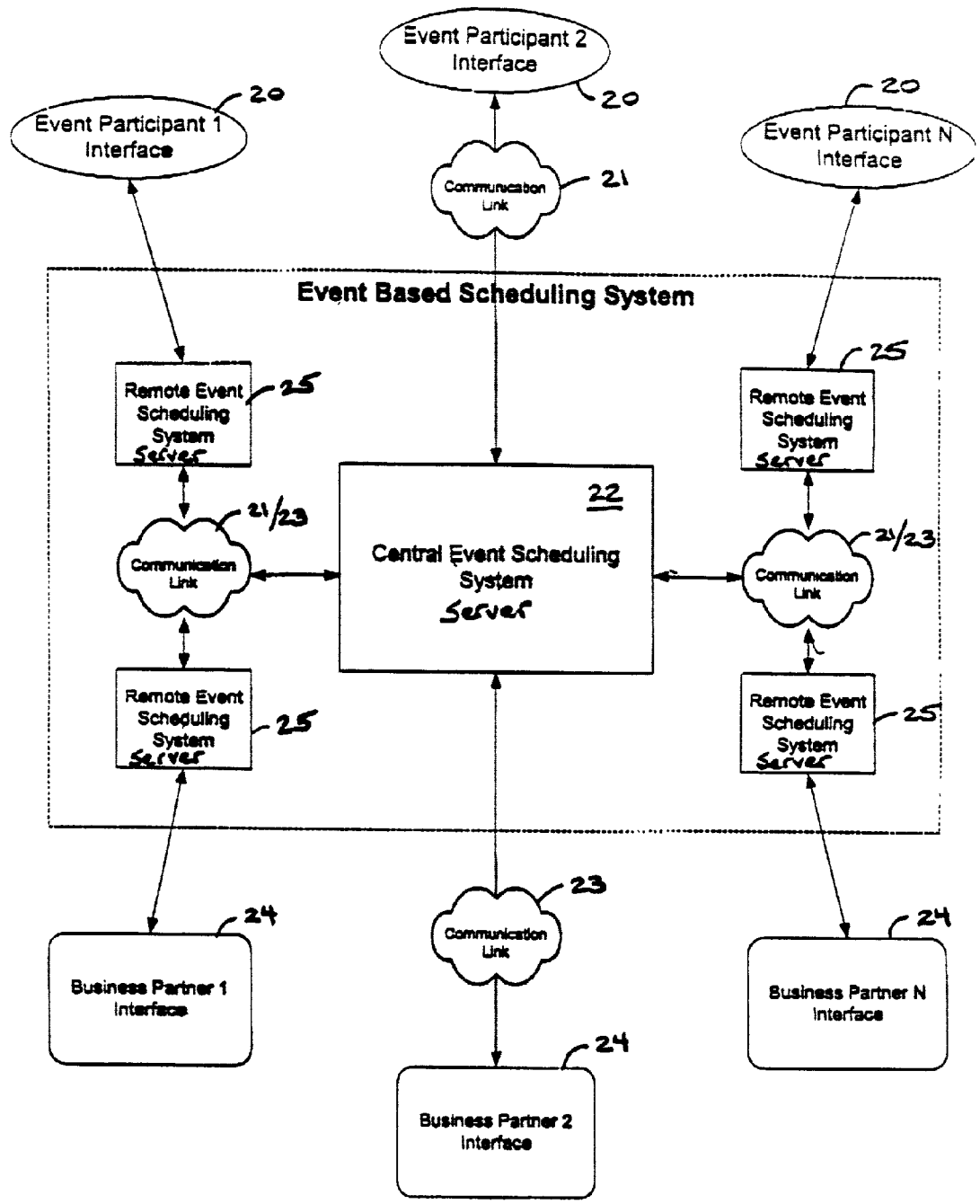
FIG. 12 is a block diagram showing an exemplary system architecture having decentralized processing.
Figure 13:
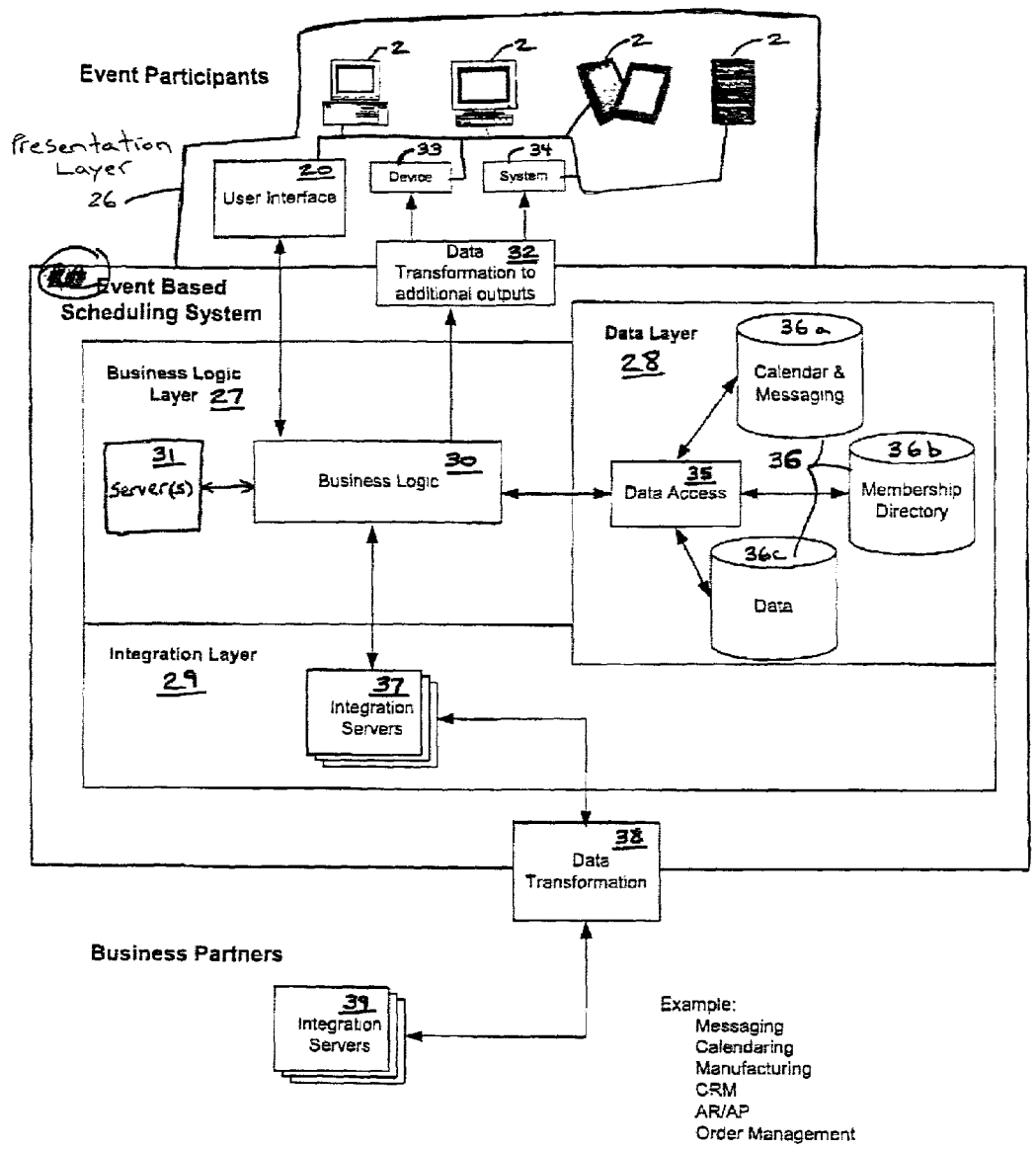
FIG. 13 shows a detailed design of an exemplary system architecture.

III. System Architecture:

FIGS. 11, 12, and 13 show exemplary system architectures that can be used with the event-based scheduling system 1 in accordance with the present invention. FIG. 11 shows an exemplary system architecture having centralized processing that can be used to implement the event-based scheduling system. As shown in FIG. 11, the event-based scheduling system includes one or more front end interface(s) 20, a communications link 21, a system server 22, a communications link 23, and one or more back end interface(s) 24. The communications link 21 and front end interface 20 are provided between one or more event participants and the event-based scheduling system server 22 and the same or another communication link 23 and back end interface 24 are provided between the system server 22 and one or more business partners. The exemplary system architecture of FIG. 11 includes central processing, such as for example an Application Service Provider (ASP) or hosted solution. In this embodiment, the system server(s) 22 and database(s) (not shown) are centrally located and/or hosted by a central processing system. In an embodiment of the event-based scheduling system having hosted and centralized processing and data collection for scheduling events, data relating to the scheduled events can be aggregated and reported for use in benchmarking and business process improvement.

FIG. 12 shows another exemplary system architecture having decentralized processing. In an embodiment having decentralized processing, some of the data, information, and hosting can occur at remote locations external to the central event scheduling system server 22, such as at a client server(s) 25 located behind the firewall of a client, etc., or otherwise external to the central event scheduling system server 22. As shown in FIG. 12, the event-based scheduling system includes one or more event participant interfaces 20, one or more remote event scheduling system servers 25, communications link(s) 21, the central event scheduling system 22, communications link(s) 23, and one or more business partner interfaces 24. This figure shows that different functions can be hosted at different locations. As shown, the event-based scheduling system can be implemented having both a centralized and a decentralized component(s), wherein some event participants and business partners are connected directly into the centralized system server 22 and other event participants and business partners are connected indirectly into the centralized system server 22 through a remote system server 25. This is just another way of implementing the event-based scheduling system of the present invention.

FIG. 13 shows a more detailed design of an exemplary system architecture that can be used to implement the event-based scheduling system. As shown in FIG. 13, the system architecture can be employed using a multi-tier architecture, including, for example, a presentation tier 26, a business logic layer 27, a data layer 28, and an integration layer 29. As shown, the presentation tier 26 has a user interface 20 for accessing the event-based scheduling system and a data transformation interface 32 for outputting information and data to a device 33 or another system 34. The business logic layer 27 includes the business logic 30, such as for example, the individual modules of the tasks and the sub-tasks associated with each event. The business logic layer 27 is connected to the data layer 28 and is capable of accessing and/or storing data and information between the business logic layer 27 and the data layer 28 through a data access interface 35. The data and information can be stored in one or more databases 36, including for example, a calendar and messaging database 36a, a membership directory database 36b, and a database 36c for other data. The databases 36 can include separate databases or partitions within a single database. The integration layer 29 is connected to the business logic layer 27 and includes one or more integration servers 37. The integration server(s) 37 are connected to data transformation devices 38 and to external integration server(s) 39 at remote locations of business partners.

As shown in FIG. 13, the exemplary presentation tier 26 can include a plurality of computing platforms 2, as shown in FIG. 1, that can be used by an event participant for inputting, processing, and displaying data relating to an event and one or more products/services associated with the event. The components of the presentation layer 26 can range from thin to rich clients and the event-based scheduling system 1 is preferably constructed to accommodate the full range of diverse clients and business partners. The event-based scheduling system 1 includes a user interface for the event-based scheduling system 1, which is preferably hosted in an Internet Web browser, such as INTERNET EXPLORER™, or the like. The browser can be used in the presentation tier 26 to access the business logic tier 27 and the data tier 28. The design of the user interface (e.g., browser) preferably conforms to generally accepted principles for user interface design in a Web environment, including the use of graphics and hyperlinks.

In addition, other conventional networking techniques and web-based solutions can be used with the event-based scheduling system 1 of the present invention, including, for example, NETSCAPE NAVIGATOR™. Although the system of the present invention is described as being standardized on INTERNET EXPLORER™, it is contemplated that other suitable web browsers can be used with the present invention. Preferably, the web browser is standardize to be compatible with the other hardware and software of the event-based scheduling system 1 to the maximum extent possible and also provides a robust programming interface. Preferably, the user interface includes technologies that are cross browser (e.g., INTERNET EXPLORER™, NETSCAPE™, and the like) compliant.

As shown in FIG. 13, the business logic tier 27 is connected to the presentation tier 26, preferably using conventional techniques, and includes one or more servers 31, such as a Web server or a Network server. For example, a Web server 31 can be used for authenticating event participants, maintaining access control and security, administering event participant profile data, etc. A network server can include an operating system that provides one or more of class application services, file and print services, communications services, and Web services. Also, the business logic tier 27 can include networking or Web server software that can run on the operating system to process requests received from the computing platforms 2. A plurality of business logic components 30 (including modules for each task) are also provided within the business logic tier 27 to perform predetermined actions on the data and the requests/orders. In addition, the business logic tier 27 can have a transactional processing system for developing, deploying, and managing distributed server applications. In addition, other existing resource management tools, such as AMPLITUDE™ described above, can also be used in the business logic tier to help manage the conference room scheduling.

As shown, the data tier 28 is coupled to the business logic tier 27 and to the presentation tier 26, and may include one or more servers or may share server 31 for maintaining, for example, one or more of a membership directory, membership analysis, and content deployment. The data tier 28 can include a collaborative system (not shown) that supports one or more of communication, information sharing, and the like. The data tier 28 can also include workflow services for managing the scheduled events and the products/services associated with each event. The data tier 28 can also have a relational database or the like that provides storage and retrieval of relational information for storing data relating to the ancillary products and services associated with the event. An event participant can access the business logic tier 27 and the data tier 28 using one of the computing platforms 2, as shown in FIG. 1, at the presentation tier 26. An event or process (and ancillary products and services associated with the event or process) may be scheduled during a single input transaction by the event participant. Preferably, security, such as a firewall or password, is provided to control and limit access to only those persons having authority to access the system and the database(s).

Preferably, the system architecture is an open standard framework that includes a methodology for building distributed applications and includes features such as, for example, scalability, flexibility, interchangeability of components, and transactioning support. The open system architecture also preferably contains components that are capable of extension to meet future application specific requirements (e.g., the system is scalable).

Preferably, the event-based scheduling system 1 includes one or more system servers for handling one or more of the following functions: networking, information management, transactions, access and control, communications and information sharing, and database storage and database management, etc. Preferably, the system also includes server to server synchronization.

The event-based scheduling system 1 includes an operating environment having at least one operating system. Preferably, an operating system is provided at each of the computing platforms for use by an event participant, at each server system, and at each of the product/services providers for use by the product/service provider in processing and fulfilling a request/order for services. One suitable end user or client environment can be a 32 bit version of Microsoft Windows (Windows 95, Windows 98, Windows NT) running on, for example, an Intel based processor. One suitable server environment can be Microsoft Windows NT Server 4.0 running on, for example, an Intel based processor.

A relational database system, such as Oracle Database, can be used with the present invention to link or associate products and services with an event. It is contemplated that other embodiments of the event-based scheduling system 1 can integrate into other conventional relational database systems, such as Oracle Financials, or an object oriented database system, and that the portal data can be move to, for example, Oracle.

The event-based scheduling system 1 also provides for communication among the various tiers and between the event participants, the server, and the various product/service providers. Hypertext Transfer Protocol (HTTP) is preferably the network protocol used to send and receive the web pages (e.g., requests or orders) over the network (e.g., the Intranet, the Internet, or a distributed network). COM, which is the Microsoft binary standard for object interaction, can be used to invoke the business logic components registered in the Microsoft Transaction Server. DCOM, which is the Microsoft binary standard for distributed object interaction, can be available for use if the business logic components are distributed on other NT Servers.

The event-based scheduling system 1 also includes a database environment for storing information that can be accessed by one or more of the event participants, product/service providers, a system administrator, business partner, or the like. Preferably, the servers and databases can be accessed using conventional techniques.

Figure 14:
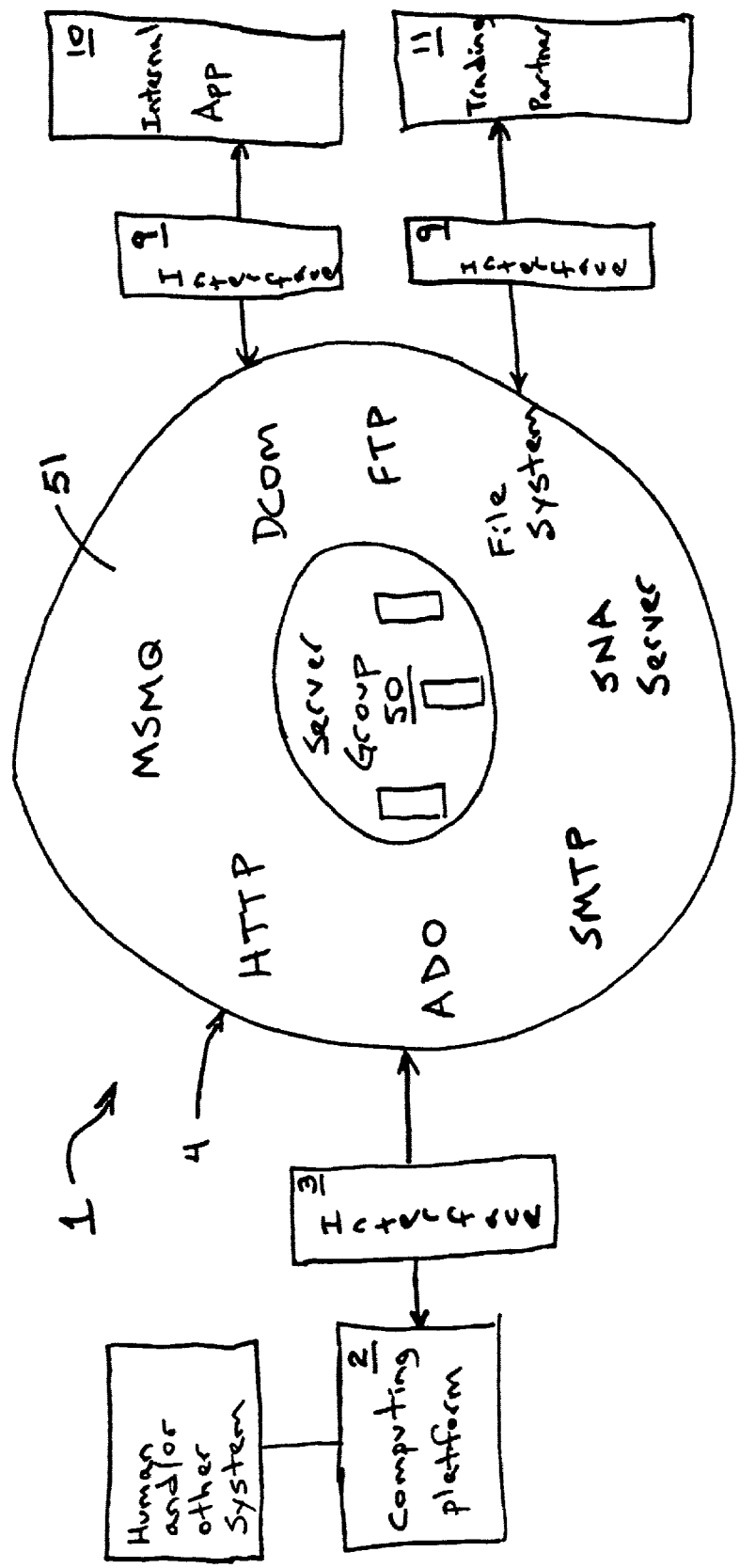
FIG. 14 shows an exemplary e-commerce framework that can be used to implement the event-based scheduling system of FIG. 1.

IV. E-Commerce Framework:

E-commerce is emerging to dominate business to business procurement of products and services. As shown in FIG. 14, the present invention can be used as a gateway through which individual end users can access a wide array of products and services from, for example, their own offices, desks, or mobile location. Accordingly, the system preferably includes integration software to allow fulfillment of the products and service implementation at each end-user site that desires a relationship with other third party service providers or outside vendors.

FIG. 14 shows an exemplary e-commerce integration system that can be used with the event-based scheduling system 1 of the present invention. As shown in FIG. 14, the enabling technology of the present invention preferably includes a server group 50 and the framework 51 to allow the system to bring open standards business to business integration. An event participant can use a computing platform 2 to access the event-based scheduling system 1 through front-end interface 3. The event participant can use server group 50 and the appropriate functionality of the system framework 51 to schedule an event and the provisions to any ancillary products and services associated with the event. Any requests for products and/or services associated with a particular event can be communicated via back-end interface 9 to one or more internal service providers 10 and/or external service provider 11 for fulfillment. Since it is an open standard, the event-based scheduling system 1 can be readily integrated with most conventional resource planning systems, financial systems, calendaring systems, communications (e.g., email) systems, and the like. The open standard architecture of the event-based scheduling system allows multiple outside business partners having conventional systems to be integrated with and interoperable with the event-based scheduling system thereby enabling these service providers having conventional systems to perform service procurement, fulfillment, and reporting.

One suitable enabling technology is Microsoft BIZTALK™ server group 50 and the BIZTALK™ framework 51. The following sections describe an exemplary embodiment of the event-based scheduling system 1 of the present invention using BIZTALK™ as the enabling technology. Other suitable conventional enabling technologies can also be used with the present invention to allow the event-based scheduling system 1 to utilize open standards business to business integration.

Preferably the enabling technology has two main components, a business to business e-commerce framework 51 built on open standards, and a product (e.g., server group 50) that implements the framework on Windows, or the like, and facilitates application integration. The framework 51 preferably allows business to business e-commerce to be implemented by passing messages between partners in a loosely coupled network. This is a time-tested architecture for scalable and reliable transaction processing. All such efforts preferably define message formats that describe the business to be transacted. In an open environment, such efforts face two challenges: integrating dissimilar technology and describing message formats to new partners. As the circle of event participants, service providers, and trading partners widens, so may the mix of hardware and software used by the various partners. Preferably, these partners can be made to communicate without expensive, proprietary networking software. Similarly, when only two partners communicate, it is possible to coordinate programming efforts so that both parties agree on common message formats. As more users and partners are added, however, managing message formats can become a formidable task. New partners may have their own formats in place, requiring translation between the two formats.

The framework 51 may solve these problems in several ways. First, it can promote the use of a variety of Internet protocols for message passing. The primary protocol is preferably HTTP, the protocol that underlies the World Wide Web. Most third-party software intended for messaging or e-commerce has some sort of access to HTTP. Second, it may specify the use of the Extensible Markup Language (XML) for the composition of messages. XML is one conventional standard for data transfer on the Internet. XML does not, of itself, provide any message formats. Rather, it provides a common mechanism for defining new message formats using self-describing data. Third party tools for handling XML are widely available. In addition, the framework preferably has a web site that can provide a central repository for the message formats developed by its members. New users or trading partners may locate needed message format definitions in the repository. Using this information, users can either adopt existing formats or use the information in the repository to specify a translation between their existing formats and the formats found in the repository. In short, the framework 51 preferably functions as a platform for business to business e-commerce that uses the public Internet and open Internet protocols for its implementation.

The server group 50 is an implementation of the framework 51 such as, for example, the Microsoft Windows environment. Server group 50 provides tools for defining message formats, format translations, and complex business agreements defining how event and associated product and service transactions are accomplished through messages passed between users or partners. In addition, server group 50 can preferably implement these agreements by managing the flow of messages and their translation. Although the system may be hosted on Windows, the server group 50 is preferably capable of inter-operating with any suitable framework 51 implementation based on open Internet technologies.

Within an organization, server group 50 can integrate existing business systems into new e-commerce applications. Outside the organization, the server 50 provides a simple and fast way to implement business to business e-commerce. This technology is ideally suited for adoption in the system of the present invention by virtue of the fact that both the system server and the system framework can be built to the same Internet architecture.

The integration of the present invention with a business to business enabling technology, such as that offered by BIZTALK™, offers the advantage of having a gatekeeper of sorts, and thus allows the gatekeeper to better understand and respond to each customer's products/services purchasing patterns or preferences. This may provide a business advantage in what is increasingly becoming a business based on a commodity-like business structure. For example, the business to business purchasing offered by the present invention rapidly drives down the cost of products/services procurement and drives vendors to focus on speed and cost. The system allows a supplier to be in a position to better understand the customer and advise him on product/service delivery. These factors generally cannot be automated and therefore are not readily cast as commodity services. The present invention is an attractive central source for requesting products/services based on an event. Since it is able to request services from multiple vendors and link requested services to an event, it provides an improvement over other conventional service procurement arrangements by virtue of convenience and cost.

The gatekeeper or system administrator may have a role in every transaction whether the gatekeeper supplies the product/service or not. For example, acting for the customer, the gatekeeper can monitor ongoing products/services procurement and recommend improved procurement strategies. It can leverage its aggregate business in local markets to obtain favorable terms from other vendors. Using these tools, the gatekeeper can extend and improve its knowledge of products/services fulfillment to become a better provider of products/services and products/services procurement management.

In addition, the event-based scheduling system 1 of the present invention will preferably cut costs by automating fulfillment functions to the maximum extent possible. Ideally, requests, or orders, entered through the event-based scheduling system 1 will go directly to line of business applications that schedule resources for providing products/services, such as back-end service providers. Preferably, the event-based scheduling system 1 of the present invention incorporates a scheme to integrate those applications with the system in a scalable manner. Alternatively, all such integration may be implemented using custom software. The server 50 is designed to provide gateways to all common methods of interprocess communication. Consequently, the e-commerce framework can be used to streamline the integration task. More importantly, adherence to an accepted e-commerce framework allows customers to use other providers/vendors to fulfill various service functions without leaving the system.

Several exemplary formats have been defined for exemplary services, as well as some base-level schemas that can be used to help develop new service message formats. The schemas define the structure of messages being communicated around the system. As described herein, the schemas can be written in XML and can be read by the same tools that are used to read the massages. Preferably, the system can translate messages in transit and the messages and schema are self-describing. The schemas help define a translation and the enabling software preferably performs the translation automatically when the message is passed. Some exemplary services can include, for example, scheduling conference rooms, audiovisual support services, catering, maintenance and repair, reprographics (document copying), and the like.

Preferably, all the services follow a common structure and the schemas are built on common definitions and reference each other as needed. This lays the groundwork for the development of new service formats. Each service preferably permits various functionalities, including issuing a new request/order and receive a response, modifying or canceling an existing request/order and receiving a response, searching for existing requests/orders based on user criteria and receiving a list of matching requests, etc.

V. System Functionality:

The following section provides an overview of some exemplary system functionality or requirements, including system objectives, end-user interfaces, design constraints, etc. The scope of the event-based scheduling system 1 is to provide integrated access to a wide variety of corporate products and services, including for example, conference room or meeting room location, room capacity, room availability, catering, audio/visual, copying (e.g., reprographics), maintenance and repair, janitorial, mail room and mail distribution, accounting, billing, hotel, temporary labor, temporary office space, concierge, personal assistant services, parking, office equipment and office supplies, and the like. These products and services may be corporate owned and managed, out-sourced, or provided by third party vendors.

Functionally, the event-based scheduling system 1 provides a connected system, preferably a web-based front-end mechanism, which integrates requests for products/services independent from the systems or organization that supply the product/service. The event-based scheduling system 1 and the products/services modules or business logic components 7 receive data directly from an individual event participant (also referred to herein as end-user, customer, or client) at a remote computing platform 2. The event-based scheduling system 1 unifies the enabler (e.g., the event) with various ancillary products and services associated with the event at the event participant location. This allows each end-user to interact directly with each product/service providers. The system portal provides an interface to various back-end systems specific to the particular product or to the management of a particular point of service.

For example, the system and method of the present invention can be used for an exemplary food and support services market wherein an event participant or end user can access the system and schedule the provisions of an event (e.g., a meeting or conference room) and, at the same time, the event participant can also schedule the provisions of one or more ancillary products and/or services (e.g., catering, audio/visual, reprographics, etc.) associated with the event without changing programs or re-entering the data.

Although the system is described with reference to an exemplary system having certain designated functionality, it is contemplated that the scope of the present invention include other anticipated functionality that may be included in other embodiments/versions of the system.

The functional requirements include a general description section, which describes some general factors that affect the system and the system requirements. These factors include system perspective, system functions, user characteristics, and general constraints, as well as assumptions and dependencies.

1. General Description:

The event-based scheduling system 1 is preferably a web-based application running on a connected system or network, such as a LAN, WAN, Intranet, Internet, virtual private network (VPN), or the like. The application can be used to initiate and coordinate requests, or orders, for products and/or services, such as for example, conference rooms, catering, audio/visual, reprographics services, MRO, purchasing, office supplies, mailroom, etc. These services can be requested individually or as an integrated package with conference room scheduling preferably providing the "entry point" and the "tracking mechanism" to the process.

The preferred target audience of the event-based scheduling system can include customers/clients that use any or all of the products/services provided through the portal. These users can be selected from several areas of responsibility. One exemplary event participant can include end users, clients, customers, or service requesters. These individuals are preferably the primary users of the event-based scheduling system 1 of the present invention. These people can initiate, review, and coordinate service requests directly from their desktop, or other suitable electronic device, via the portal. Another exemplary event participant includes service coordinators, or system administrators. These individuals can initiate, review, and coordinate service requests for other individuals within the event-based scheduling system 1.

In addition, exemplary event participants can include product and/or service providers, or vendors. These are individuals that are responsible for filling the request and providing the product and/or service. A product/service provider may be either a department or organization within the company implementing the event-based scheduling system 1 of the present invention or a third party supplier or vendor for products/services. For example, a third party, or outside, product/service provider may be used when the product/service is either not provided by providers within the company, or to fulfill requests when a product/service providers within the company is unavailable or unable to fulfill the request.

The event-based scheduling system 1 can be accessed by the portal server through any number of conventional network connections, such as for example, a local connection, a LAN, a WAN, via an Intranet, via the Internet on a distributed network, or the like. The event-based scheduling system 1 is preferably constructed to provide interfaces to a wide variety of back-end service providers and software packages.

The following is a breakdown of some exemplary business functions that event-based scheduling system 1 can accommodate. The business functions can comprise one or more modules, silos, or business logic components. For example, the modules can include, but are not limited to, at least one of conference room or meeting room location, room capacity, room availability, catering, audio/visual, copying (e.g., reprographics), maintenance and repair, janitorial, mail room and mail distribution, accounting, billing, hotel, temporary labor, temporary office space, concierge, personal assistant services, parking, office equipment, travel arrangements, car rental, transportation, office supplies, and the like.

The conference room scheduling portion of the event-based scheduling system 1 allows authorized users to search for, schedule, and inquire about the availability of conference rooms or meeting locations within an organization, or within the system. This feature is the basis for future "event" scheduling capabilities. As part of the scheduling process, users can order support services such as catering, audio/visual equipment, MRO, and reprographics services during a single user electronic transaction. Preferably, a section for Frequently Asked Questions (FAQs) is provided where users can get information pertaining to the most common scheduling issues. Event scheduling (e.g., meeting location or conference room) is preferably the foundation and tracking mechanism of the event-based scheduling system 1.

The event-based scheduling system 1 allows authorized users to request catering for an event. Catering requests can range from simple pre-packaged menu items to full-service custom events. In order to expedite simple requests, an "Express Service" option can be available with more complex requests handled by a "Full Service" option. Catering can be requested directly or as a supporting service during conference room/event scheduling. Preferably, a section for FAQs is provided where users can get answers to the most commonly asked catering questions.

The copy center portion of the portal allows authorized users access to a wide range of printing and reproduction services. For example, these services may range from simple copier style reproductions provided by an "in-house" organization to full-color high-impact graphics solutions provided by third party contractors. In order to expedite simple requests, an "Express Service" option can be available with more complex requests handled by a "Full Service" option. Requests for copy center services can be made directly or as a supporting service during conference room/event scheduling. Preferably, a section for FAQs is provided where users can get answers to the most commonly asked copy center questions.

Authorized users of the event-based scheduling system 1 also can request Maintenance/Repair/Operations (MRO) support. Requests can range from simple support services, such as requests for keys or janitorial support, to complex requests for building construction and relocation support. MRO services can be requested directly or as a supporting service during conference room/event scheduling. Preferably, a section for FAQs can be provided where users can get answers to the most commonly asked MRO questions.

The mailroom is responsible for shipping, receiving and where practical, tracking all physical items that enter or leave the corporate environment in less-than-truckload "LTL" quantities. The portal allows authorized users to request and track the status of all mailroom services and provide integration to other services such as, for example, Pierce Leahy Box Ordering. Preferably, when used as part of the fully integrated event scheduling function, the event-based scheduling system 1 allows items to be held or diverted during times of extended travel. Preferably, a section for FAQs can be provided where users can get answers to the most commonly asked mail room questions.

An exemplary operating environment was described above with respect to the system architecture. One suitable operating environment for use with the event-based scheduling system 1 of the present invention is further defined below to have the following general constraints.

The operating system for the event-based scheduling system 1 is preferably determined based on the particular application and customer requirements. In one embodiment, the operating system for the data server can be Microsoft Windows NT 4.0 Server SP5.

The Web host for the event-based scheduling system 1 can employ Microsoft Internet Information Server 4.0 as the web server software. The operating system for the web server can be Microsoft Windows NT 4.0 Server SP5.

The object broker for the event-based scheduling system 1 can be the Microsoft Distributed Component Object Manager (DCOM) that is incorporated into the Windows NT operating system.

The Transaction Monitor for the event-based scheduling system 1 can be the Microsoft Transaction Service (MTS), the monitor that is incorporated into the Windows NT operating system.

The system can be accessed from computers running the Microsoft Internet Explorer 4.01A web browser on Microsoft Windows 9X or Microsoft Windows NT 4.0 or higher operating system. In addition, the event-based scheduling system 1 can preferably support access from PDAs or other Windows CE devices, as well as hard wired and wireless devices.

The event-based scheduling system 1 permits users to connect through conventional network connection techniques, such as a high-speed local area network connection. The connectivity also allows connection to high-speed wide area network connections and remote access methods (e.g., 56 k modems over analog telephone lines). In addition, the present invention contemplates that the connectivity can be accomplished using hard-wired or wireless means. This connectivity preferably allows collaboration across systems and across companies or divisions within a company.

2. Specific Requirements:

The following specific requirements section contains exemplary information and one suitable design in support of the overall system requirements. This section identifies the functional requirements and design constraints associated with several exemplary business logic components, or modules, that can be used with one exemplary embodiment of the event-based scheduling system. The examples given are for exemplary purposes only, and are not intended to limit the scope of the invention in any way.

Figure 15:
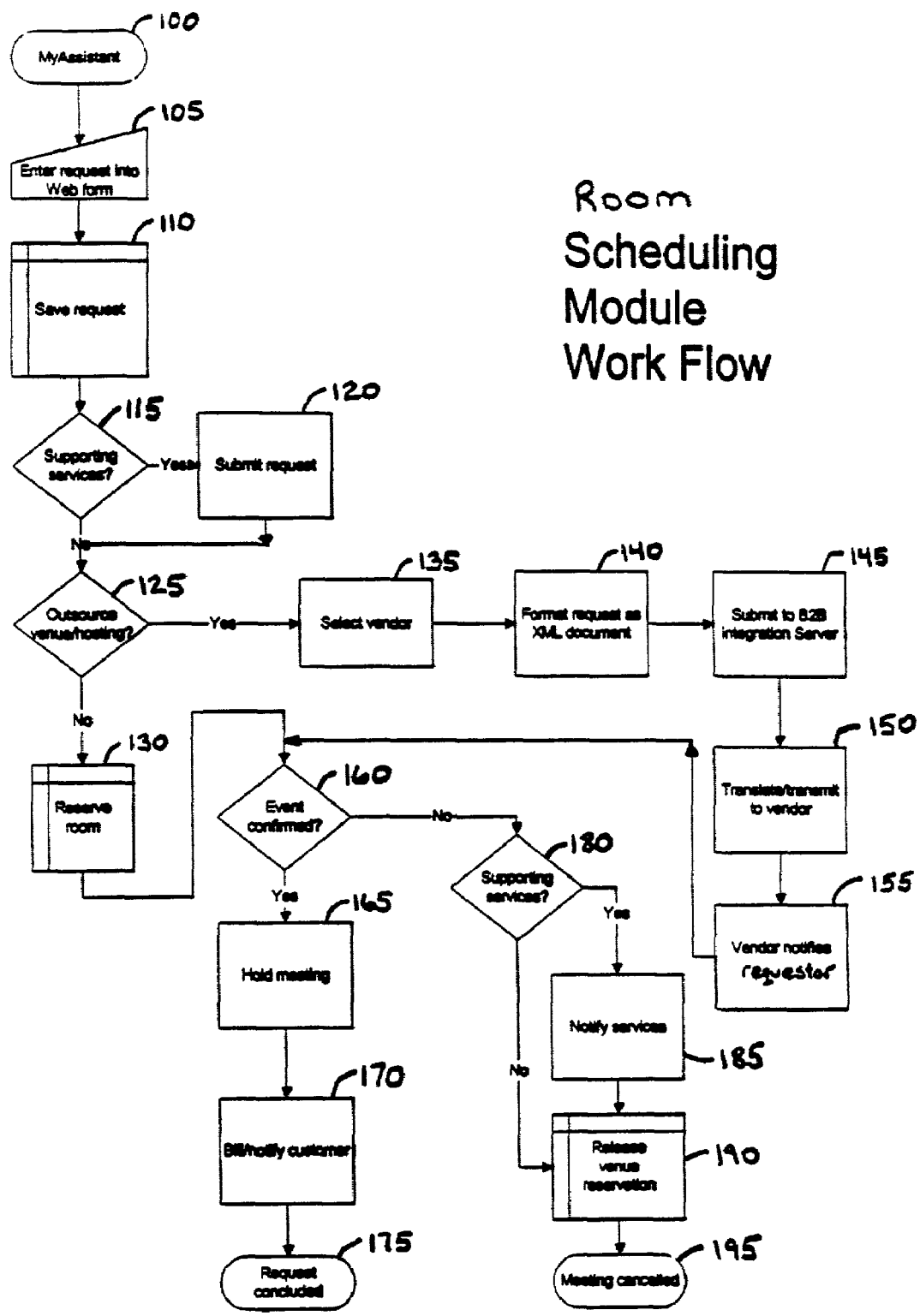
FIG. 15 is a flowchart of an exemplary process for scheduling a room in accordance with the present invention.

FIG. 15 shows an exemplary process for event scheduling having an e-commerce capability in accordance with the present invention. The event-based scheduling system 1 automates requests for event scheduling. It preferably provides an intuitive user interface that allows the end-user to leverage graphical interfaces to schedule an event and to allow the system to transact e-commerce. The system is also preferably constructed to allow an event participant to cancel or modify a previously scheduled event. In addition, the system provides for real-time status monitoring of previously scheduled events.

As shown in FIG. 15, an event participant can access the event-based scheduling system 1 at step 100 and can enter a request for an event into a Web form at step 105. After the event participant has entered the requested information, the information can be saved, at step 110. The event-based scheduling system 1 then prompts the event participant as to whether ancillary products or services will be required to support the event, at step 115. If yes, then the event participant can generate and submit a request for support services at step 120. FIGS. 16 through 19 and description relating to those figures provide several exemplary processes for requesting/ordering ancillary services in support of an event.

Various service providers, including internal providers and external vendors, can fulfill the request for ancillary services. The event participant selects whether the event request will be outsourced for fulfillment or hosting at step 125. If the catering request is not outsourced, the process continues, at step 130, and the internal meeting location or conference room is reserved. The event scheduling process then continues at step 160, described more fully below. However, if the catering request is outsourced for venue or meeting hosting, then the process continues at step 135 where the event participant can select a hosting vendor. The event request is formatted for communication via the Internet to the fulfillment or hosting vendor, at step 140, as, for example, an XML document. The formatted order can then be submitted to a business to business integration server at step 145, where it can be translated and transmitted to the hosting vendor at step 150. The vendor can acknowledge receipt of the event request at step 155. Optionally, the vendor can verify or guarantee fulfillment of the event request.

After the vendor acknowledges receipt of the event request at step 155, the system moves to step 160 where the event participant can confirm the event. If the event is confirmed, the event is held at the appropriate time and place, at step 165. The system can provide for billing/notification, at step 170. The event request is then concluded at step 175.

However, if the event is not confirmed at step 160, then the event-based scheduling system 1 determines whether there were any supporting services associated with that event, at step 180. If there were ancillary services associated with the particular event, then the event-based scheduling system 1 notifies, preferably automatically, the appropriate services and cancels those services, at step 185. The event-based scheduling system 1 releases the event request or venue reservation at step 190. The event or meeting is canceled at step 195.

In one embodiment, the event or conference room scheduling module of the event-based scheduling system 1 is targeted for use within a predetermined environment and automates the process of reserving a conference room. The event-based scheduling system 1 can also provide a variety of capabilities for administering and reporting on these requests. The event-based scheduling system 1 provides an intuitive user interface that allows the end-user to perform one or more functions, including: providing the user with a method for displaying, reserving, changing, and canceling conference rooms; providing the end-user with a method for submitting a room scheduling conflict; providing the end-user with a method for searching for available conference rooms; providing a FAQ section providing answers to the most commonly asked questions. The event-based scheduling system 1 also provides the end-user with a method for ordering one or more of the following ancillary services for a reserved conference room, including, but not limited to an A/V equipment request, a room setup request, a reprographic request, a catering request, or the like.

The event-based scheduling system 1 is preferably constructed such that any meeting location or conference room cancellations or modifications will automatically cancel or modify any ancillary services associated or linked with the event. In addition, a hardcopy response may be generated, such as an e-mail notification, to cancel or change any associated ancillary service. Preferably, the event-based scheduling system 1 is constructed to automatically modify (e.g., cancel or reschedule) any ancillary services linked to the event based on a change to the event. Likewise, any requests for services, such as AV equipment, will preferably check the availability of the equipment. Therefore, the event-based scheduling system 1 will preferably automatically resolve any resource or service conflicts. Conflict resolution among event participants can be resolved using a predefined system hierarchy, such as, for example, using one of an event participant title, an event participant rank, an event participant seniority, an event priority, and the like.

The meeting or conference rooms available for scheduling by an event participant can include the following general attributes:

| Exemplary Conference Room Data Elements | Description |
| --- | --- |
| Name | The name associated with the conference room |
| Description | A brief description of the conference room |
| Directions | Instructions on how to find the conference room |
| Turnaround Time | The amount of time required to prepare the room between requests |
| Size | The dimensions of the room (Square footage) |
| Capacity | The number of people that the room is intended to hold |
| Layout | The available layouts for the conference room |
| Phone Numbers | The phone numbers of the phones located in the conference room. |

The Conference Room Scheduling interface may request that the end-user enter the following exemplary information:

| Exemplary Room Request Data Elements | Description |
|---|---|
| Contact Name | The individual that should be contacted for issues about the conference room<br>*Defaults to the user's name |
| Contact Phone Number | The number used to locate the individual specified in the Contact Name field<br>*Defaults to the user's number |
| Profit Center/ Cost Center | The profit center that should be billed for any charges (e.g., a computer projector may be billed at $100 a day)<br>*Defaults to the profit center stored in the user's profile |
| Meeting Description | An optional description for the meeting that will be displayed |
| Location | This is a list of conference rooms available for scheduling |
| Begin Date and Time | The date and time the user needs the conference room |
| End Date and Time | The date and time the user is finished with the conference room |
| Number of Attendees | The number of people attending the meeting |
| Layout | The available layouts for the conference room |
| AV Equipment<br>Computer Projector<br>Electronic Whiteboard<br>Slide projector<br>Overhead projector<br>VCR and Monitor<br>Screen<br>Lectern<br>Microphone<br>Conference Telephone<br>Video conferencing | The AV equipment that can be used in the room |

In addition, the meeting/conference room scheduling subsystem of the event-based scheduling system can include the following features:

Advanced Scheduling: An interface for scheduling recurring conference room requests or extended conference room usage requests.

Advanced Searching: An interface for searching for a conference room by optimal, best fit, or by the name of the participants. This interface can also display images of the conference rooms.

Ancillary Service Rescheduling: An end-user interface for displaying, modifying, and deleting ancillary services for a reserved conference room.

Administration: An interface for adding, removing, and shutting down conference rooms. This interface could track resource inventory and service items and be configured to place an automated phone call when a meeting is scheduled to end.

Reporting: An end-user interface that would provide informative reports with respect to room usage, individual usage, equipment usage, scheduled ancillary services by conference room, etc.

Ask the Experts: An interface that displays frequently asked questions and answers pertaining to events, services, products, equipment, etc.

Integration: Optional integration with commercial scheduling packages, such as for example MICROSOFT EXCHANGE™ or AMPLITUDE™.

Other Devices: Support for PDA, electronic devices, other Windows CE devices, and the like.

Figure 16:
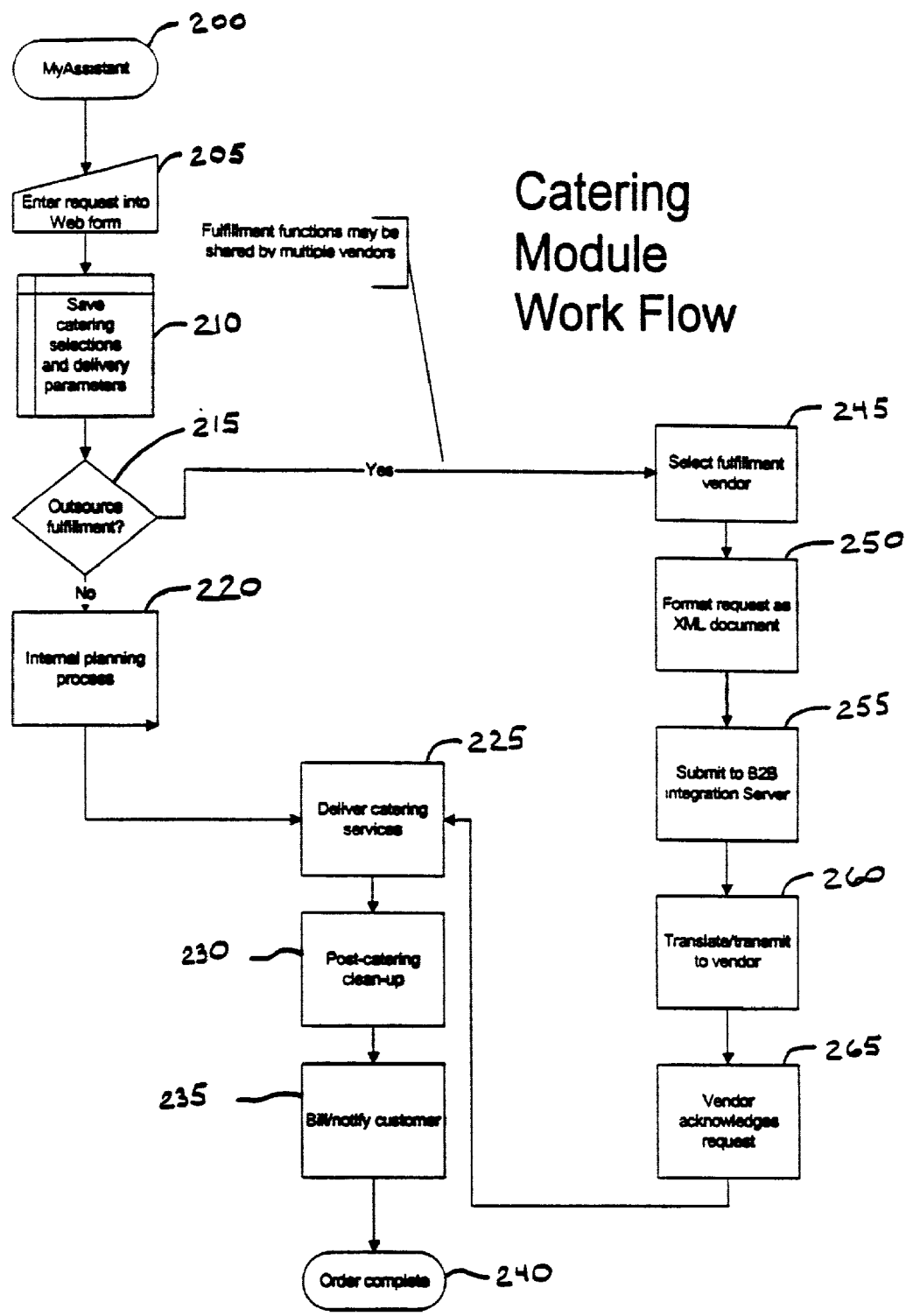
FIG. 16 is a flowchart of an exemplary process for scheduling a catering service associated with an event in accordance with the present invention.

FIG. 16 depicts an exemplary catering module workflow process for processing catering requests. As noted above, the event-based scheduling system 1 automates requests for catering services. It preferably provides an intuitive user interface that allows the end-user to leverage graphical interfaces to generate catering requests for an event and to allow the event-based scheduling system 1 to transact e-commerce to order catering services. The event-based scheduling system 1 is also preferably constructed to allow an event participant to cancel or modify a catering request. In addition, the event-based scheduling system 1 provides for real-time status monitoring of previously submitted requests for catering services.

As shown in FIG. 16, an event participant can access the event-based scheduling system 1 at step 200 and can enter a request for catering services into a Web form at step 205. After the event participant has entered the requested information, the information can be saved as well as the delivery parameters specified by the event participant or defaulted to by the system, at step 210. The catering request can be fulfilled by various means, including internal or external providers and vendors. The event participant selects whether the catering request will be outsourced for fulfillment at step 215.

It should be noted that information that is common across multiple tasks need not be re-entered for each individual task because the tasks are integrated with the event and common data is shared across multiple tasks and sub-tasks. For example, data relating to the meeting room scheduling of FIG. 15 that is common to data relating to catering scheduling of FIG. 16, preferably does not have to be re-entered since these tasks are associated with the same event and/or process and therefore the data can be shared across the integrated tasks.

If the catering request is not outsourced, the process continues at step 220 where the internal planning process is commenced. The internal planning process includes planning the delivery of the catering services at the specified time and location at step 225. The system can also provide for post-catering clean up at step 230 and for the billing and notification of the customer at step 235. The catering request or order is then complete at step 240.

If the catering request is outsourced, the process continues at step 245 where the event participant can select a fulfillment vendor. The catering order is formatted for communication via the Internet to the fulfillment vendor, at step 250, as, for example, an XML document. The formatted order can then be submitted to a business to business integration server at step 255, where it can be translated and transmitted to the fulfillment vendor at step 260. The vendor can acknowledge receipt of the catering request at step 265. Optionally, the vendor can verify or guarantee fulfillment of the catering request.

After the vendor acknowledges receipt of the catering request at step 265, the system returns to step 225 for delivery of the catering services. Planning of the post-catering clean-up, step 230, and billing/notification, step 235, can also occur prior to the completion of the catering order at step 240.

In an alternative embodiment (not shown), the administrator of the catering department can receive notifications about new catering requests. For example, this can be accomplished by submitting electronic requests to a common email address associated with the catering department, by faxing, etc. In order to facilitate notification of new catering requests, the request can be available for printing to a local printer located in the catering department. Therefore, the administrator could either monitor the email account associated with the catering department or periodically check the printer for new requests. Preferably, the email notification can be formatted with separate pages for kitchen, manager, billing, corkboard, and the like, in order to maintain the current workflow and ensure the proper paperwork is available to the appropriate staff. Upon receiving a request, the designated catering department or administrator would be responsible for processing it.

The system can include multiple levels of catering services, such as, for example, an express catering option and a full catering option. An express catering service option can allow the end-user to enter the minimal amount of data required to generate a standard catering request. Specific details about the end-user can be obtained from the profile associated with the end-user's log-on name. Preferably, the express catering request may request that the end-user enter the following exemplary event information:

| Exemplary Data Elements for the Event | Description |
| --- | --- |
| Event Name | Optional name for the event |
| Common Location | This is a list of rooms that can be used for Catering events. (e.g., Conference rooms) |
| Event Start Date and Time | The date and time that the event starts |
| Event End Date and Time | The date and time that the event ends |
| Number of Guests | |
| Contact Name | The individual that should be contacted for issues about the catering request |
| Contact Phone Number | The number used to locate the individual specified in the Contact Name field |
| Profit center/ Cost Center | The profit center that should be billed for the request *Defaults to the profit center stored in the users profile |

For example, the default event settings for the express catering service module can be as follows:

| Exemplary Data Elements | Default | Description |
| --- | --- | --- |
| Date and Time for setup | 15 minutes before the event starts | When the room should be setup |
| Date and Time for clean up | At the end of the event | When the room should be cleaned up |

Once the event information has been specified the event participant can enter catering information. The end-user can specify the following information for each meal required for the event:

| Exemplary Data Elements for a meal | Description |
| --- | --- |
| Meal Selection Breakfast Lunch Dinner Snack | The type of meal |
| Menu Selection | This category is limited by the Meal Selection. It will contain the items listed on a menu for a particular meal. |
| Date and Time of Delivery | When the food should be delivered *May be restricted based off of the Meal Selection (e.g., Breakfast is served between 9:00 AM and 11:00 AM) |
| Number of Orders | The number of guests for this meal. |
| Special Dietary Needs None Vegetarian Diabetic Lactose Intolerant Food Allergies Special Order | Special orders or clarifications of selected dietary needs are described in the Special Instructions area. |
| Special Instructions | Free form text in which the user can specify instructions for processing the catering order |
| Extras None Ice Carving Linen Candles Flowers Water Pitcher Glasses Check Room Food for Entertainers Special Order | Additional information or clarifications of the extras requested are described in the Special Instructions area. |

The full catering service option provides the end-user with the ability to order food for locations outside of the building and also provides more options for customizing a catering request. Preferably, the full catering module prompts the event participant and requests the user to enter the following general event information:

| Exemplary Data Elements for the Event | Description |
| --- | --- |
| Event Name | Optional name for the event |
| Location Common Other | The Common Location contains a list of rooms within the building that can be used for Catering events. (e.g., Conference rooms) |
| Other Location Address | The address is required if the user chooses Other for the Location |
| On site contact Address 1 Address 2 City State Zip Special Directions | |
| Date and Time of the Event | The date and time that the event starts |
| Date and Time for setup | When the room should be setup |
| Date and Time for clean up | When the room should be cleaned up |
| Maximum Number of Guests | |
| Contact Name | The individual that should be contacted for issues about the catering request |
| Contact Phone Number | The number used to locate the individual specified in the Contact Name field |
| Payment Type Profit Center | If the user chooses costs center the profit center stored in the user's profile will be displayed |

-continued

| Exemplary Data Elements for the Event | Description |
| --- | --- |
| Credit Card Invoice | If the user chooses Credit Card the user will be required to enter a Credit Card # If the user chooses Invoice the billing address will be required. |
| Billing Address Name Address 1 Address 2 City State Zip | |

Once the event information has been specified, the user can enter catering information. The catering information will be the same information as that gathered for the express catering service option discussed above.

The event-based scheduling system 1 may also include a catering business logic component or module that can automate catering requests and provide a variety of capabilities for administering and reporting on these requests. The following is an overview of some of the additional functionality that can be provided:

Order Tracking: An end-user interface for displaying/modifying/deleting requests previously submitted to catering.

Administration: An end-user interface for processing and confirming requests submitted to catering.

Reporting: An end-user interface that would provide informative reports with respect to trends in ordering (for example, money volume, number of orders, catering per room by value, etc.), billing, sales, and number of rooms without catering orders.

A FAQ section.

In addition, the event-based scheduling system 1 can include customizable online menus. These customizable online menus can provide images, ingredients, prices, and descriptions of the different menu items available from catering. In addition, the event-based scheduling system 1 may provide for the advertising of seasonal and holiday foods, as well as merchandise available from the catering department or vendor.

Figure 17:
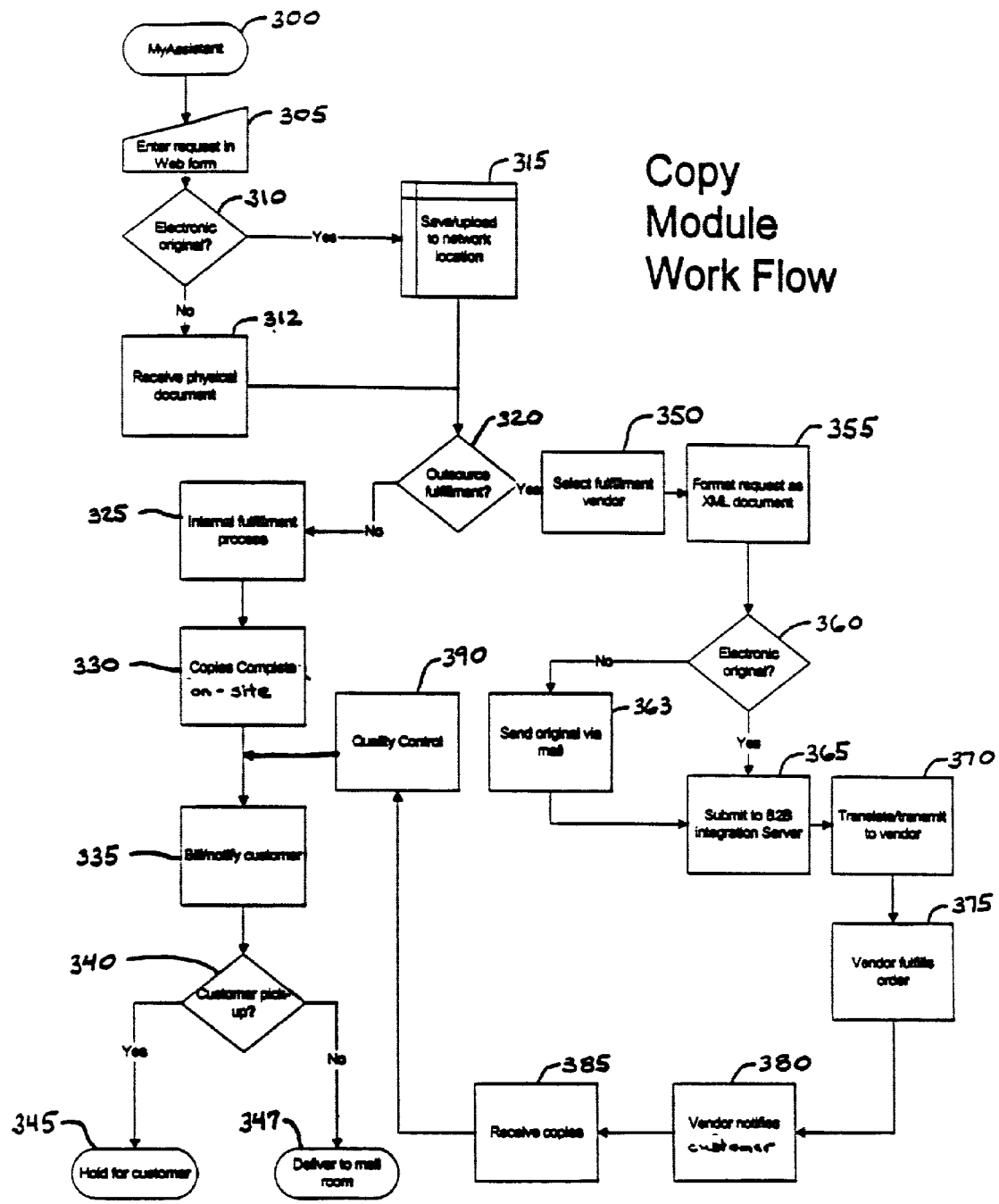
FIG. 17 is a flowchart of an exemplary process for scheduling a copying service associated with an event in accordance with the present invention.

FIG. 17 depicts an exemplary copy center business logic component, or module, workflow process for processing copying requests. As noted above, the event-based scheduling system 1 automates requests for copying (e.g., reprographic) services. The event-based scheduling system 1 preferably provides an intuitive user interface that can include an express copy service, a full copy service option, and a section for FAQs. The end-user can leverage graphical interfaces at their computing platform to generate a reprographic service request that details the document that should be reproduced and the actions that should be performed. The event-based scheduling system 1 is also preferably constructed to allow an event participant to cancel or modify a copying request. In addition, the event-based scheduling system 1 provides for real-time status monitoring of previously submitted requests for copying services.

Several alternative methods can be used for submitting the reprographic service requests to the copy center. In the event that the user has a non-electronic document that needs to be reproduced, the user interface can provide a way to generate a hard copy of the request that can be printed and attached to the document. Alternatively, in the event that the user has an electronic document that needs to be produced, the user interface can provide a way to submit it, or its location, along with the request.

As shown in FIG. 17, the exemplary copy module workflow process starts by an event participant accessing the event-based scheduling system 1 at step 300. The event participant enters a request for copying services into a Web form at step 305. After the event participant has entered the requested information, the system prompts the event participant to indicate whether the original is an electronic copy, at step 310. If the document is not an electronic document, then the document is received at step 312. If the document is an electronic document, then the electronic document is saved or uploaded to a network location, at step 315.

The event-based scheduling system 1 then prompts the event participant at step 320 to indicate whether the copying order should be outsourced for fulfillment of the copy order. If the copy order is not designated for outscourcing, then the process continues at step 325, where the internal fulfillment process commences. At step 330, the copying is completed on-site by the internal copy department. The appropriate billing and notification of the requestor and customer can be accomplished by the system, at step 335. The system determines whether the copies will be picked-up at step 340. If the customer will pick-up the copies, then the copies are held at step 345 for customer pick-up. If the customer is not picking up the copies, then the copies are delivered to the mailroom at step 347, for later delivery to the customer/requestor.

On the other hand, if the copy order is designated for outscourcing at step 320, then the process continues at step 350, where the event participant selects an outside copy vendor for fulfillment of the copy order. The copy order is formatted for communication to the outside copy vendor, at step 355, as, for example, an XML document. It is then determined whether the original is an electronic copy at step 360. If the copy is not an electronic copy, then the original copy can be sent to the vendor at step 363, via, for example, the regular mail. If the copy is an electronic copy, then the electronic copy is submitted to a business to business integration server at step 365. The electronic copy is translated and transmitted to the vendor at step 370. The vendor fulfills the copy order at step 375 and then notifies the event participant/customer at step 380. The copies are delivered back to the event participant/customer at step 385, and the copies are preferably checked at step 390 to ensure that they are acceptable to the customer. The system then returns to step 335, where billing and notification are accomplished.

In an alternative embodiment, the administrator of the copy center may only receive notifications about new reprographic service requests. This can be accomplished by submitting electronic requests and attached documents to a common email address associated with the copy center. The administrator would be required to periodically monitor this email account for new requests. Upon receiving a request the administrator would be responsible for printing it, saving or retrieving the document specified in the request, and processing it.

The system can include multiple levels of copying services, such as, for example, an express copying option and a full copying option. The express copy service option allows the end-user to enter the minimal amount of data required to generate a standard reprographic request. Specific details about the user can be obtained from a profile associated with his or her logon name. The reprographic request can be processed with the default copy settings and can request that the event participant enter the following exemplary information:

| Exemplary Data Elements | Description |
|---|---|
| Files or File Locations | The files the user wants processed |
| Number of Copies | The number of copies the user is requesting |
| Number of Originals | The number of pages that comprise the document |
| Contact Name | The individual that should be contacted for issues about the reprographic request |
| Contact Phone Number | The number used to locate the individual specified in the Contact Name field |
| Profit Center/ Cost Center | The profit center that should be billed for the request *Defaults to the profit center stored in the users profile |

For example, the default copy settings for the express copy service can be as follows:

| Exemplary Data Elements | Default | Description |
|---|---|---|
| Paper Size | Letter (8.5 × 11) | The size of the stock |
| Paper Type | White Bond | The type of the stock |
| Sided | Single | |
| Copy Type | Black and White | |
| Staple | Unstapled | |
| Punched | Unpunched | |
| Bindings | Unbound | |
| Collate | Collated | |
| Priority | No | |
| Requesters Name | | Obtained from the Users Profile |
| Requesters Phone Number | | Obtained from the Users Profile |
| Delivery Method | Pickup | |

The full copy service option can provide the user with the ability to customize the reprographic request. The user can have the option of selecting from a wide variety of options offered by the copy center. The following shows preferred information that can be collected and the options that can be selected.

| Exemplary Data Elements | Description |
|---|---|
| Files or File Locations | The files the user wants processed |
| Number of Copies | The number of copies the user is requesting |
| Number of Originals | The number of pages that comprise the document |
| Requested Date & Time | The date and time the user would like the documents |
| Paper Size Letter (8.5 × 11) Legal (8.5 × 14) Tabloid (11 × 17) | |
| Paper Type White Bond Color Bond Company Letterhead Company Memorandum Transparencies Pad User Specified | The type of the stock |
| Sided | |

-continued

| Exemplary Data Elements | Description |
|---|---|
| Single Double Copy Type Black and White Color Staple Unstapled Upper left Upper Right Booklet left User Specified Punched Unpunched Standard 3 hole_ User Specified Bindings Unbound XEROX 5090 Tape GBC (spiral) Glue User Specified | |
| Collate (Collated) | Indicates whether the documents should be collated |
| Priority (No) | Indicates whether this request is urgent |
| Special Instructions | Free form text in which the user can specify instructions for processing the document |
| Contact Name | The individual that should be contacted for issues about the reprographic request |
| Contact Phone Number | The number used to locate the individual specified in the Contact Name field |
| Profit Center/ Cost Center | The profit center that should be billed for the request *Defaults to the profit center stored in the user's profile |
| Delivery Method Pickup Deliver Send to Ship to | Indicates how the documents should be delivered *Return to requester will obtain the requester's name from the user's profile. |
| Recipient (Send to) | Used to designate who should receive the documents |
| Deliver Address (Ship to) Name Address 1 Address 2 City State Zip | Used to ship the document to a location outside of the company location |
| Shrink Wrap (No) | Packaging option |

In addition, the copying center service item module of the event-based scheduling system 1 preferably automates requests for reprographic services and provides a variety of capabilities for administering and reporting on these requests. The following is an overview of some general functionality that can also be provided:

Full Copy Service: Provide images and descriptions of the different types of services available from the copy center (e.g., types of bindings or stock).

Faxing: An end-user interface for submitting a document to the copy center for faxing.

Job Tracking: An end-user interface for displaying, modifying, and deleting requests submitted to the copy center.

Administration: An end-user interface for processing and prioritizing the jobs submitted to the copy center. This interface would also allow copy center administrator(s) to track the number of requests and the costs associated with each request.

Reporting: An end-user interface that would provide informative reports with respect to job tracking, billing, departmental usage, etc. This would enhance or replace the functionality, such as that performed in Excel, and optionally could be integrated into a company's corporate billing package.

Integration: Integration with third party vendor's services, such as, for example, Kinko's, Sir Speedy, or the like.

Figure 18:
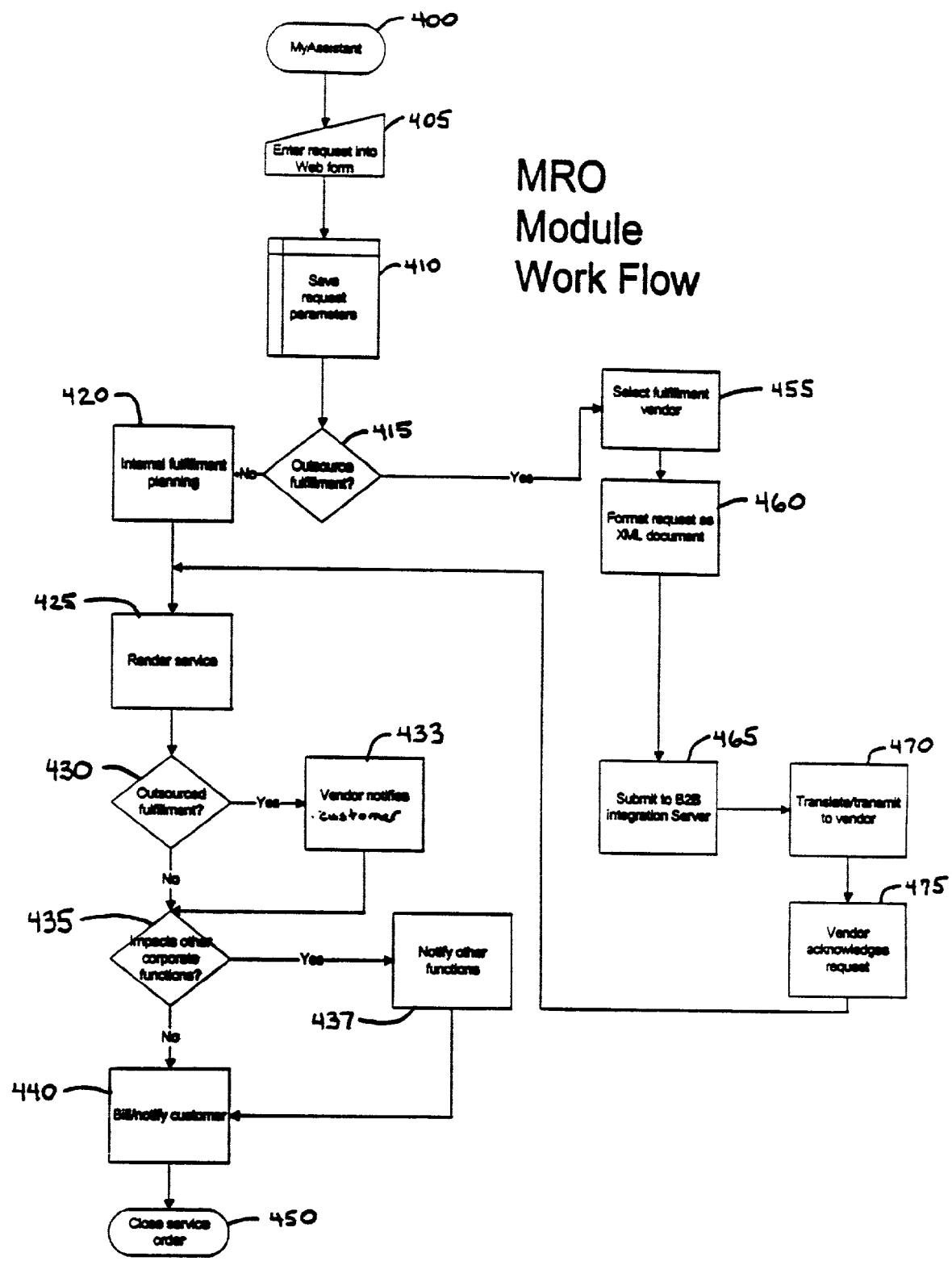
FIG. 18 is a flowchart of an exemplary process for scheduling a maintenance and repair service associated with an event in accordance with the present invention.

FIG. 18 depicts an exemplary Maintenance and Repair Organization (MRO) module workflow process for processing MRO requests. The MRO module of the event-based scheduling system 1 automates requests for MRO services and provides a variety of capabilities for administering and reporting on these requests. For example, the MRO interface preferably allows an end-user to request janitorial service, request minor maintenance, request major maintenance, and the like. It preferably provides an intuitive user interface that allows the end-user to leverage graphical interfaces to generate MRO requests for an event. The event-based scheduling system 1 is also preferably constructed to allow an event participant to cancel or modify a MRO request. In addition, the event-based scheduling system 1 provides for real-time status monitoring of previously submitted requests for MRO services.

As shown in FIG. 18, an event participant can access the event-based scheduling system 1 at step 400 and enters a request for MRO services into a Web form at step 405. After the event participant has entered the requested information, the information can be saved, at step 410. The MRO request can be fulfilled by various means, including internal providers or external vendors. The event participant selects whether the MRO request will be outsourced for fulfillment at step 415.

If the MRO request will not be outsourced, then the process continues at step 420 where the internal fulfillment planning occurs. The requested services are completed at step 425. The event-based scheduling system 1 then determines whether the services were outsourced at step 430, and if the MRO services were not outsourced, then the system determines whether the rendered services impacted other functions within the organization, at step 435.

If it is determined at step 435 that the rendered services impact other functions, then those other functions can be notified at step 437. The system then continues to step 440. Also, if it is determined at step 435 that the rendered services do not impact other functions, then the system continues directly to step 440. At step 440, billing and notification of the requestor/customer can occur. The MRO service request/order is then closed at step 450.

On the other hand, if the MRO request will be outsourced, then the process continues at step 455 where the event participant selects a fulfillment vendor. The request for MRO service can be formatted, at step 460, for communication to the outside vendor as, for example, an XML document. At step 465, the formatted request is submitted to a business to business integration server, and is translated and transmitted at step 470 to the vendor. The vendor acknowledges receipt of the request at step 475. Optionally, the vendor can verify/guarantee fulfillment of the MRO service request. The requested services are then completed at step 425. The system again determines whether the services were outsourced at step 430 and, if the MRO services were outsourced, then the vendor notifies the requestor/customer at step 433. A determination is made again at step 435 whether the rendered services impacted other functions within the organization and the customer is billed accordingly.

In an alternative embodiment (not shown), an administrator of the MRO department can receive notifications about new MRO Requests. This can be accomplished by submitting electronic requests to a common email address associated with the MRO department. The administrator would be required to periodically monitor this email account for new requests. Upon receiving a request, the Administrator would be responsible for processing it. Any type of cancellation or modification to an MRO request is the user's responsibility and may be handled by a phone call; however, the cancellation/modification feature is preferably automated, such as automatically sending an email to the MRO service provider or vendor.

Preferably, the system adds the notice "Requires Approval" to any MRO request for major maintenance. This is a reminder to the maintenance organization that the request may not have yet received the appropriate authorizations. The MRO section can provide a FAQ area where users can find answers to the most commonly asked questions.

Preferably, the MRO interface prompts the end-user to enter the following exemplary information:

| Exemplary MRO Data Elements | Description |
| --- | --- |
| Contact Name | The individual that should be contacted for issues about the MRO request<br>*Defaults to the user's name |
| Contact Phone Number | The number used to locate the individual specified in the Contact Name field<br>*Defaults to the user's number |
| Profit Center/ Cost Center | The profit center that should be billed for any charges (e.g., Overtime)<br>*Defaults to the profit center stored in the user's profile |
| Preferred Service Date & Time | The date and time the user would like the MRO request completed |
| Required Service Date & Time | The date and time the user must have the MRO request completed |
| Maintenance Request Type | The type of MRO request. |
| Request<br>Janitorial service<br>Clean spills<br>Empty Trash<br>Bathroom issues<br>Dumpster requests<br>Leaks<br>Food clean up<br>Request Minor Maintenance<br>Keys<br>Stuck Drawer<br>Keyboard tray issues<br>Light Bulb issues<br>Electrical problems<br>Broken chair<br>Small furniture moves<br>Request Major Maintenance<br>Reconfigure cubical<br>Reconfigure office<br>Painting<br>Office Construction | |
| | "Requires Approval" printed for these services. |
| Description | Free form text in which the user can specify instructions or details pertaining to the MRO request |

The following is an overview of some of additional general features that the MRO module can include:

Job Tracking: An end-user interface for displaying, modifying, and deleting requests submitted to the MRO department.

Move Requests: An end-user interface for generating a move request. This interface would allow an event participant with the appropriate privileges to request a move and could coordinate the move with other departments (e.g., Notify MIS, Notify Telecommunications, etc.).

Administration: An end-user interface for processing and prioritizing the jobs submitted to the MRO department. This interface would also allow MRO administrator(s) to track the status, the staff assigned, the number of hours worked, notes, and the costs associated with requests.

Reporting: An end-user interface that would provide informative reports with respect to job tracking (e.g., Open and Close jobs by project type), billing, and overtime. This could enhance or replace the functionality currently performed by other applications, such as Access, and could integrate into a company's corporate billing package.

Integration: The system provides for integration with commercial MRO packages, such as MAXIMO.

A FAQ section.

Figure 19:
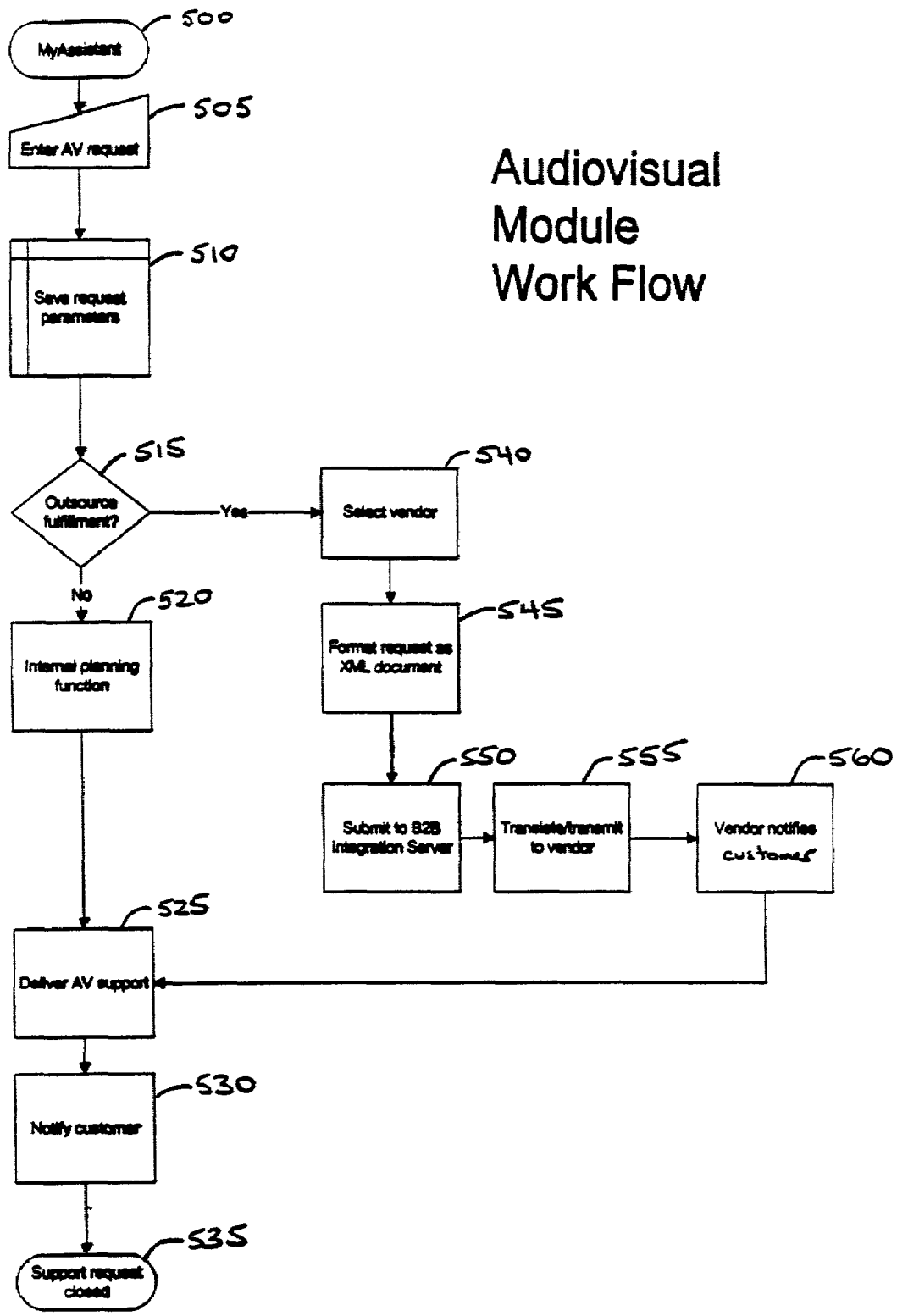
FIG. 19 is a flowchart of an exemplary process for scheduling an audiovisual service associated with an event in accordance with the present invention.

As shown in FIG. 19, the system can also include an audio/visual (A/V) business logic component, or module, that can be used with the event-based scheduling system 1 of the present invention. The A/V module of the event based scheduling system 1 automates requests for A/V services and provides a variety of capabilities for administering and reporting on these requests. It preferably provides an intuitive user interface that allows the end-user to leverage graphical interfaces to generate A/V requests for an event. The system is also preferably constructed to allow an event participant to cancel or modify an A/V request. In addition, the system provides for real-time status monitoring of previously submitted requests for A/V services.

As shown in FIG. 19, an event participant can access the event-based scheduling system 1 at step 500 and enters a request for A/V services into a Web form at step 505. After the event participant has entered the requested information, the information can be saved, at step 510. The A/V request can be fulfilled by various means, including internal providers or external providers or vendors. The event participant selects whether the A/V request will be outsourced for fulfillment at step 515.

If the A/V request will not be outsourced, then the process continues at step 520 where the internal fulfillment planning occurs. The requested services are then delivered at step 525. The requestor/customer is then notified that the A/V support has been delivered, at step 530. The request/order for A/V services is then closed, at step 535.

On the other hand, if the A/V request will be outsourced, then the process continues at step 540 where the event participant selects a vendor. The request for A/V service can be formatted at step 545 for communication to the outside vendor as, for example, an XML document. At step 550, the formatted request is submitted to a business to business integration server, and is translated and transmitted at step 555 to the vendor. The vendor acknowledges receipt of the request at step 560. Optionally, the vendor can verify/ guarantee fulfillment of the A/V service request. The requested services are then completed at step 525. The requestor/customer can be notified that the A/V support has been delivered at step 530, and the A/V support request is closed, at step 535.

In addition, a mailroom business logic component, or module, can be used with the event-based scheduling system 1 of the present invention. The mail room module can be constructed for use within a particular company's environment and also at customer sites that are authorized to access the event-based scheduling system 1. The mail room module of the event-based scheduling system 1 automates mail room requests and provide a variety of capabilities for administering and reporting on these requests. The mail room module preferably leverages the existing user interface. The following is an overview of some of the general mail room functionality:

Mail Locator: A directory of authorized end-users, event participants, employees, etc. can be provided for locating individuals. The mail locator preferably includes the name, picture, and primary location of each person registered in the system.

Administration: An end-user interface for recording and tracking courier packages, truck deliveries, and miscellaneous deliveries received by the mailroom.

Reporting: An end-user interface that would provide informative reports with respect to mailroom activity.

Integration: Interface to other approved mail room systems, such as Pierce Leahy Box Ordering, or the like.

A FAQ section.

The event-based scheduling system 1 can also include other modules, as required, that can be used with the event-based scheduling system 1 of the present invention. The other modules can be connected to pre-selected internal service providers or provide an interface to outside vendors. For example, a purchasing module (not shown) can be connected to internal service providers or provide an interface to outside vendors, such as BOISE/CASCADE, for purchasing items associated with an event.

Additional System Functionality:

The event-based scheduling system 1 is preferably scalable with no hard limits. System capacity will only be limited by available processing power and storage space, both of which are preferably expandable.

The event-based scheduling system 1 preferably includes a security mechanism for securing the system from unauthorized users. Preferably, the event-based scheduling system 1 is secured using conventional security techniques. In addition, privileges can be organized and granted to users or other systems, such as operational systems, financial systems, communications (email) systems, calendar systems, and the like. Preferably, access to the event-based scheduling system 1 is granted to authorized personnel only. For example, access can be controlled through Active Directory or Windows NT Authentication. The event-based scheduling system 1 also can maintain one or more different profiles. These profiles preferably hold information about user preferences, room and equipment configurations, site configurations, characteristics of a particular service, etc. For example, security for the event-based scheduling system 1 can include user roles. Each user can be assigned one or more user roles. Exemplary user roles identified for the event-based scheduling system 1 can include:

| Exemplary User Roles | Description |
|---|---|
| User | A standard user of event-based scheduling system |
| System Administrator | Access to all administrative features of event-based scheduling system |
| Scheduling Administrator | Access to all administrative functions for conference/meeting room scheduling |
| Catering Administrator | Access to all administrative functions for catering |
| Copy Center Administrator | Access to all administrative functions for the copy center |
| MRO Administrator | Access to all administrative functions for MRO |
| Travel Administrator | Access to all administrative functions for travel |
| Mail Room Administrator | Access to all administrative functions for the mail room |
| Other business logic component administrator | Access to all administrative functions for the particular business logic component |

As stated earlier, access to the event-based scheduling system 1 is preferably limited to authorized personnel only. Each person who desires access to the system may be requested or required to provide personal and business data in order to be granted authorization to access the system or to receive a specific level of access or privileges. Exemplary user attributes that can be used for the event-based scheduling system include:

| Exemplary User Profile | Description |
|---|---|
| First Name | |
| Last Name | |
| Middle Initial | |
| Title | |
| Location/Mailstop | |
| Email Address | |
| Phone Numbers | |
| Contact Number | |
| Pager | |
| Cell Phone | |
| Voice Mail | |
| Company Name | |
| Profit Center/Cost Center | |
| Photo | |
| Asset Profile | |
| Company Car | |
| Laptop | |
| Phone | |
| Furniture | |
| HR Profile | |
| Grade Level | |
| Purchase Limit/Budget | |
| Birthday | |
| Emergency Contact | |
| Work Hours | |
| Parking Space | |
| Conference Room Profile | |
| Favorite | |
| Travel Profile | |
| Isle/Window preference | |
| Payment Profile | |
| Janitorial Profile | |
| Reprographics Profile | |
| Technology Profile | |
| Notification Profile | |
| MRO Profile | |
| Dietary Preferences | |
| Special Needs | |
| Handicap | |
| Prayer Room | |

VI. Exemplary Event Participant Interaction:

As described in detail above, the event-based scheduling system 1 of the present invention is directed to an event-based scheduling solution that is preferably network-based and is designed to simplify the work-life of an event participant. The event-based scheduling system 1 provides cross integration of multiple sub-tasks across at least two tasks and allows an event participant to schedule resources and services as well as calendaring of people. This cross integration feature also allows an event participant to access the event-based scheduling system through other applications, such as Microsoft Outlook, Lotus Notes, etc. The following description is provided to show an exemplary interaction of an event participant, or end-user, with the event-based scheduling system 1 of the invention, where the description is separated into exemplary modules 7, or categories, that represent an exemplary event-based scheduling system web site. Preferably, the event-based scheduling system 1 has an electronic help section embedded within the web site to assist an event participant in using the system. An event participant can click on 'Help' within the site for help at any time. In addition, the event-based scheduling system 1 can have a system administrator, or Helpdesk, that can be contacted by, for example, telephone, e-mail, or the like, should the event participant like to speak with someone knowledgeable with the event-based scheduling system 1.

An event participant can find the event-based scheduling system 1 of the present invention on a networked-based system, such as the Internet or an Intranet. The event participant can launch, for example, their Internet Explorer browser on their computer, type the appropriate Internet address in the 'Address' box of the browser, and hit the 'Enter' key on their keyboard. This will bring the event participant to the event-based scheduling system Login page. An exemplary Login page 600 that might appear is shown in FIG. 20.

Figure 20:
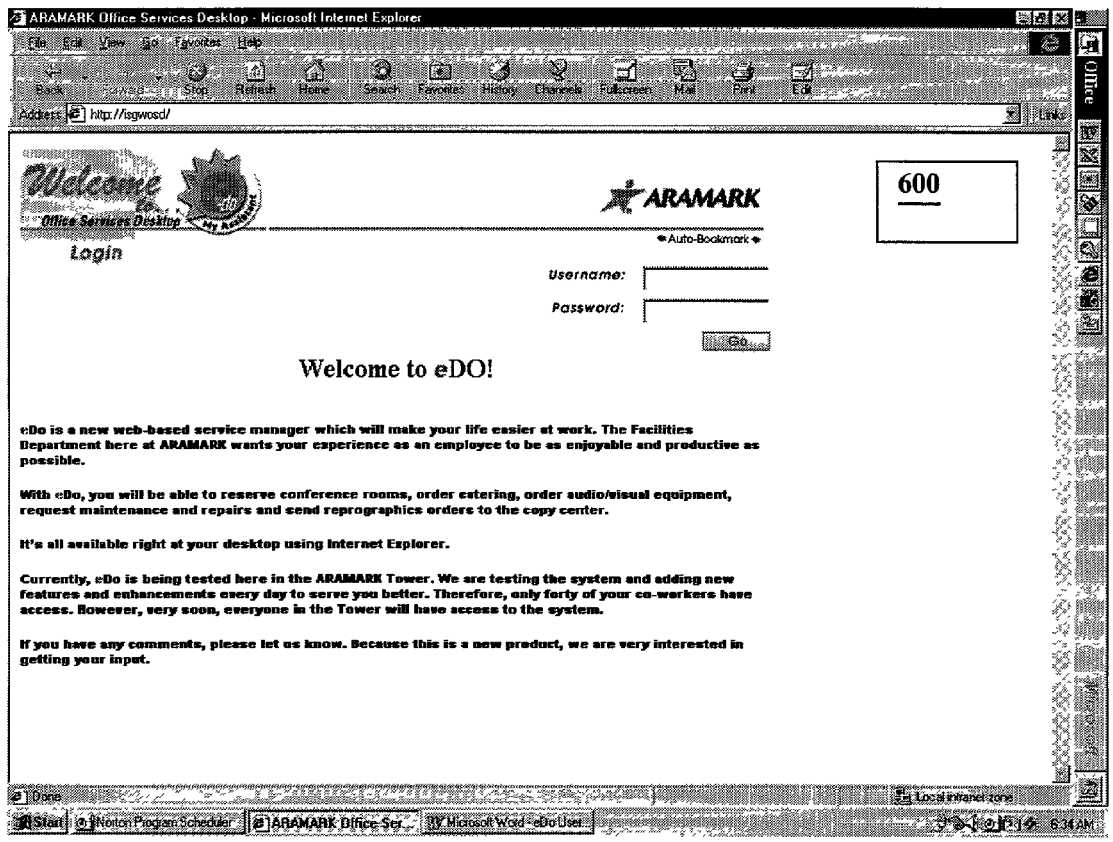
FIG. 20 illustrates an exemplary log-on page for an exemplary Web-based embodiment of the event-based scheduling system of FIG. 1.

Preferably, the event-based scheduling system 1 has a security mechanism and requires that the event participant to Login to the system by typing their Username and Password into the respective boxes, on the screen, as shown in FIG. 20. All authorized event participants would receive their passwords via email or some other means from, for example, a system administrator.

Preferably, the event-based scheduling system 1 is set up such that the event participant is registered, authorized, or signed up to use the event-based scheduling system and this gives the event participant special access to the event-based scheduling system 1. For example, the event-based scheduling system 1 can be constructed such that not everyone in an organization has access to the event-based scheduling system 1, or so that different levels of access are available for different users. For example, different levels of access or membership can include administrator, broker, member, participant, guest, visitor, and the like.

The event participant can bookmark this site by clicking the 'Auto-Bookmark' button at, for example, the top right-hand side of the screen. This will place the site address into their browser bookmarks for ease-of-use in the future.

Figure 21:
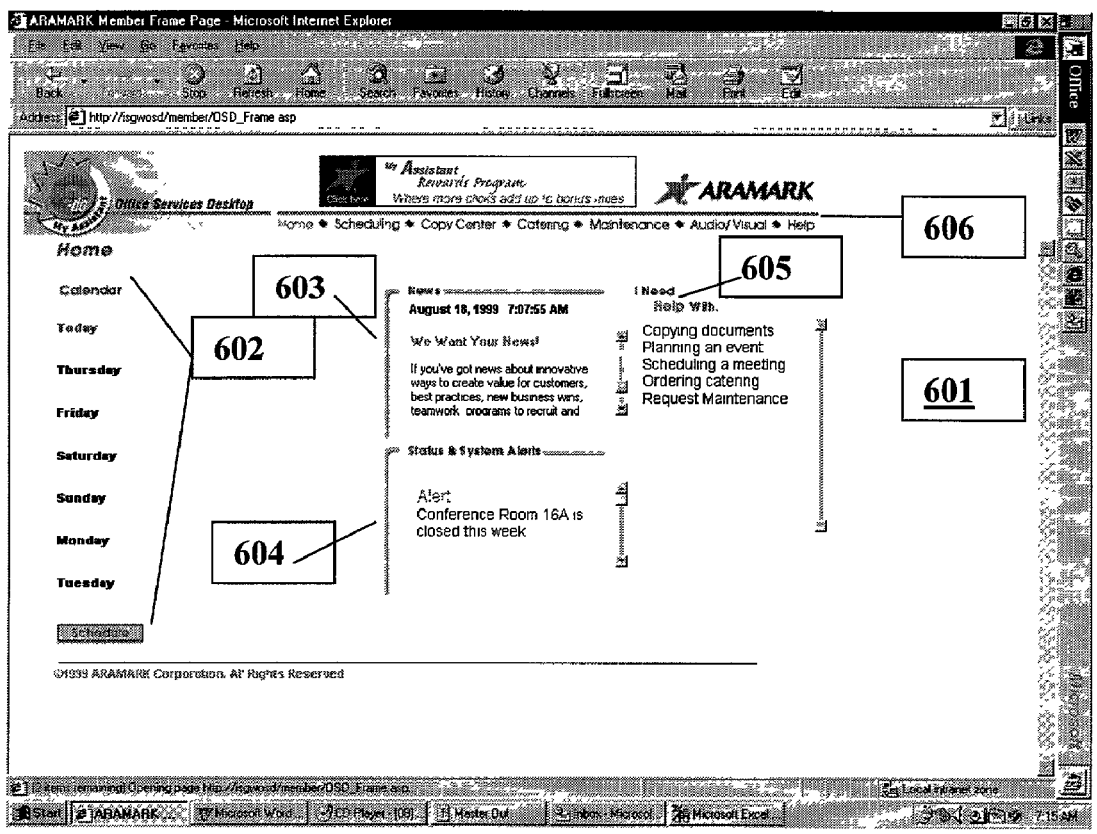
FIG. 21 illustrates an exemplary homepage for the exemplary Web-based embodiment of FIG. 20.

FIG. 21 shows an exemplary system homepage 601. From the system homepage, the event participant can view various system features, including their event-based scheduling system calendar 602 (e.g., a calendar of events), news and events 603, system status 604, select help with a particular function 605, etc. Throughout the web site, the event participant will be able to navigate to each service via the navigation bar 606 which allows for integration, as shown in FIG. 21.

Figure 22A:
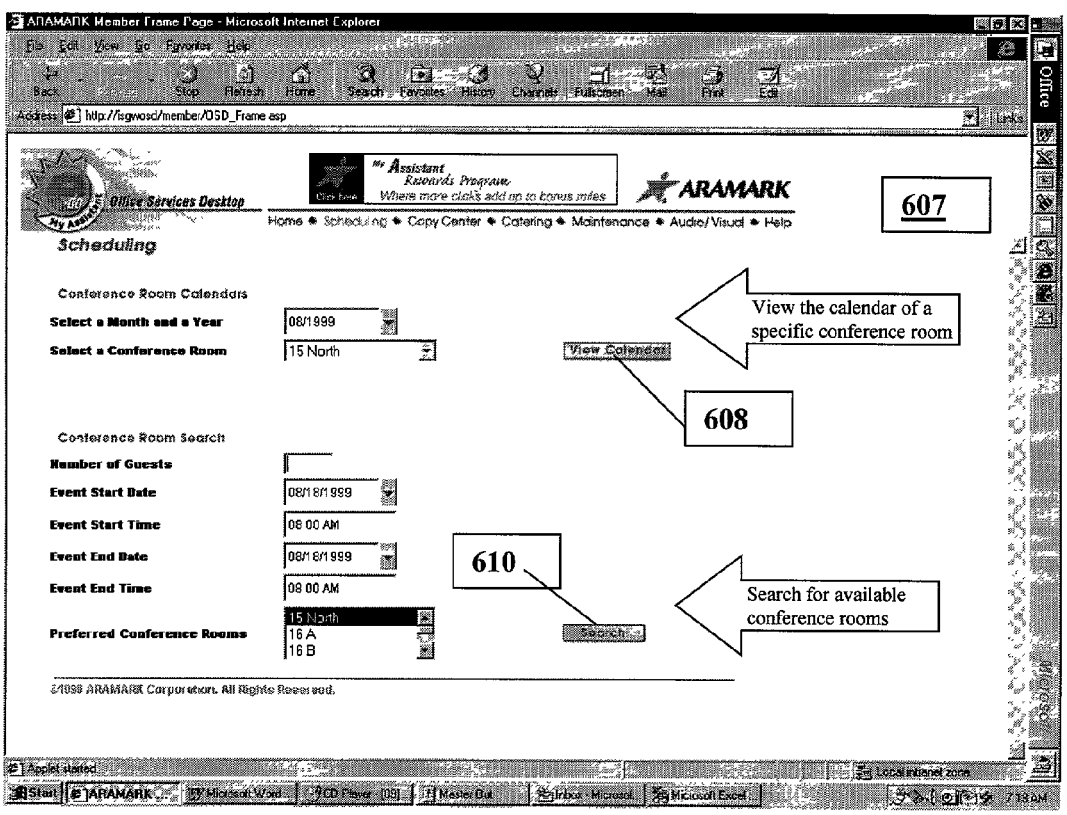
FIG. 22A illustrates an exemplary room-scheduling screen for the exemplary Web-based embodiment of FIG. 20.

1. Conference Room Scheduling:

The following describes an exemplary process that an event participant can use in scheduling a conference room/meeting location. An event participant preferably has at least two options for scheduling conference/meeting rooms. He or she may click on 'Scheduling' located, for example, at the navigation bar 606 at the top of the screen, as shown in FIG. 21. FIG. 22A shows an exemplary room-scheduling screen 607 that can be displayed to the event participant.

Figure 22B:
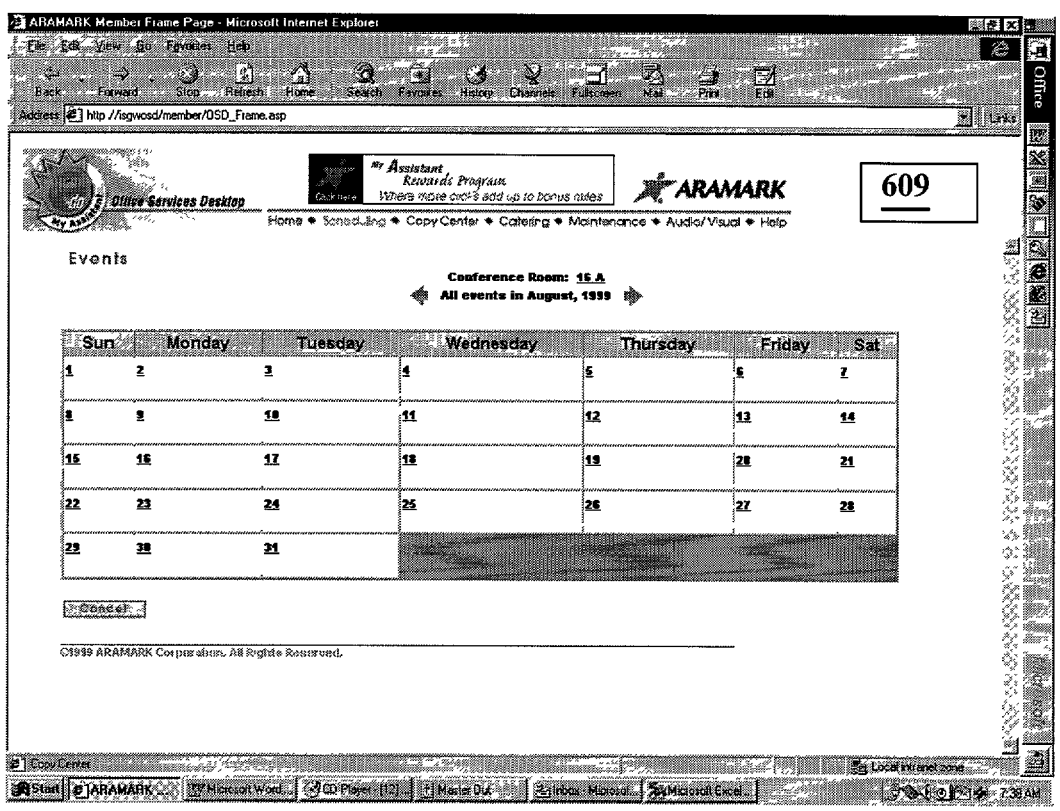
FIG. 22B illustrates an exemplary detailed room schedule that may appear for the exemplary room-scheduling screen of FIG. 22A.

To reserve a particular conference room, the event participant may select the conference room by clicking on the 'View Calendar' button 608, as shown in FIG. 22A. Then the event participant can choose the date from, for example, a pull down or pop up menu, for which he or she wants to reserve the conference room. A page 609 showing a detailed schedule for the room appears, as shown in FIG. 22B and the event participant can enter data such as, for example, the event name, number of guests, start and end time of the meeting, etc. The event participant then enters the selected data and reserves the conference room. In addition, the event-based scheduling system 1 is preferably constructed such that any conference room reservation made to the event-based scheduling system 1 will appear in the event participant's event-based scheduling system 1 calendar on the Homepage.

Figure 22C:
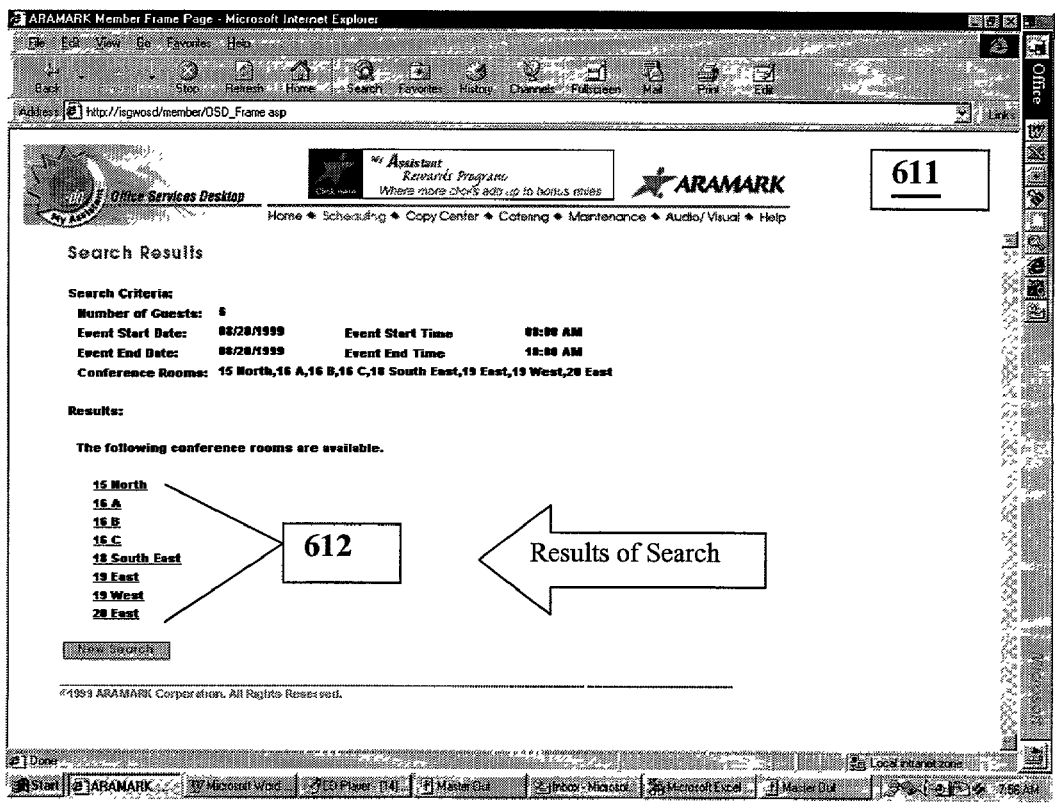
FIG. 22C illustrates an exemplary response screen for the exemplary detailed room schedule of FIG. 22B.

Alternatively, an event participant can search for any conference rooms that meet his or her specified dates and time requirements by clicking on the "Search" button 610. To do this, an event participant can select the rooms that he or she wishes to search (e.g., by holding down the 'control' key for multiple rooms) on the scheduling screen and then clicks the 'Search' Button. Note: the calendar date can also be adjusted by using the up/down arrow keys on a keyboard. FIG. 22C shows an exemplary response screen 611 that might appear to the above input.

Figure 22D:
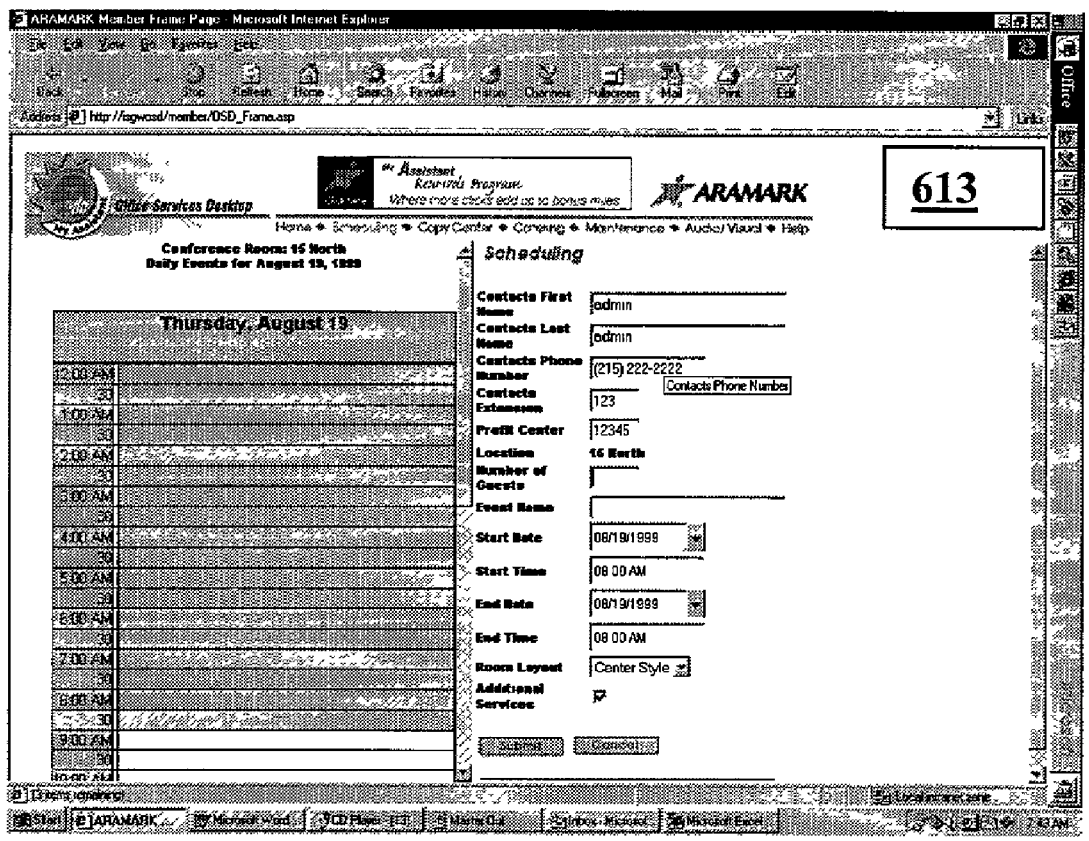
FIG. 22D illustrates an exemplary response screen for the exemplary response of FIG. 22C.

The event participant can click on the conference room that he or she wants to reserve from a displayed menu 612, as shown in FIG. 22C, and the event-based scheduling system 1 can then display the calendar for the selected room. The event participant selects the date and time that he or she wants to reserve. FIG. 22D shows an exemplary response screen 613 that might appear to the above input. As shown in FIG. 22D, the event participant can enter the event name, number of guests, start and end time of the meeting, etc., and submit the request. The event-based scheduling system 1 will reserve the conference room. In addition, any conference room reservation made to the event-based scheduling system 1 will preferably appear in the event participant's event-based scheduling system 1 calendar on the Homepage.

In an embodiment of the invention, the event-based scheduling system 1 can be constructed to automatically place a turn-around time right after the event based on the room that is specified. This feature can give the maintenance, catering, and other service providers sufficient time to clean up and change the room over for the next meeting. Preferably, a Conference Room Administrator, or the like, has the ability to cancel a turn-around event.

2. Ordering Additional Service Items:

The event-based scheduling system 1 prompts the event participant to continue and inquire whether he or she would like to request/order any products and/or service items for the scheduled event (e.g., the conference room or meeting location). The event-based scheduling system 1 is preferably customized to include various business logic components or modules for each particular organization, business, industry, etc. Exemplary business logic components, or modules, for the ancillary services associated with an event can include catering, audio visual equipment, reprographics, maintenance, mail room, procurement, and the like. For example, a prompt can be displayed to the event participant inquiring about the scheduling of ancillary products and/or services associated with the event and the event participant can click 'OK' if he or she should require catering for this event or 'Cancel' can be clicked if catering is not required.

Figure 23A:
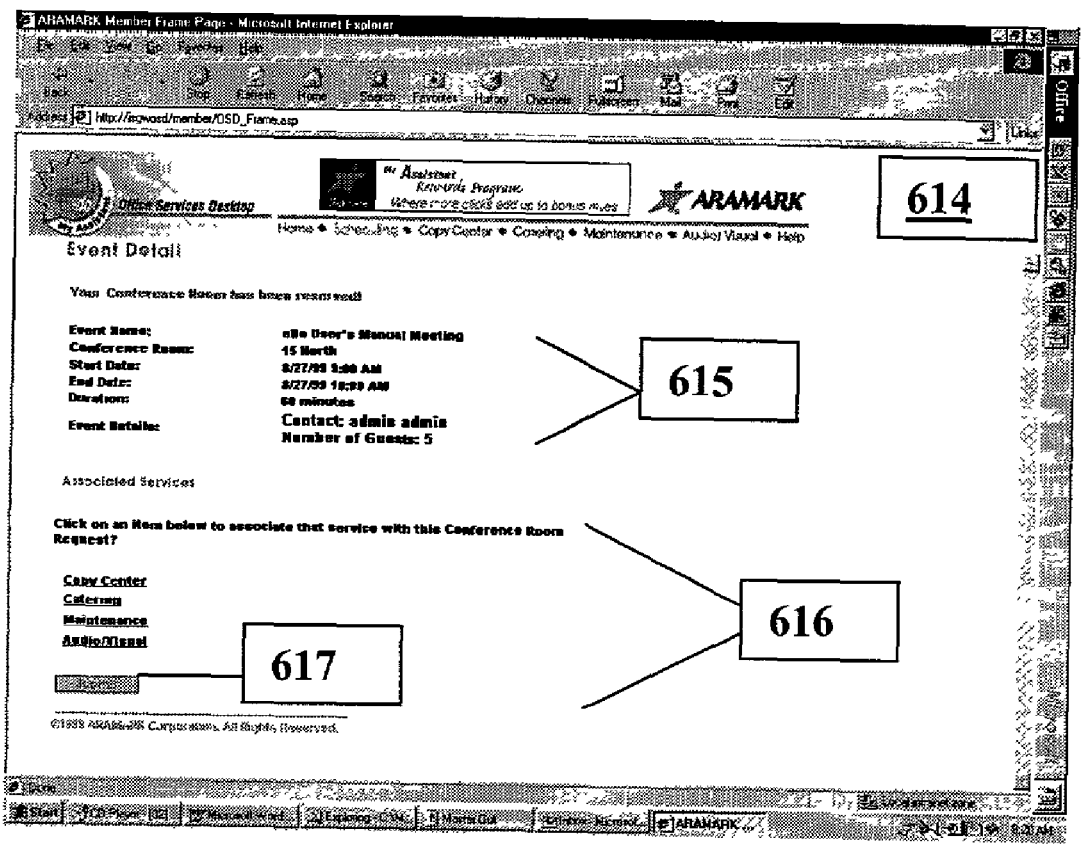
FIG. 23A illustrates an exemplary prompt screen that may appear after the room has been scheduled for the selection of ancillary services associated with the event.

FIG. 23A shows an exemplary web screen 614 that appears if the event participant selects to schedule ancillary services associated with the event. As shown, an event box 615 displays the specific details of the scheduled event. An associated services box 616 lists available services that can be associated with that particular event for selection by the event participant.

After the event participant is finished ordering catering, he or she can be returned to the Event Page. This permits the event participant to order any additional products/services for the meeting, such as, for example, audio/visual equipment, maintenance and repair, etc.

In addition, the event-based scheduling system 1 can include a hyperlink, and the event participant can click on the hyperlink item on the screen for additional product/service item orders. When the event participant is finished ordering all required products and/or service items, he or she can click the 'Submit' button 617 shown on the screen of FIG. 23A.

3. Modifying a Room Reservation:

Preferably, only the event participant and/or a system administrator have the authority and ability to cancel/modify (e.g., cancel or reschedule) a conference room reservation that the event participant has made. Preferably, the event-based scheduling system 1 will not allow anyone else to modify or overbook a reservation once it is in the system.

To cancel/modify a room reservation, the event participant clicks the 'Scheduling' module from the tool bar 606, for example. The date (e.g., day/month/year), time, and the conference room (e.g., from the pull-down menu) that had been reserved can be selected by clicking the 'View Calendar' button 608, as shown in FIG. 22A.

Figure 23B:
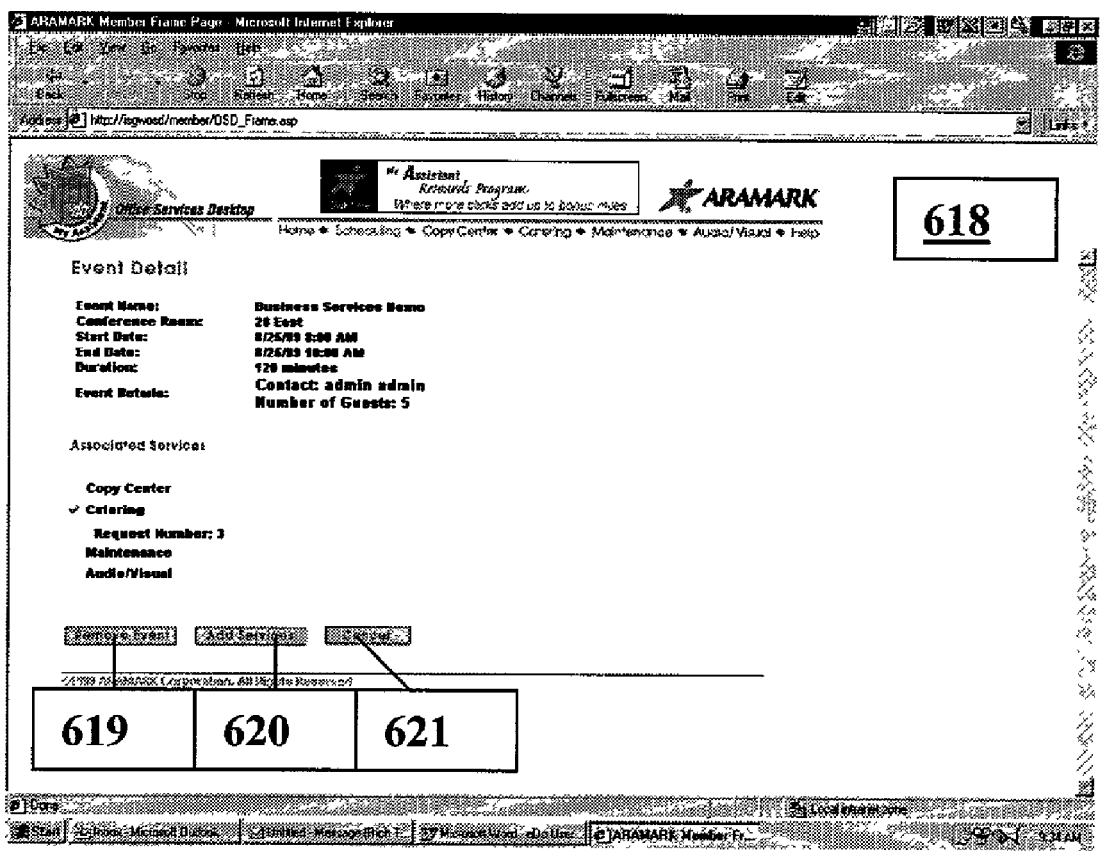
FIG. 23B illustrates an exemplary calendar screen for a scheduled room.

The event participant can click on the event he or she wants to cancel/modify and the reservation for that conference room can be displayed on the web screen 618, as shown in FIG. 23B. For example, the event participant can click the 'Remove Event' button 619, which can be displayed in, for example, a dialog box. The event participant can click 'OK' to confirm the removal of the conference room reservation and the canceled room will be removed from the system. Also, the event-based scheduling system 1 preferably automatically modifies (cancels or reschedules) any products and/or service items associated with the canceled event. In addition, the canceled event will preferably no longer appear on the event participant's system calendar. The event participant can add services by clicking on the 'Add Services' button 620, or cancel an entry by clicking the 'Cancel' button 621.

4. Ordering Catering:

To order catering, the user can click the 'Catering' button on, for example, the navigation bar on the event-based scheduling system 1 homepage or alternatively, by selecting catering under the associated services box, as shown in FIG. 23A. FIG. 24A shows an exemplary catering event request screen 622 that appears on the event participant's desktop. The event participant enters the requested pieces of information including, for example, the event name, the number of guests, the start/end date, the start/end time, etc.

At this time, the event participant may also indicate any special instructions, special dietary needs, or order any extra items. Once the event participant has finished setting up the event, he or she can view the various menus available through the event-based scheduling system 1.

Figure 24B:
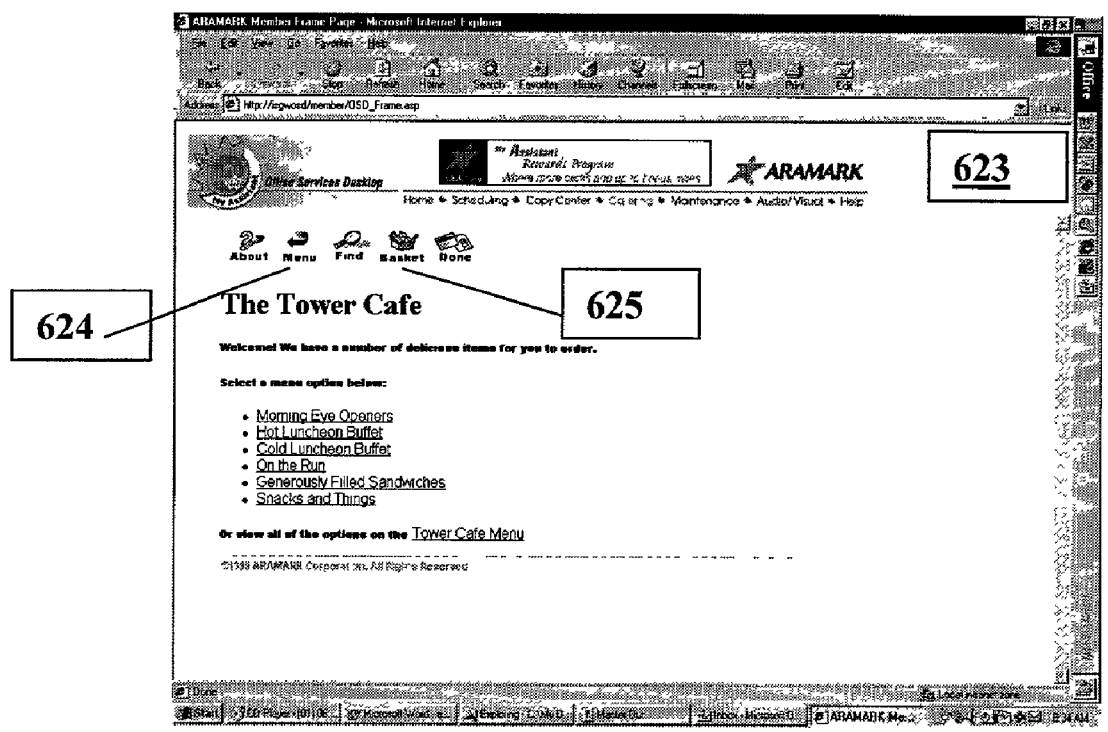
FIG. 24B illustrates an exemplary menu screen that may appear after catering has been requested.
Figure 24C:
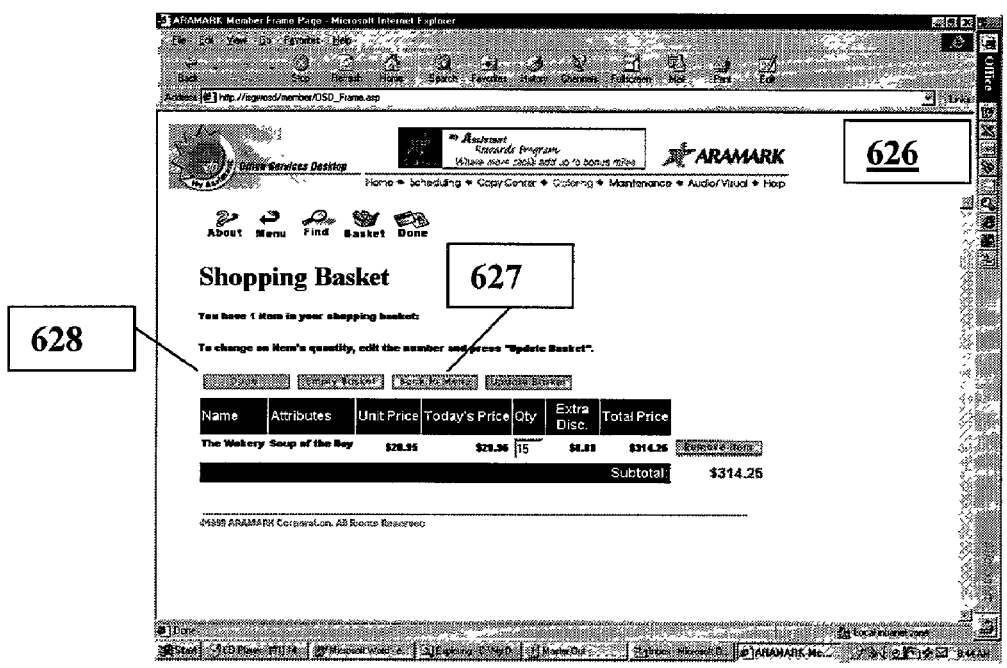
FIG. 24C illustrates an exemplary shopping basket that may be used by an event participant to view the services that have been requested.

FIG. 24B shows an exemplary menu screen 623 that can appear. A 'Menu' button 624 is provided for the event participant to use in selecting different menu choices. At this time, the event participant can select the menu items for the particular meeting by clicking on the menu of his or her choice. As shown in FIG. 24B, the event participant can click the 'Basket' button 625 to place any of the items in a designated area, such as a shopping basket. Preferably, the event participant can view the contents of his or her shopping basket 626, as shown in FIG. 24C. The event participant can continue ordering items by clicking the 'Menu' button 627 (to return to the main Menu). When the event participant is finished ordering, he or she can click the 'Done' button 628.

Figure 25:
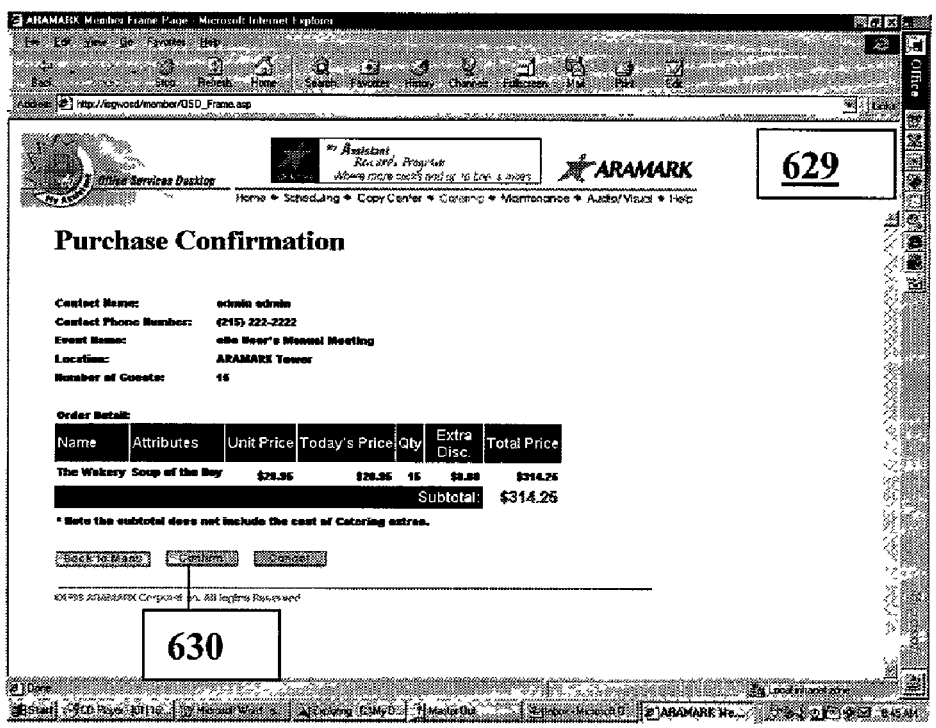
FIG. 25 illustrates an exemplary confirmation screen that may appear showing an event and any associated services that have been requested.

After clicking the 'Done' button 628 in FIG. 24C, a confirmation screen 629 appears with the event and menu information, as shown in FIG. 25. The event participant preferably confirms that the information is correct and clicks the 'Confirm' button 630. Preferably, as shown, preferred or registered service providers and vendors are included in the menu. The confirmed order/request is transmitted by, for example, email, fax, telephone, or the like, to the selected service provider or vendor.

Preferably, the event-based scheduling system can also allow the end-user to order items not listed in the event-based scheduling system 1 from, for example, third parties or outside vendors. In addition, the event-based scheduling system 1 is also preferably constructed to allow an event participant, or other authorized person, to change and/or cancel a catering order. Preferably, any change to an event will automatically cause the event-based scheduling system 1 to change any ancillary products or services, such as catering, associated with that event.

Figure 26:
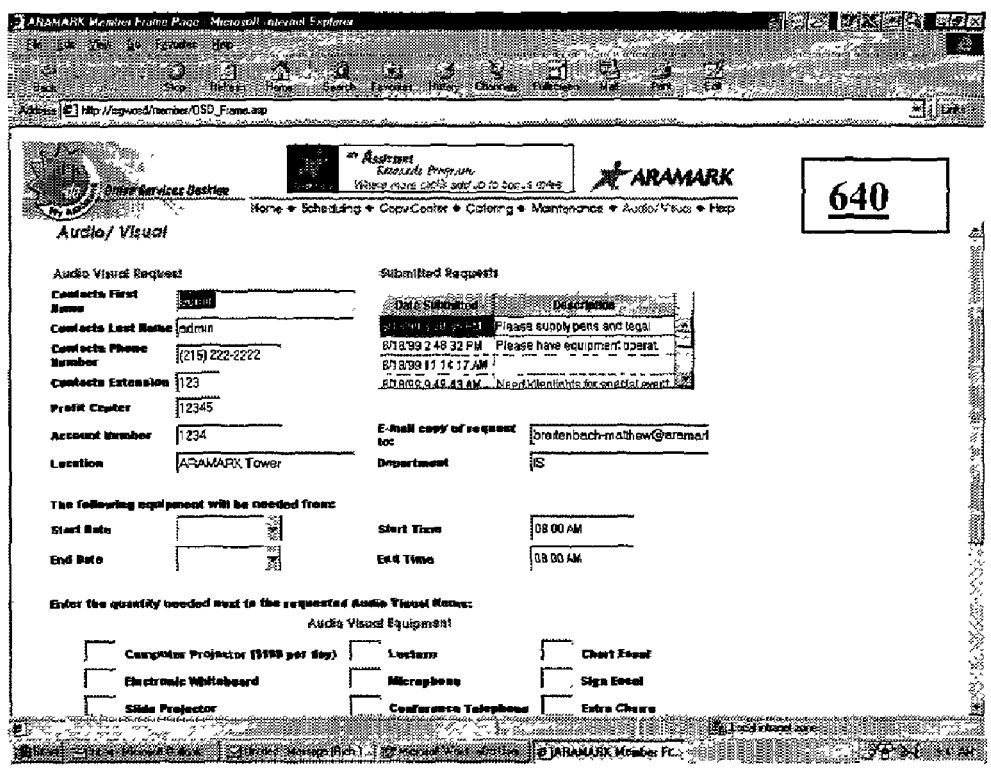
FIG. 26 illustrates an exemplary audiovisual request screen that may appear after the event has been scheduled.

5. Ordering Audio/Visual Services:

In order to submit a new Audio/Visual request, an event participant can click on the 'Audio/Visual' button on the event-based scheduling system homepage. FIG. 26 shows an exemplary A/V screen 640 that can appear. The event participant completes the requested pieces of information and enters this data into the system to submit an Audio/Visual request/order. For example, the requested information can include Event Name, Start/End Date, Start/End Time, Equipment requested, etc. If necessary, any special instructions can be entered by the event participant in the 'Description' box. When the information has been entered, the user can click the 'SUBMIT' button to have the request/order processed.

6. Maintenance and Repair Requests:

In order to submit a new maintenance request, an event participant can select 'Maintenance' from the Navigation bar on the event-based scheduling system homepage. FIG. 27 shows an exemplary MRO screen 650 that can appear. The event participant completes the requested pieces of information and enters this data into the system to submit an maintenance and repair request/order. The requested information can include Preferred/Required Date of Service, Preferred/Required Time of Service, Service Items Requested, etc. If necessary, the user can enter Special Instructions in the 'Description' box. When the information has been entered, the user can click the 'SUBMIT' button to have the request/order processed.

The above process describing the scheduling of ancillary products and services in support of an event can be completed for other ancillary products and services as desired in support of the event.

Although illustrated and described herein with reference to certain specific embodiments, the present invention is nevertheless not intended to be limited to the details shown. Rather, various modifications may be made in the details within the scope and range of equivalents of the claims and without departing from the invention.

VII. Exemplary Business Partner or Client Interaction:

In addition to inputting data into the event-based scheduling system in order to schedule resources and calendar people, the event-based scheduling system also allows business partners, including event participants and clients, to access the event-based scheduling system in order to status previously scheduled events and also to obtain reports regarding an event and/or process. The reports can be produced using the aggregation of data and information collected by the system regarding events and processes. FIGS. 28A-33B show additional screen shots illustrating various reports that can be generated using the event-based scheduling system.

Figure 28A:
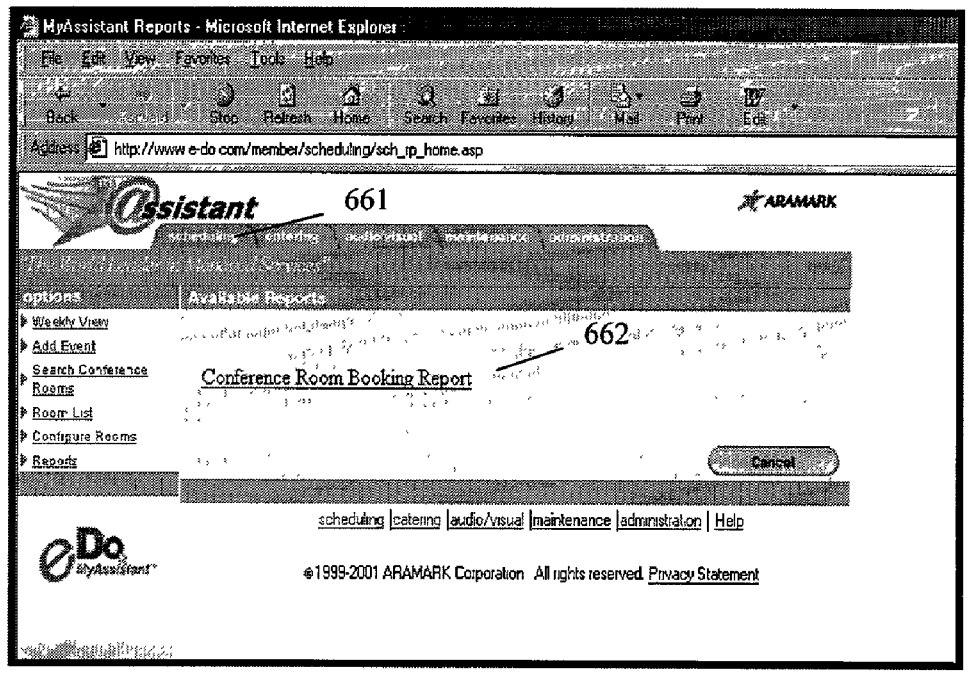
Figure 28B:
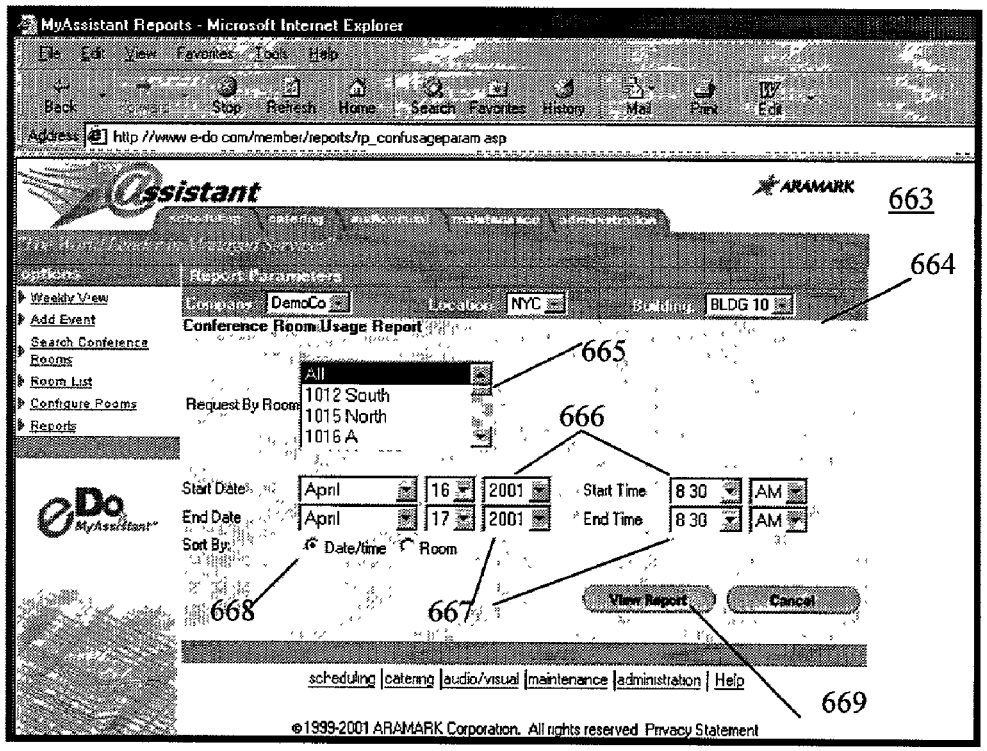

The following description of FIGS. 28A-33B is provided to illustrate an exemplary interaction of a business partner or client with the event-based scheduling system 1. FIGS. 28A, 28B, and 28C show an exemplary conference room booking report. As shown in FIG. 28C, the conference room booking report 660 returns the name of the requester, room number, name of the event, the number of guests, and start and end dates of a conference room booking. To run a conference room booking report a business partner can click on the Scheduling tab 661 as shown in FIG. 28A. Next the user clicks on the Conference Room Booking report text link 662. The Report Parameters Conference Usage Report page 663 displays, as shown in FIG. 28B. The user then selects the appropriate location and building from the Places Bar 664. The user then selects the appropriate conference room(s) from the Request by Room list 665. To select multiple conference rooms, the Ctrl-key can be used or the selection at 'All' may be selected. Next, the user selects the date and time from which he or she wants the system to begin searching for data from the Start Date and Time drop-down lists 666. The user then selects the date and time after which he or she wants the system to stop searching for data from the End Date and Time drop-down lists 667. The report may be sorted by either date/time or by conference room by using the appropriate button 668 at the bottom of the selection screen. To view the report click on the View Report button 669. The system searches for any data that meets the criteria entered. To print the report, the print option on the Internet browser can be selected.

Figure 29A:
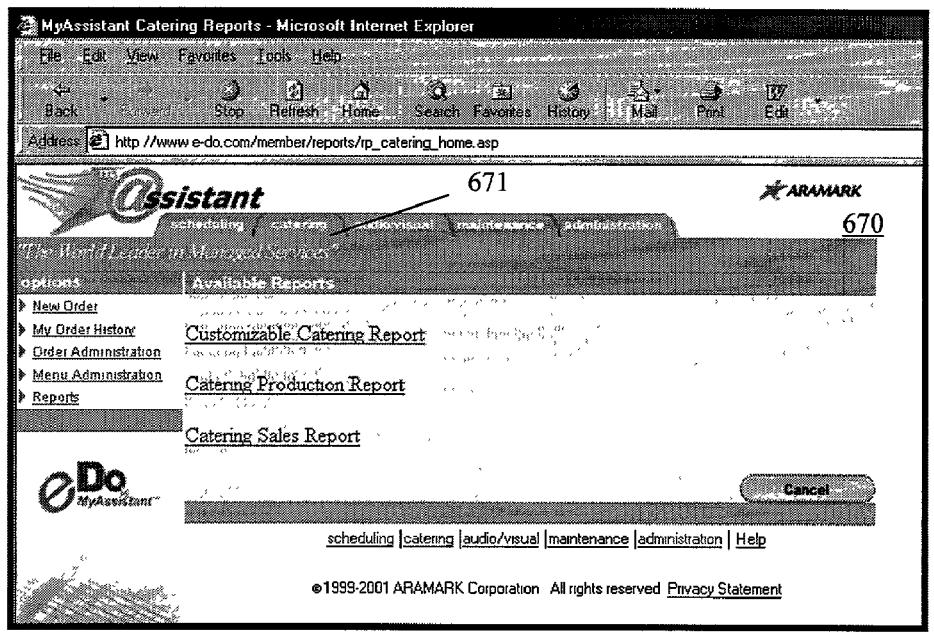
FIGS. 29A-29D illustrate exemplary customizable catering report screens.
Figure 29B:
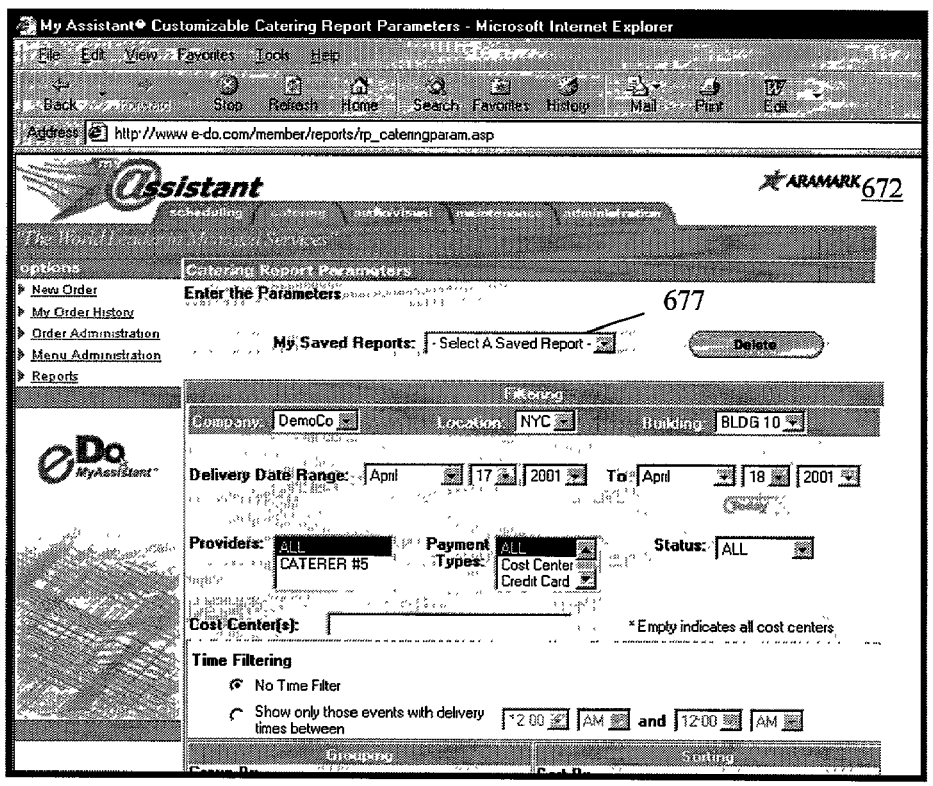
Figures 29C, 29D:
Figures 30A, 30B:
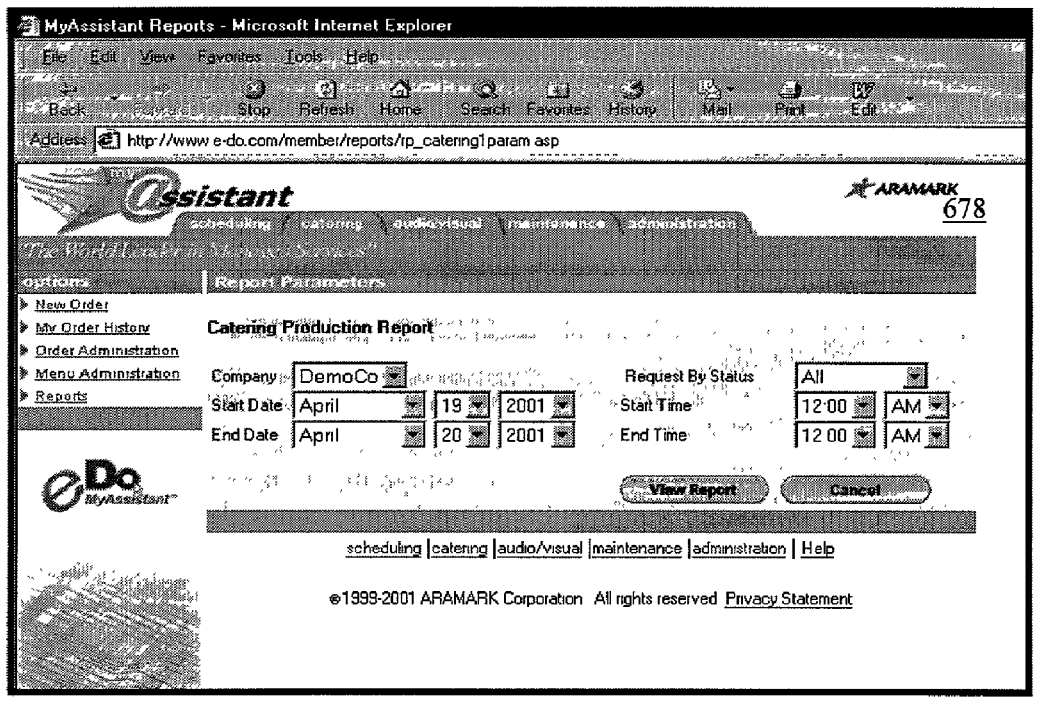
FIGS. 30A-30B illustrate exemplary catering production reports screens.
Figures 31A, 31B:
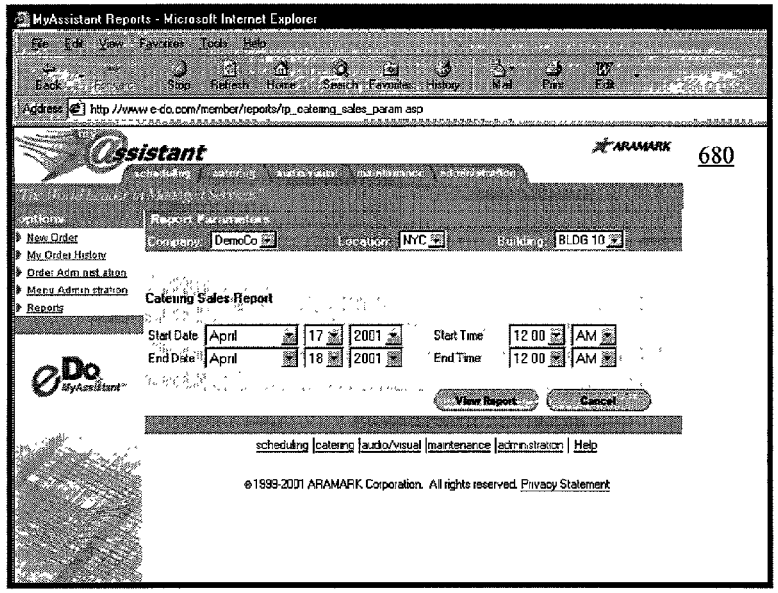
FIGS. 31A-31B illustrate exemplary catering sales report screens.

FIGS. 29A-31B show exemplary catering reports. Three exemplary catering reports are shown: the customizable catering report (FIGS. 29A-29D); the catering production report (FIGS. 30A-30B); and the catering sales report (FIGS. 31A-31B). Each of these catering reports can be accessed via screen 670 and within the catering module 671, as shown in FIG. 29A. The user enters the desired parameters, as shown in the parameters screen 672 of FIG. 29B.

To generate the Customizable Catering Report, a user enters the necessary filtering, sorting and grouping criteria, as shown in screen 673 of FIG. 29C. Each report can be filtered by company, location, building, date, time, provider, payment type, status, and cost center. This report can be grouped/sorted by company, location, building, delivery date, delivery time, service provider, payment type, cost center, and status.

FIG. 29D shows an exemplary Customizable Catering Report 674. This report provides information such as: company name, location, building, order contact, delivery date, room event date/time (if applicable), number of guests, order status, special instructions, amount due, service provider, payment type, cost center, Shelf Keeping Unit (SKU) number, item name, item description, quantity, and by-item pricing. The SKU number allows a provider to identify a particular service item.

In addition, the user has the option to show subtotals for the selected grouping criteria by clicking on the Show Subtotals box 675 at the bottom of the Grouping section, as shown in FIG. 29C. Before submitting the report, the report parameters may be saved by clicking on the checkbox next to the Save Report Parameters As box 676. The sorting and filtering criteria will be saved in the "My Saved Reports" pull-down 677 at the top of the screen.

FIGS. 30A and 30B show exemplary Catering Production Reports 678 and 679. This report provides information about report details including: order number, requestor, location, delivery date/time, provider, SKU number, quantity, item name, item description, and status. The report also provides totals for catering orders, food category and Item SKUs. It is filtered by company (if applicable), status, date, and time.

FIGS. 31A and 31B show an exemplary Catering Sales Report 680 and 681. As shown, information on this report can include: company, location, building, order contact, location, order number, number of guests, delivery date/time, room event date/time (if applicable), provider, payment type, profit center, amount due, SKU number, item name, item description, quantity, and by-item price. This report can be filtered by company, location, building, and date/time.

Figures 32A, 32B:
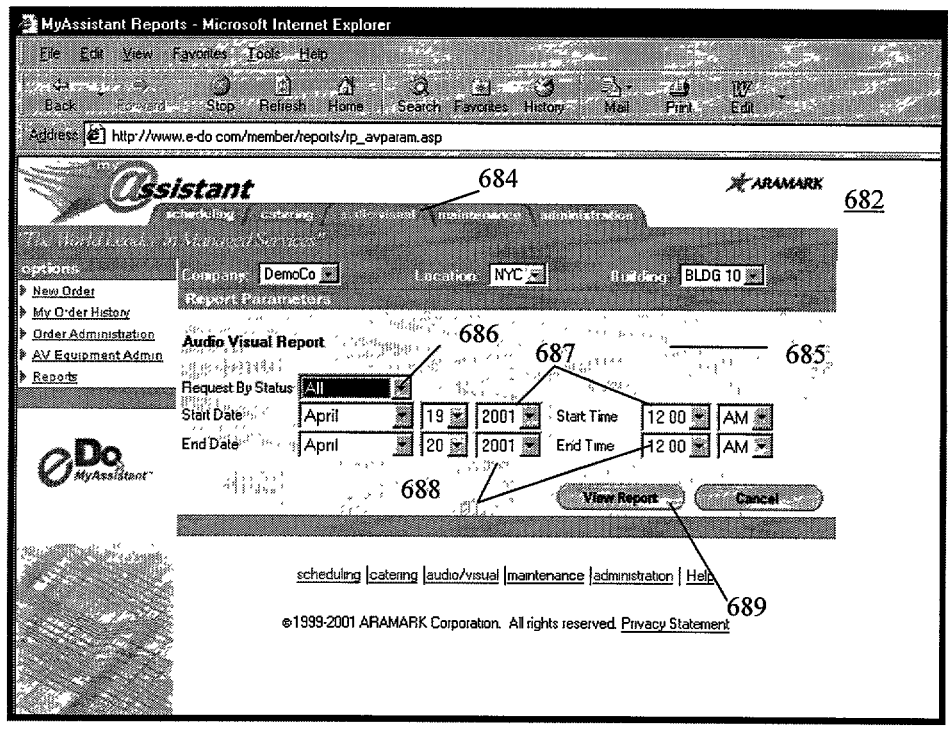
FIGS. 32A-32B illustrate exemplary audio/visual report screens.

FIGS. 32A-32S show an exemplary Audio/Visual report 682 and 683. As shown, the Audio/Visual Events Report returns the request number, requester, location, start and end date/time, quantity, equipment ordered (abbreviation), and order status.

To run an Audio Visual Events report the user can click on the Audio/Visual tab 684. The user then clicks on the Reports text link in the options area. The Reports Parameters page 685 displays, as shown in FIG. 32A. From the Request by status drop-down list 686 the user can select a status. Status categories include, for example, received, pending, scheduled, completed, and canceled. The user selects the date from which he or she wants the system to begin searching for data from the Start Date drop-down list 687. The user selects the date after which he or she wants the system to stop searching for data from the End Date drop-down list 688. To execute the search, click on the View Report button 689. The system searches for any data that meets the criteria entered.

Figures 33A, 33B:
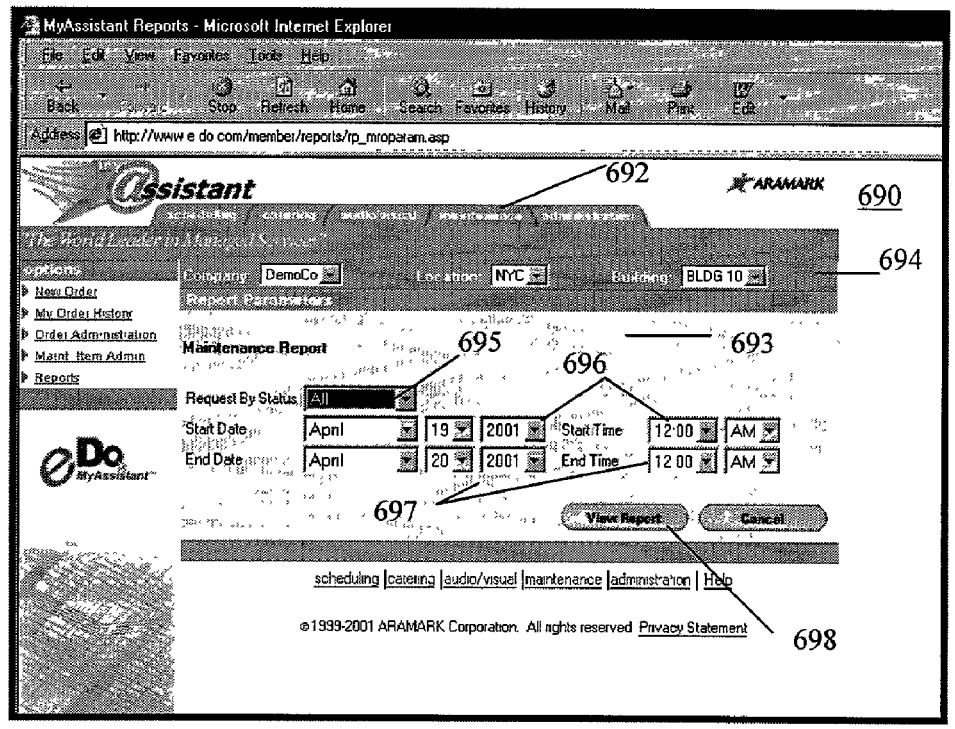
FIGS. 33A-33B illustrate exemplary maintenance request organization report screens.

FIGS. 33A-33B show an exemplary Maintenance Request Organization report 690 and 691. To run a report the user clicks on the Maintenance tab 692, as shown in FIG. 33A. Under the Options section, the user clicks on the Reports link. The MRO Report Parameters Page 693 displays, as shown in FIG. 33A. The user selects the appropriate location and building from the Places Bar pull-down 694. From the Request by status drop-down list 695 the user can select a status filter. From the start date drop-down list 696, the user selects the date from which he or she wants the system to begin searching for data. From the end date drop-down list 697, the user selects the date after which he or she wants the system to stop searching for data. To execute the search, the user clicks on the View Report button 698. The system searches for any data that meets the criteria entered. As shown in FIG. 33B, the maintenance request organization report returns the request number, requestor, location, preferred date/time, required date/time, services requested, maintenance type, and order status.

Those skilled in the art will appreciate that the description of the preferred embodiments above is illustrative only, and that numerous alternative embodiments are possible within the scope of the invention.

What is claimed is:

1. An event-based scheduling system that allows individual event participants to schedule an event and the provisions of at least two tasks associated with said event, comprising:

an event scheduling interface that accepts data from an individual event participant relating to said event; and an event-based scheduling system responsive to data from said event scheduling interface, said data relating to at least two tasks associated with said event, said event-based scheduling system scheduling the provisions of said at least two tasks at the request of said event participant and linking each of said at least two tasks to said event within said event-based scheduling system, whereby said scheduling of said provisions of said event and said at least two tasks are performed by said individual event participant at a computing platform without the intervention of a centralized event planner.

2. The system of claim 1, wherein said event-based scheduling system provides for the integrated scheduling of at least two tasks and at least two sub-tasks, wherein each of said at least two tasks comprises a service that is a component to said event and wherein each of said at least two sub-tasks comprises common steps which an event participant would need to go through in order to complete each of said tasks.

3. The system of claim 2, wherein said tasks and said sub-tasks further comprise a plurality of service modules, wherein each service module provides at least one product or service typically associated with said event and wherein each of said service modules is linked to said event.

4. The system of claim 3, wherein said event-based scheduling system provides a modularity function whereby at least one incumbent resource scheduling or personnel calendaring system may be accommodated as one of said tasks or said sub-tasks.

5. The system of claim 2, wherein said sub-tasks are grouped into at least one module, wherein each module is selected from a group comprising: an order module; a transmit order module; a status/confirm order module; a delivery module; a bill order module, a pay order module; a report module, a customer survey module; and an accounting module.

6. The system of claim 2, wherein said event-based scheduling system provides horizontal integration of each sub-task across each and every task such that the functionality of each sub-task is provided across multiple tasks and also provides vertical integration of multiple sub-tasks within each task such that the functionality of said multiple sub-tasks is provided within each task.

7. The system of claim 2, wherein said event-based scheduling system provides for interoperability between and across multiple providers of said tasks and multiple providers of said sub-tasks.

8. The system of claim 1, wherein said event-based scheduling system provides for the scheduling of resources and calendaring of people.

9. The system of claim 1, said event-based scheduling system provides for the scheduling of a plurality of related events comprising a process, wherein said process comprises an integration of said plurality of related events over a period of time.

10. The system of claim 9, wherein data relating to said process is collected, correlated, and aggregated by said event-based scheduling system so as to be used for at least one of pattern recognition, benchmarking, and business process improvement.

11. The system of claim 1, wherein said event-based scheduling system comprises a hosted and centralized processing and data collection system for scheduling events, aggregating data relating to said scheduled events, and reporting said aggregation of data relating to said events.

12. The system of claim 1, wherein said event-based scheduling system comprises a distributed system having decentralized processing and data collection system for scheduling events, aggregating data relating to said scheduled events, and reporting said aggregation of data relating to said events, wherein said distributed system comprises a plurality of remote servers each having an event scheduling interface and each remote server being connected through a communication link for communicating event data among said plurality of remote servers.

13. The system of claim 1, further comprising a plurality of service provider interfaces that allow individual service providers to access and interact with said event-based scheduling system.

14. The system of claim 13, wherein said event-based scheduling system and said service provider interfaces are connected together via at least one of an Internet, an Intranet, an Extranet, a Web-based network, a WAN, a LAN, a wired network, a wireless network, and a virtual private network.

15. The system of claim 1, wherein said event-based scheduling system has an open system architecture capable of interacting with multiple outside business partners that are enabled through said event-based scheduling system for at least one of service procurement, fulfillment, and reporting.

16. The system of claim 1, wherein said tasks are associated with and made dependent upon said event when said event and said tasks are scheduled such that said tasks are automatically modified when characteristics of said event are modified.

17. The system of claim 16, wherein said event-based scheduling system automatically makes changes to appropriate provisions of all tasks associated with a particular event in response to a change in said characteristics of said particular event.

18. The system of claim 1, wherein said event-based scheduling system further provides for real-time status monitoring of said event and said tasks associated with said event.

19. The system of claim 1, wherein said data relating to said event comprises data describing any meeting or gathering of, or communication between, more than one person at a specific time, including but not limited to an in-person meeting, a telephonic meeting, an electronic meeting, an audio meeting, and a visual meeting.

20. The system of claim 1, wherein said tasks comprise a collection of predetermined products and services typically needed for events in a trade.

21. The system of claim 1, wherein said tasks are grouped into at least one module, wherein each module is selected from a group comprising: a conference room module including meeting room location, room capacity, and room availability; a catering module; an audio/visual module; a copying module; a maintenance and repair module; a calendaring module; a travel module; a janitorial module; a mail room and mail distribution module; a hotel module; a temporary labor module; a temporary office space module; a concierge module; a personal assistant service module; a parking module; and an office equipment and office supplies module.

22. The system of claim 1, wherein said event scheduling interface allows individual event participants to access, schedule, and/or status monitor in real time said event and said tasks associated with said event.

23. The system of claim 1, further comprising at least one back end interface that provides access to said event-based scheduling system to allow one of a service provider and an outside vendor to perform at least one of acknowledge receipt of, accept, and status monitor a request for at least one task associated with said event.

24. The system of claim 1, further comprising at least one administrator user interface that provides access to said event-based scheduling system to allow an administrator to manage and administer said scheduling system by performing at least one of prioritizing, allocating, resolving conflicts, and approving said events and said associated tasks within said scheduling system.

25. The system of claim 1, wherein said event scheduling interface comprises at least one of a home page, a navigation bar for navigating through said event-based scheduling system, a listing of a plurality of modules each containing information relating to at least one of said tasks available within said event-based scheduling system, and an event calendar.

26. The system of claim 1, wherein said event-based scheduling system comprises:
  a processor that receives, processes, and monitors the status of said event data and at lease two tasks associated with said event; and
  an output device coupled to said processor for outputting said event data and said tasks associated with said event for use in scheduling and status monitoring of said event and said tasks associated with said event.

27. The system of claim 1, wherein said event-based scheduling system provides a conflict resolution system that resolves conflicts among at least one event participant in scheduling said event and said tasks associated with said event based on a predefined system hierarchy.

28. The system of claim 27, wherein said predefined system hierarchy is based on one of an event participant title, an event participant rank, an event participant seniority, and an event priority.

29. The system of claim 1, wherein said computing platform comprises at least one of a personal computer, a wired or wireless phone, a PDA, and a handheld computer.

30. The system of claim 1, wherein said tasks are performed by at least one of a resource management system, a financial system, a communication system, a calendaring system, an email system, and a scheduling application integrated with and interoperable with said event-based scheduling system.

31. The system of claim 1, wherein said event-based scheduling system automatically notifies event participants identified in a scheduled event and at least one service provider associated with said scheduled event of scheduling changes associated with said scheduled event in response to a change to said scheduled event.

32. The system of claim 1, wherein said event-based scheduling system determines an optimal selection and best fit for said event and said tasks associated with said event based on said data inputted by said event participant and an availability of said tasks.

33. The system of claim 1, wherein said event-based scheduling system provides access to a plurality of independent product and service providers for fulfillment of one or more of said tasks, wherein said product and service providers are pre-selected and data relating to each product and service provider is stored by said event-based scheduling system and can be accessed by said event participant from said computing platform.

34. The system of claim 1, wherein said event-based scheduling system provides for requesting at least one product or service typically associated with said event from one of an internal service provider, an external service provider, and a third party service vendor.

35. The system of claim 34, further comprising a multi-directional communication link with said internal service provider, said external service provider, and said third party service vendor that facilitates communications of one of: confirmation of receipt of said request at one of said product/service providers; acceptance to fulfill said request; communication of status information regarding said requested event and any products and services associated with said event; and confirmation of fulfillment of said request.

36. A method of scheduling an event and ancillary tasks associated with said event using an event-based scheduling system, the method comprising the steps of:
   prompting an event participant to input event data relating to the time and place of an event;
   storing said inputted event data in a database in connection with said event;
   scheduling the time and place of said event based on said event data inputted by said event participant;
   prompting said event participant to input task data relating to at least two tasks required to support said event;
   storing said task data in said database and linking said task data to said event; and
   scheduling each of said at least two tasks using said task data input by said event participant.

37. The method of claim 36, further comprising the steps of:
   prompting said event participant to input sub-task data relating to at least two common sub-tasks of said at least two tasks required to support said event;
   storing said sub-task data in said database and linking said sub-task data to said event; and
   scheduling each of said at least two sub-tasks using said sub-task data input by said event participant.

38. The method of claim 37, wherein said step of storing and linking said sub-task data further comprises the steps of:
   vertically linking each task to said event and multiple sub-tasks within each task, wherein said vertical linking provides for one or more of data collection, data aggregation, and data reporting of the provisions of said tasks and sub-tasks required to support said event; and
   horizontally linking multiple sub-tasks across said at least two tasks, wherein said horizontal linking integrates the functionality of each sub-task across said at least two tasks.

39. The method of claim 37, further comprising the step of automatically modifying said tasks and said sub-tasks associated with said event based on a change to said event.

40. The method of claim 37, further comprising the step of providing real-time status information relating to said event, and said tasks and sub-tasks associated with said event.

41. The method of claim 37, further comprising the step of notifying a provider of said tasks and said sub-tasks of the time and place of said event.

42. The method of claim 36, wherein said step of scheduling said at least two tasks further comprises the steps of:
   scheduling availability of a resource at said event;
   calendaring personnel who are to attend said event; and
   calendaring personnel who are to provide services in support of said event.

43. The method of claim 36, further comprising the steps of:
   collecting data relating to said event, and resources and personnel associated with said event;
   aggregating said collected data; and
   generating reports relating to said event, and said resources and said personnel associated with said event using said collected and aggregated data.

44. The method of claim 36, wherein said prompting steps further comprise the steps of:
   prompting the event participant to select said tasks from a menu selection or input said tasks into an input field; and
   processing said selected tasks to ensure no conflict exists with a previously scheduled event or tasks.

45. In a computerized system, an event-based method of scheduling an event, and at least two tasks and at least two sub-tasks associated with said event, said method comprising:
   establishing a computing platform for use by an event participant in scheduling an event and at least two ancillary tasks and sub-tasks associated with said event, said computing platform including a processor and a database of providers of said tasks and said sub-tasks;
   scheduling an event using event data received from said event participant at said computing platform;
   providing said event participant with a selection of said tasks and said sub-tasks from said database based on said event data received from said event participant;
   scheduling said ancillary tasks and sub-tasks based on selections received from said event participant at said computing platform;
   associating said ancillary tasks and sub-tasks with said event;
   generating a request/order to a provider for each of said tasks and sub-tasks based on said selections; and
   transmitting each request/order to each provider of each selected task and sub-task.

46. The method of claim 45, wherein said transmitting step further comprises the steps of transmitting a request/order over a communication network to a provider of a selected task or sub-task.

47. The method of claim 46, wherein said communication network is the Internet.

48. The method of claim 45, wherein said step of associating said ancillary tasks and sub-tasks with said event further comprises the steps of:
   integrating said tasks and sub-tasks with said event; and
   integrating said sub-tasks across each of said individual tasks, wherein each individual sub-task controls a common function across a plurality of tasks.

49. The method of claim 45, further comprising the steps of:
receiving an acknowledgement of receipt of a request/order sent to a task provider; and
receiving an acceptance of said request/order from said task provider, indicating that said task provider promises to fulfill said request/order.

50. The method of claim 45, further comprising the steps of generating a bill and receiving payment for said requested/ordered tasks based on at least one of said event participant, a location of said computing platform where said request/order was generated, and billing/payment data stored in said database.

51. A server system for operating an event-based scheduling application that allows an event participant to schedule an event and at least two tasks comprising ancillary products and services associated with said event, said server system comprising:
a server interface for receiving data relating to said event and said at least two tasks associated with said event from an event participant;
a server connected to said server interface, said server comprising a database for storing said received data and an operating system connected to said database; and
an event-based scheduling application operable by said operating system to cause said server to receive said event and task data from said server interface and to store said event and task data in said database, to process said event and task data in order to schedule said event and said tasks, and to associate said at least two tasks with said event in said database.

52. The server system of claim 51, further comprising a network for connecting a plurality of computing platforms to said server interface, said network allowing real-time scheduling of said event and said at least two tasks and allowing status monitoring of scheduled events and tasks by individual event participants at one of said plurality of computing platforms.

53. The server system of claim 51, wherein said event-based scheduling application comprises at least two task modules, wherein each of said at least two task modules comprise one of: a conference room module comprising meeting room location, room capacity, and room availability; a catering module; an audio/visual module; a copying module; a maintenance and repair module; a calendaring module; a travel module; a janitorial module; a mail room and mail distribution module; a hotel module; a temporary labor module; a temporary office space module; a concierge module; a personal assistant service module; a parking module; and an office equipment and office supplies module, wherein said event-based scheduling application provides for scheduling, generating requests, canceling/modifying, and status monitoring for each task module.

54. The server system of claim 51, wherein said event-based scheduling application further comprises at least two sub-tasks, wherein each of said at least two sub-tasks comprise one of:
an order entry sub-task module for ordering said ancillary products and services of said tasks;
an order transmittal sub-task module for transmitting an order to one of an internal service provider, an external service provider, and a third party vendor;
a status/confirm order sub-task module for confirming an order has been transmitted and to check the status of a transmitted order;
a deliver order sub-task module for accepting to fulfill said transmitted order;
a bill order sub-task module for generating a bill for said delivered products and services;
a pay bill sub-task module for affecting payment of said bill for said delivered products and services; and
a report sub-task module for collecting and reporting data relating to said event and said tasks associated with said event.

55. The server system of claim 51, wherein said event-based scheduling application further comprises a linking function that links each task to said event, multiple sub-task modules within each task module, and multiple sub-task modules across multiple task modules.

56. A method that allows an event participant to schedule an event and at least two ancillary products and services associated with said event, said method comprising:
establishing at least one server having a database of providers of products and services and a processor for processing data received from said event participant;
providing a server interface that allows said event participant to access said server to schedule an event and to select among available ancillary products and services associated with said event;
receiving via said server interface data relating to an event entered by said event participant;
displaying a selection of said products and services from said database to said event participant based on said received event data;
receiving selections of said ancillary products and services associated with said event selected by said event participant via said server interface;
generating at least one request/order for said selected products and services based on said selection by the event participant; and
transmitting said generated request/order to a corresponding product/service provider.

57. The method of claim 56, further comprising reporting fulfillment of said transmitted requests/orders based on a response from said provider of said product or service.

58. The method of claim 56, further comprising integrating each of said at least two tasks with said event so that said tasks are automatically changed when said event is changed.

59. The method of claim 56, further comprising integrating each of the at least two sub-tasks within and across each task so that each sub-task fulfills its functionality within each individual task and also across multiple tasks.

60. The method of claim 56, further comprising collecting and aggregating data relating to said event, said at least two tasks, and at least two sub-tasks for use by one of said event participant and said providers of said products and services in benchmarking performance and improving a business process.

* * * * *